United States Patent
Sato et al.

(10) Patent No.: US 12,463,517 B2
(45) Date of Patent: Nov. 4, 2025

(54) VIBRATION ACTUATOR WITH ELASTIC BODY WITH RECTANGUALR FRAME BODY SURROUNDING THE PLATE AND CONTACT-TYPE INPUT DEVICE

(71) Applicant: MINEBEA MITSUMI Inc., Nagano (JP)

(72) Inventors: Soichi Sato, Tokyo (JP); Yosuke Kinoshita, Tokyo (JP); Koichi Azumai, Tokyo (JP); Koji Aita, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/860,800

(22) PCT Filed: Apr. 28, 2023

(86) PCT No.: PCT/JP2023/016957
§ 371 (c)(1),
(2) Date: Oct. 28, 2024

(87) PCT Pub. No.: WO2023/210823
PCT Pub. Date: Nov. 2, 2023

(65) Prior Publication Data
US 2025/0112534 A1    Apr. 3, 2025

(30) Foreign Application Priority Data
Apr. 28, 2022  (JP) ................. 2022-074823

(51) Int. Cl.
*H02K 33/02*  (2006.01)
(52) U.S. Cl.
CPC .................. *H02K 33/02* (2013.01)

(58) Field of Classification Search
CPC ........ H02K 33/02; H02K 33/16; H02K 33/04; H02K 33/18; H02K 35/02; B06B 1/045
(Continued)

(56) References Cited

U.S. PATENT DOCUMENTS 5,231,337 A * 7/1993 van Namen ........... H02K 33/18
                                                      318/128
6,323,568 B1 * 11/2001 Zabar .................... F04B 17/042
                                                      310/12.24
(Continued)

FOREIGN PATENT DOCUMENTS

JP    2012181050 A    9/2012
JP    2013187928 A    9/2013
(Continued)

OTHER PUBLICATIONS

PCT International Search Report for International Application No. PCT/JP2023/016957, mailed Jul. 18, 2023, 7pp.
(Continued)

*Primary Examiner* — Maged M Almawri
(74) *Attorney, Agent, or Firm* — The Roy Gross Law Firm, LLC; Roy D. Gross

(57) ABSTRACT

A vibration actuator according to the present invention comprises a plate that is a magnetic body, an electromagnet that is provided on the plate and is formed by providing a coil to a center part of a core, and an elastic body that supports the core on both sides of the coil and is connected to the plate. Magnetic force generated by energization of the coil causes one of the coil or the plate to be displaced toward the other and vibrate.

18 Claims, 79 Drawing Sheets

(58) Field of Classification Search
USPC .............................. 310/25, 29, 15, 12.01, 28
See application file for complete search history.

(56) References Cited

U.S. PATENT DOCUMENTS

| | | | | |
|---|---|---|---|---|
| 7,671,493 | B2* | 3/2010 | Takashima | G06F 3/016 310/15 |
| 7,999,421 | B2* | 8/2011 | Kim | H02K 33/18 310/15 |
| 8,269,379 | B2* | 9/2012 | Dong | H02K 33/16 310/28 |
| 8,278,786 | B2* | 10/2012 | Woo | H02K 33/16 310/15 |
| 8,368,268 | B2* | 2/2013 | Hasegawa | G02B 21/248 359/381 |
| 8,648,502 | B2* | 2/2014 | Park | H02K 33/16 310/15 |
| 8,829,741 | B2* | 9/2014 | Park | B06B 1/045 310/25 |
| 8,878,401 | B2* | 11/2014 | Lee | H02K 33/16 310/15 |
| 8,941,272 | B2* | 1/2015 | Hong | H02K 33/18 310/15 |
| 9,024,489 | B2* | 5/2015 | Akanuma | H02K 33/16 310/15 |
| 9,225,265 | B2* | 12/2015 | Oh | G06F 3/016 |
| 9,306,429 | B2* | 4/2016 | Akanuma | H02K 33/16 |
| 9,543,816 | B2* | 1/2017 | Nakamura | H02K 33/16 |
| 9,748,827 | B2* | 8/2017 | Dong | H02K 33/16 |
| 9,948,170 | B2* | 4/2018 | Jun | H02K 33/00 |
| 10,033,257 | B2* | 7/2018 | Zhang | H02K 33/12 |
| 10,063,128 | B2* | 8/2018 | Wang | H02K 33/16 |
| 10,160,010 | B2* | 12/2018 | Chun | H02K 33/16 |
| 10,307,791 | B2* | 6/2019 | Xu | B06B 1/045 |
| 10,328,461 | B2* | 6/2019 | Xu | B06B 1/045 |
| 10,447,133 | B2* | 10/2019 | Jin | H02K 33/18 |
| 10,483,451 | B2* | 11/2019 | Wang | H10N 30/01 |
| 10,486,196 | B2* | 11/2019 | Chai | B06B 1/045 |
| 10,491,090 | B2* | 11/2019 | Zu | H02K 33/16 |
| 10,547,233 | B2* | 1/2020 | Jin | H02K 5/04 |
| 10,596,594 | B2* | 3/2020 | Ling | H02K 33/02 |
| 10,596,596 | B2* | 3/2020 | Ling | B06B 1/045 |
| 10,674,278 | B2* | 6/2020 | Zhou | H04R 9/025 |
| 10,763,732 | B2* | 9/2020 | Liu | H02K 33/18 |
| 10,886,827 | B2* | 1/2021 | Liu | H02K 33/14 |
| 11,050,334 | B2* | 6/2021 | Mori | H02K 33/18 |
| 11,205,937 | B2* | 12/2021 | Song | H02K 41/0354 |
| 11,309,808 | B1* | 4/2022 | Li | H02K 35/02 |
| 11,522,429 | B2* | 12/2022 | Takahashi | H02K 33/16 |
| 11,949,308 | B2* | 4/2024 | Shao | H02K 33/02 |
| 11,984,784 | B2* | 5/2024 | Hatano | H02K 33/16 |
| 12,009,719 | B2* | 6/2024 | Maeda | B06B 1/045 |
| 2004/0169425 | A1* | 9/2004 | Aihara | B06B 1/045 310/15 |
| 2006/0066164 | A1* | 3/2006 | Kim | H02K 7/063 310/81 |
| 2006/0133218 | A1* | 6/2006 | Matthey | B06B 1/045 368/230 |
| 2009/0096299 | A1* | 4/2009 | Ota | B06B 1/045 310/25 |
| 2009/0224620 | A1* | 9/2009 | Okubo | H02K 1/28 310/156.25 |
| 2009/0267423 | A1* | 10/2009 | Kajiwara | H02K 33/02 310/38 |
| 2010/0038986 | A1* | 2/2010 | Hull | H02K 1/02 310/181 |
| 2010/0213773 | A1* | 8/2010 | Dong | H02K 33/16 310/25 |
| 2010/0302752 | A1* | 12/2010 | An | H02K 33/06 361/807 |
| 2011/0006618 | A1* | 1/2011 | Lee | H02K 33/16 310/25 |
| 2011/0018364 | A1* | 1/2011 | Kim | H02K 33/18 310/20 |
| 2011/0018365 | A1* | 1/2011 | Kim | B06B 1/045 310/20 |
| 2011/0068640 | A1* | 3/2011 | Choi | H02K 5/04 310/25 |
| 2011/0089772 | A1* | 4/2011 | Dong | H02K 33/16 310/25 |
| 2011/0115311 | A1* | 5/2011 | Dong | H02K 33/16 310/28 |
| 2011/0133577 | A1* | 6/2011 | Lee | H02K 33/18 310/15 |
| 2011/0156500 | A1* | 6/2011 | Dong | H02K 33/16 310/25 |
| 2011/0198945 | A1* | 8/2011 | Nakagawa | H02K 33/16 310/12.25 |
| 2011/0254782 | A1* | 10/2011 | Park | H02K 33/04 345/173 |
| 2011/0266892 | A1* | 11/2011 | Wauke | H02K 33/18 310/25 |
| 2011/0316361 | A1* | 12/2011 | Park | H02K 33/16 310/25 |
| 2012/0153748 | A1* | 6/2012 | Wauke | H02K 33/16 310/25 |
| 2012/0169148 | A1* | 7/2012 | Kim | H02K 33/16 310/25 |
| 2012/0187780 | A1* | 7/2012 | Bang | H02K 33/16 310/25 |
| 2012/0313459 | A1* | 12/2012 | Zhang | H02K 33/18 310/25 |
| 2013/0061736 | A1* | 3/2013 | Wauke | G10H 1/42 84/736 |
| 2013/0099600 | A1* | 4/2013 | Park | B06B 1/045 310/15 |
| 2013/0099602 | A1* | 4/2013 | Park | H02K 33/16 310/25 |
| 2014/0035397 | A1* | 2/2014 | Endo | H02K 33/18 310/30 |
| 2015/0137627 | A1* | 5/2015 | Katada | H02K 33/16 310/25 |
| 2015/0137628 | A1* | 5/2015 | Endo | H02K 33/16 310/25 |
| 2015/0194870 | A1* | 7/2015 | Kim | H02K 33/18 310/25 |
| 2016/0164389 | A1* | 6/2016 | Jang | H02K 7/116 310/20 |
| 2016/0173990 | A1* | 6/2016 | Park | H04R 9/043 381/354 |
| 2016/0218607 | A1* | 7/2016 | Oh | H02K 33/16 |
| 2017/0019011 | A1* | 1/2017 | Wang | H02K 33/16 |
| 2017/0033653 | A1* | 2/2017 | Wang | H02K 33/16 |
| 2017/0033657 | A1* | 2/2017 | Mao | H02K 33/16 |
| 2017/0033669 | A1* | 2/2017 | Xu | H02K 33/16 |
| 2017/0104401 | A1* | 4/2017 | Umehara | H02K 33/16 |
| 2017/0110920 | A1* | 4/2017 | Mao | H02K 1/34 |
| 2017/0214306 | A1* | 7/2017 | Katada | H02K 33/16 |
| 2017/0288519 | A1* | 10/2017 | Kim | H02K 33/16 |
| 2017/0341108 | A1 | 11/2017 | Mao | |
| 2018/0021812 | A1* | 1/2018 | Akanuma | H02K 33/00 310/25 |
| 2018/0241295 | A1* | 8/2018 | Zu | H02K 33/14 |
| 2018/0250107 | A1* | 9/2018 | Dai | H02K 1/2791 |
| 2018/0297074 | A1* | 10/2018 | Huang | B06B 1/045 |
| 2019/0044425 | A1* | 2/2019 | Zu | H02K 33/02 |
| 2019/0151895 | A1* | 5/2019 | Takahashi | B06B 1/045 |
| 2019/0206601 | A1* | 7/2019 | Wauke | H01F 7/0289 |
| 2019/0319568 | A1 | 10/2019 | Son et al. | |
| 2020/0136488 | A1* | 4/2020 | Takahashi | H02K 33/16 |
| 2020/0366177 | A1* | 11/2020 | Maeda | H02K 33/02 |
| 2021/0067021 | A1* | 3/2021 | Maeda | H02K 33/16 |
| 2021/0111654 | A1 | 4/2021 | Ishitani et al. | |
| 2021/0149491 | A1 | 5/2021 | Takahashi et al. | |
| 2021/0194342 | A1* | 6/2021 | Kitahara | H02K 33/18 |
| 2021/0328491 | A1 | 10/2021 | Takahashi et al. | |
| 2022/0103054 | A1 | 3/2022 | Takahashi et al. | |
| 2022/0103055 | A1 | 3/2022 | Takahashi et al. | |
| 2022/0111418 | A1 | 4/2022 | Takahashi et al. | |
| 2022/0123645 | A1* | 4/2022 | Ohishi | H02K 35/02 |

(56) References Cited

U.S. PATENT DOCUMENTS

| | | | |
|---|---|---|---|
| 2022/0415142 A1 | 12/2022 | Takahashi et al. | |
| 2023/0198366 A1* | 6/2023 | Tsuchihashi | H02K 33/18 |
| | | | 310/28 |
| 2023/0400925 A1 | 12/2023 | Takahashi et al. | |

FOREIGN PATENT DOCUMENTS

| | | | |
|---|---|---|---|
| JP | 2015070729 A | 4/2015 |
| JP | 2020089238 A | 6/2020 |
| JP | 2021081876 A | 5/2021 |
| JP | 2021084094 A | 6/2021 |
| JP | 2021164923 A | 10/2021 |
| JP | 2021169096 A | 10/2021 |
| JP | 2022056147 A | 4/2022 |
| JP | 2022056149 A | 4/2022 |
| JP | 2022072888 A | 5/2022 |
| WO | 2016185900 A1 | 11/2016 |

OTHER PUBLICATIONS

PCT Written Opinion for International Application No. PCT/JP2023/016957, mailed Jul. 18, 2023, 5pp.
Japan Patent Office, Office Action—Notice of Reasons for Refusal for Japanese Patent Application No. 2023-572976, mailed Jan. 9, 2024, 10pp.
Japan Patent Office, Written Opinion for Japanese Patent Application No. 2023-572976, submitted March, 8, 2024, 7pp.
European Patent Office, Supplementary European Search Report for European Patent Application No. 23796555.3, dated Jun. 13, 2025, 9pp.

* cited by examiner

3310

4310

VIBRATION ACTUATOR WITH ELASTIC BODY WITH RECTANGUALR FRAME BODY SURROUNDING THE PLATE AND CONTACT-TYPE INPUT DEVICE

CROSS REFERENCE TO RELATED APPLICATIONS

This application is a National Phase of PCT Patent Application No. PCT/JP2023/016957 having International filing date of Apr. 28, 2023, which claims the benefit of priority of Japanese Patent Application No. 2022-074823, filed Apr. 28, 2022, the contents of which are all incorporated herein by reference in their entirety.

TECHNICAL FIELD

The present invention relates to a vibration actuator and a contact-type input device including the same.

BACKGROUND ART

Conventionally, a configuration is known in which vibration is given, by a vibration actuator, as an operational sense of touch (sensation of operating by touch) to an operator's finger pad or the like touching a display screen displayed on a touch panel that is a sensing panel (Patent Literature (hereinafter, referred to as "PTL") 1).

PTL 1 discloses a portable terminal device including a vibration actuator attached to the back surface of a touch screen through a vibration transmission section. In the vibration actuator of this device, a movable element is disposed, in a housing fixed to a vibration transmission portion, to be capable of reciprocating along a guide shaft disposed vertically with respect to a touch panel. In the vibration actuator, although a collision sound is possibly generated by causing the movable element to collide with the housing in response to an operation to the touch panel, vibration is given, through the vibration transmission portion, to the finger pad that comes into contact with the touch panel.

CITATION LIST

Patent Literature

PTL 1
  Japanese Patent Application Laid-Open No. 2015-070729

SUMMARY OF INVENTION

Technical Problem

In the vibration actuator in PTL 1, the movable element is reciprocated along the guide shaft disposed vertically with respect to the display surface of the touch panel. Thus, the device itself has a length, that is, a thickness, vertical with respect to the display surface.

In this configuration, a placement space having a predetermined thickness is necessary on the rear surface side of the touch panel, which causes a problem in that the portable terminal device itself including the touch panel becomes large in size.

Further, in the driving circuit for the vibration actuator in PTL 1, a magnet and two yokes interposing the magnet are included as a mover, and a bobbin that surrounds the movable element and two coils wound around the bobbin are included as a stator. Thus, the assembly takes time. Accordingly, there is a demand for further reducing the number of components and improving ease of assembly.

An object of the present invention is to provide a vibration actuator and a contact-type input device each capable of being easily assembled, and suitably vibrating while being disposed in a space-saving manner.

Solution to Problem

A vibration actuator of the present invention includes:
  a plate that is a magnetic body;
  an electromagnet which is disposed on the plate and in which a coil is disposed at a central portion of a core; and
  an elastic body that supports the core on both sides of the coil and is connected to the plate, in which
  one of the coil and the plate is displaced to approach the other and vibrates by a magnetic force generated by energization of the coil.

A contact-type input device of the present invention is a contact-type input device in which the vibration actuator according to any one of claims 1 to 15 is disposed on a back surface of an operation surface,
  the coil is energized in response to an operator's operation of touching the operation surface, and one of the coil and the plate is displaced to approach the other and vibrates to present a sense of touch to the operator.

Advantageous Effects of Invention

According to the present invention, it is possible to be easily assembled and suitably vibrate while being disposed in a space-saving manner.

DESCRIPTION OF EMBODIMENTS

Figure 1:
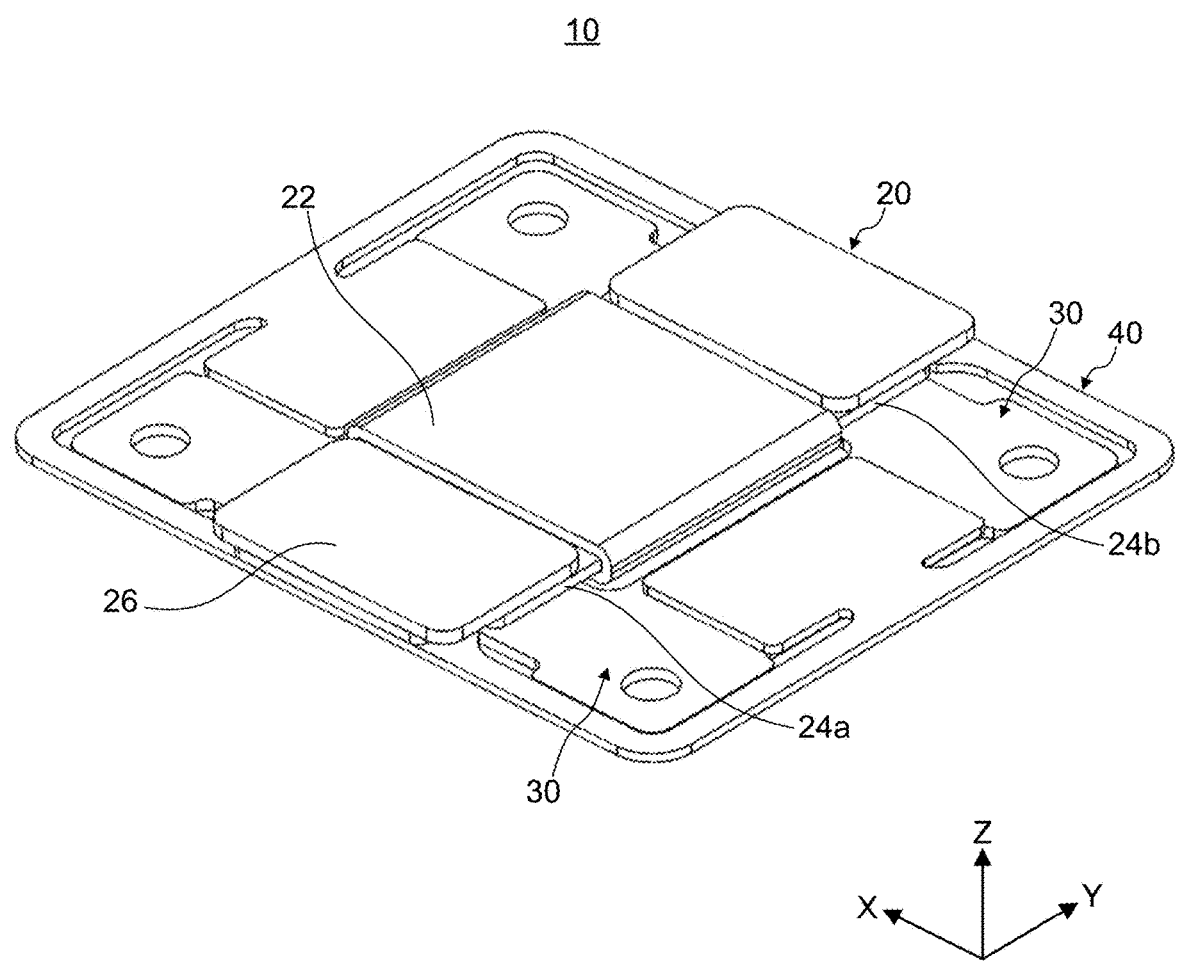
FIG. 1 is a perspective view of a vibration actuator according to an embodiment of the present invention.
Figure 2:
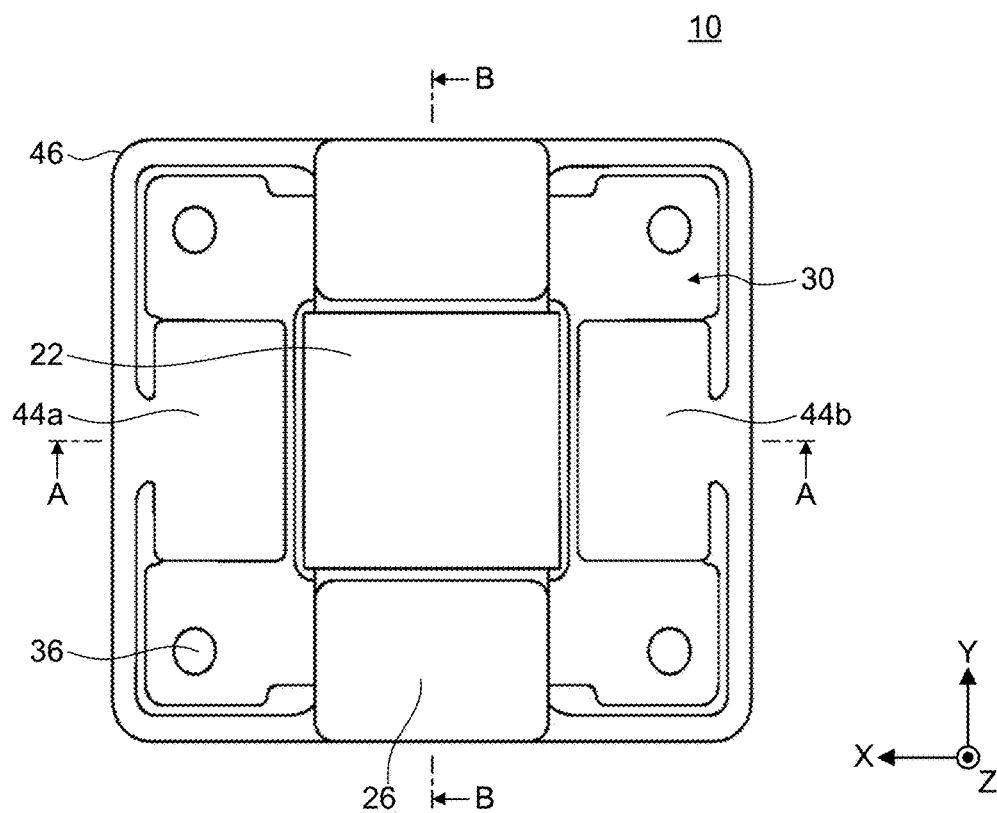
FIG. 2 is a plan view of the vibration actuator.
Figure 3:
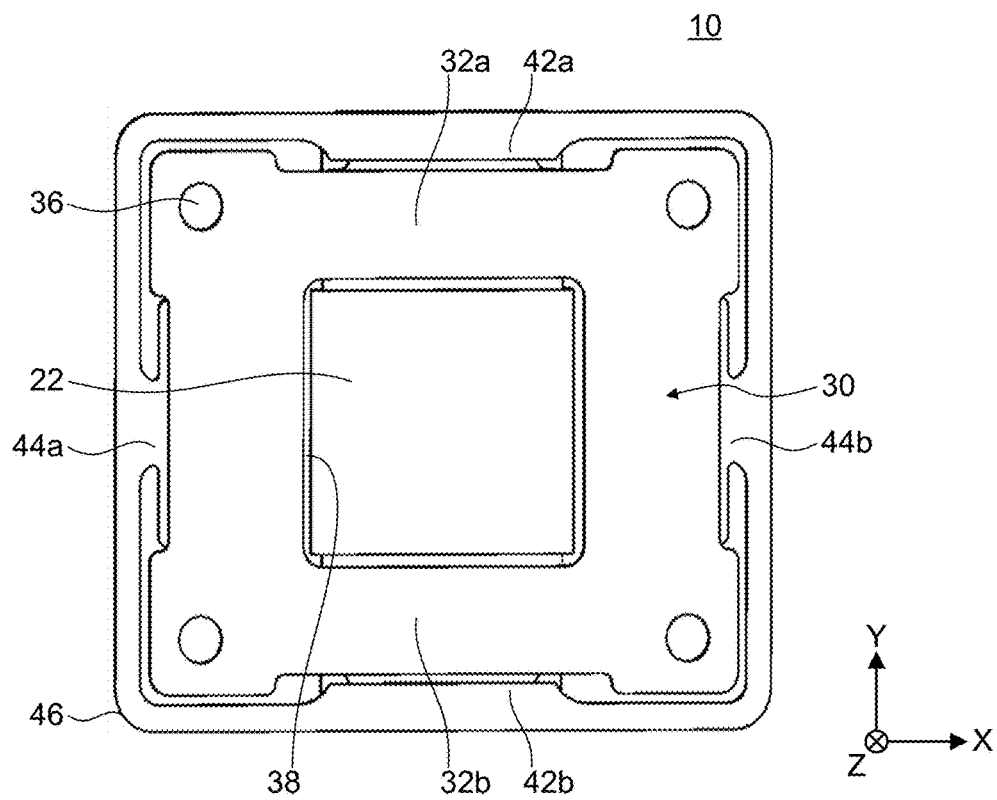
FIG. 3 is a bottom view of the vibration actuator.
Figure 4:
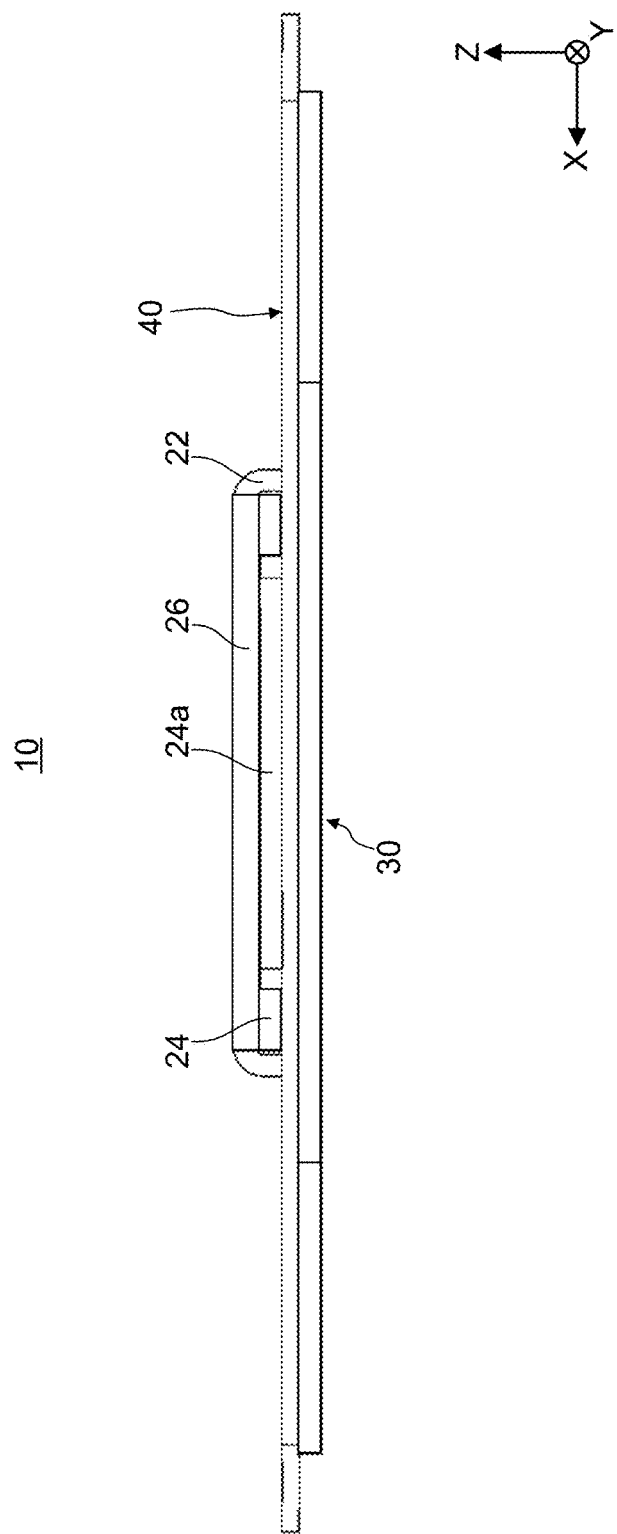
FIG. 4 is a front view of the vibration actuator.
Figure 5:
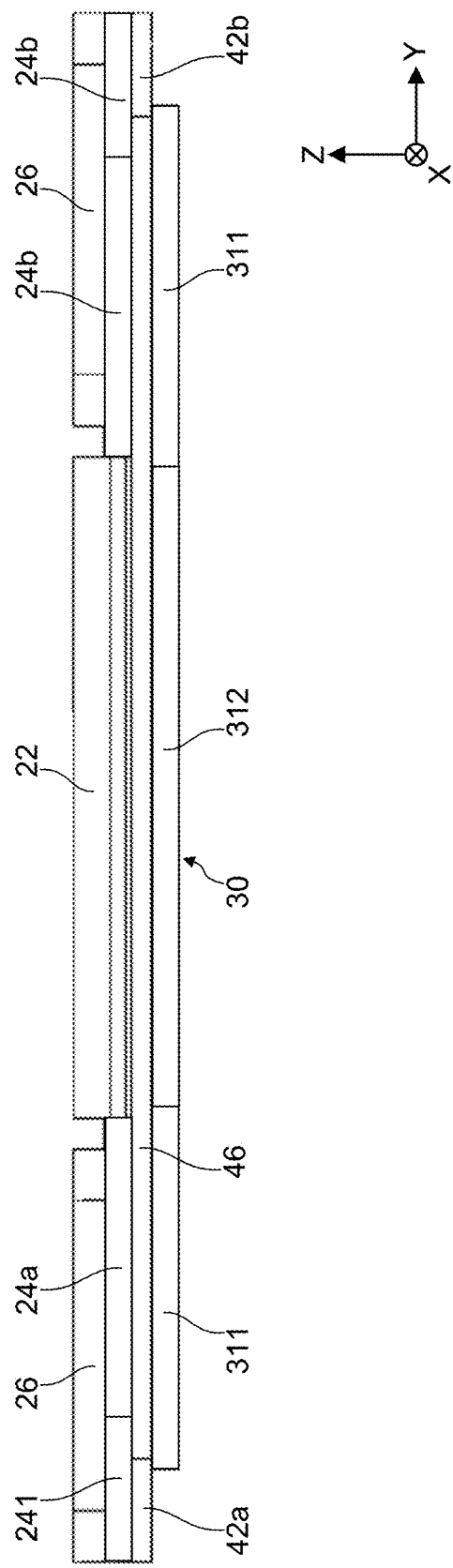
FIG. 5 is a right side view of the vibration actuator.
Figure 6:
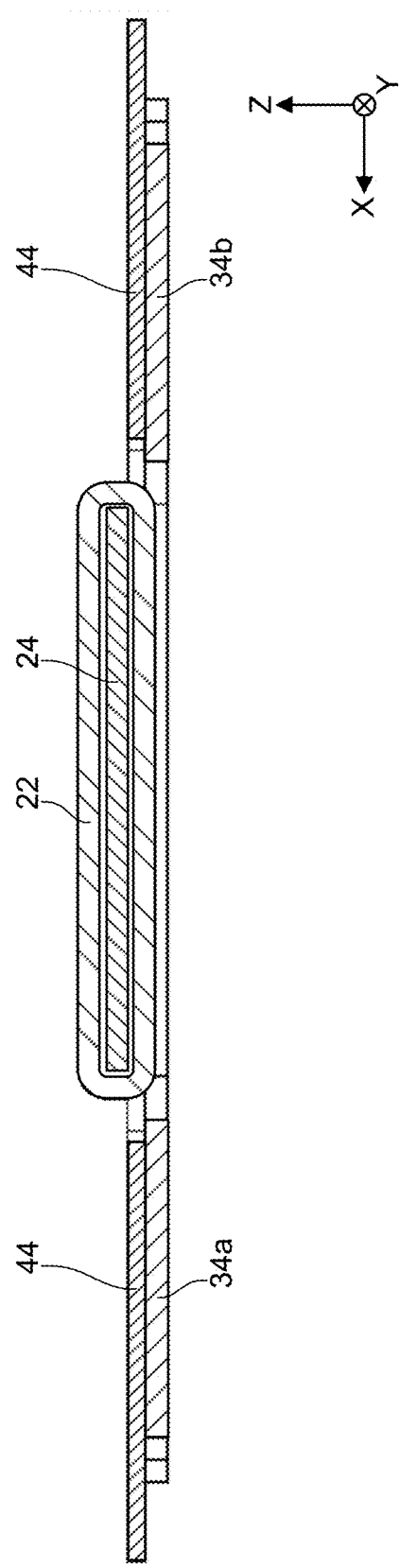
FIG. 6 is a cross-sectional view taken along line A-A in FIG. 2.
Figure 7:
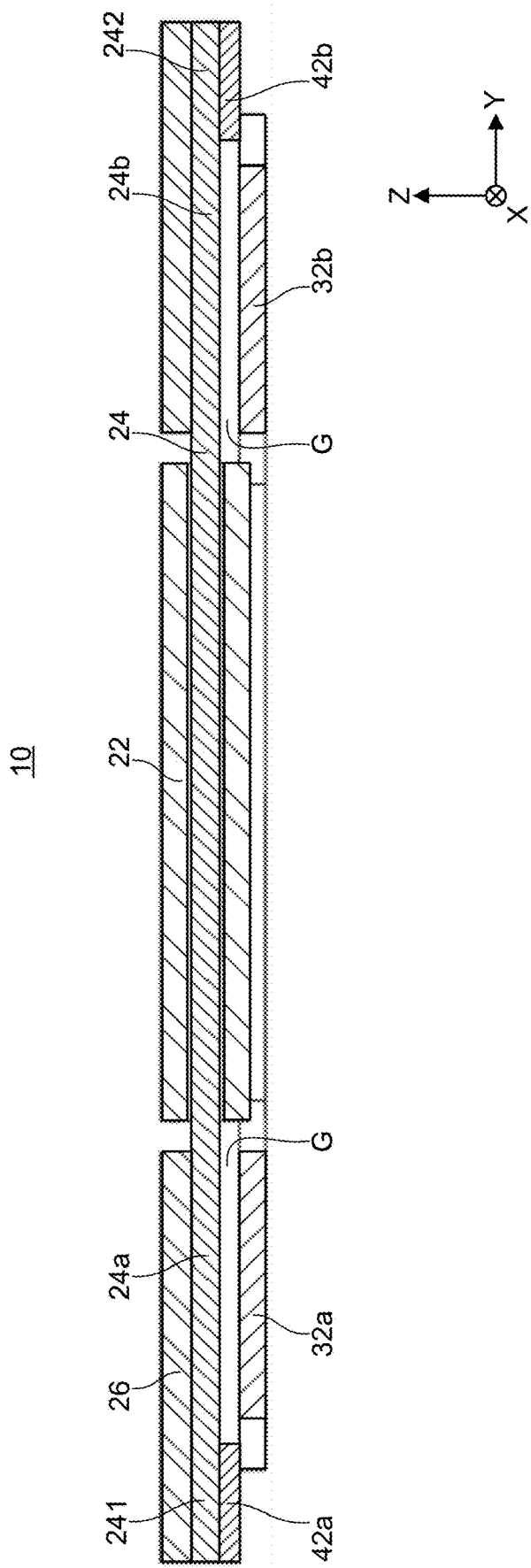
FIG. 7 is a cross-sectional view taken along line B-B of FIG. 2.
Figure 8:
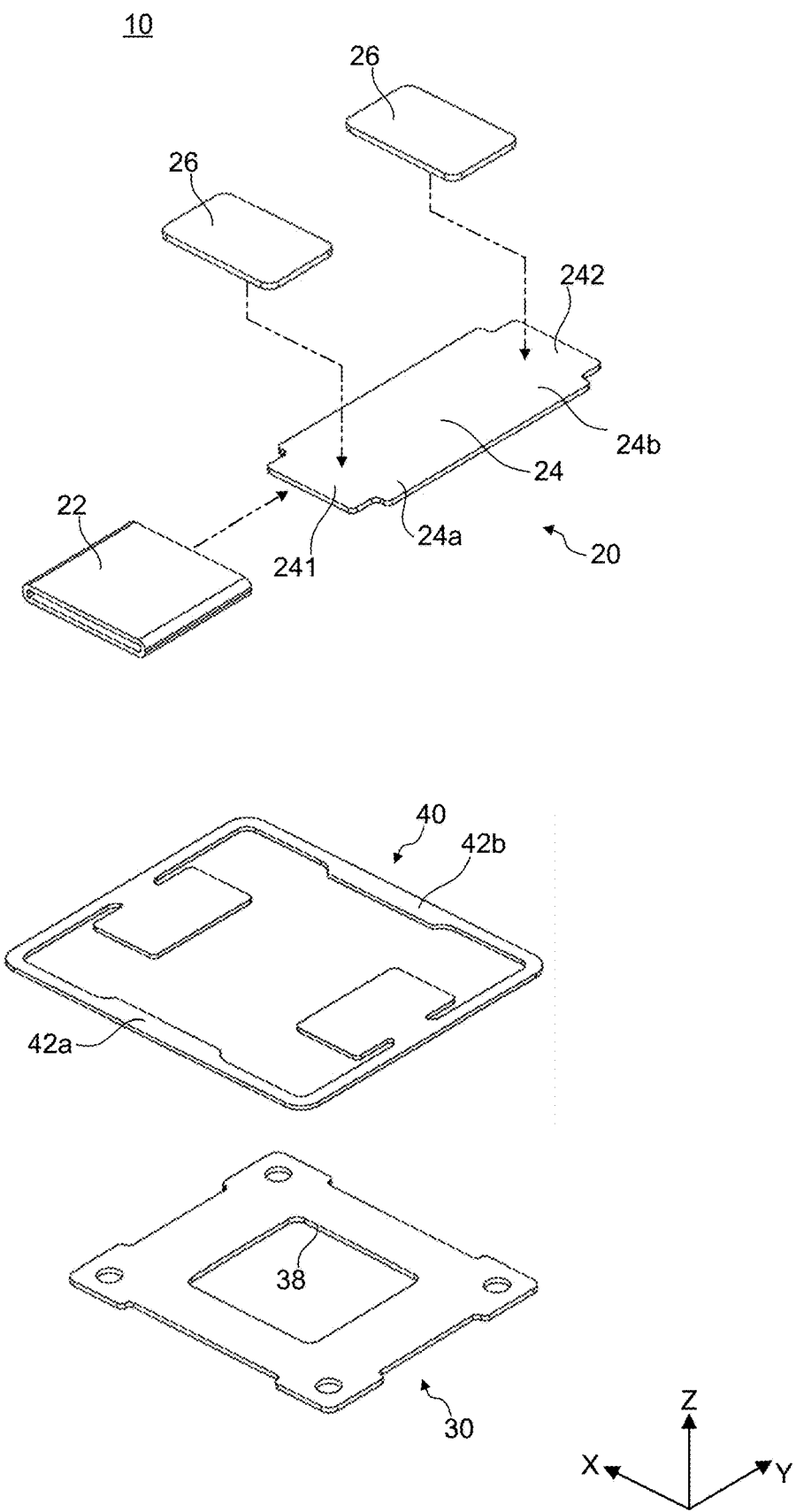
FIG. 8 is an exploded perspective view of the vibration actuator according to the embodiment of the present invention.
Figure 9:
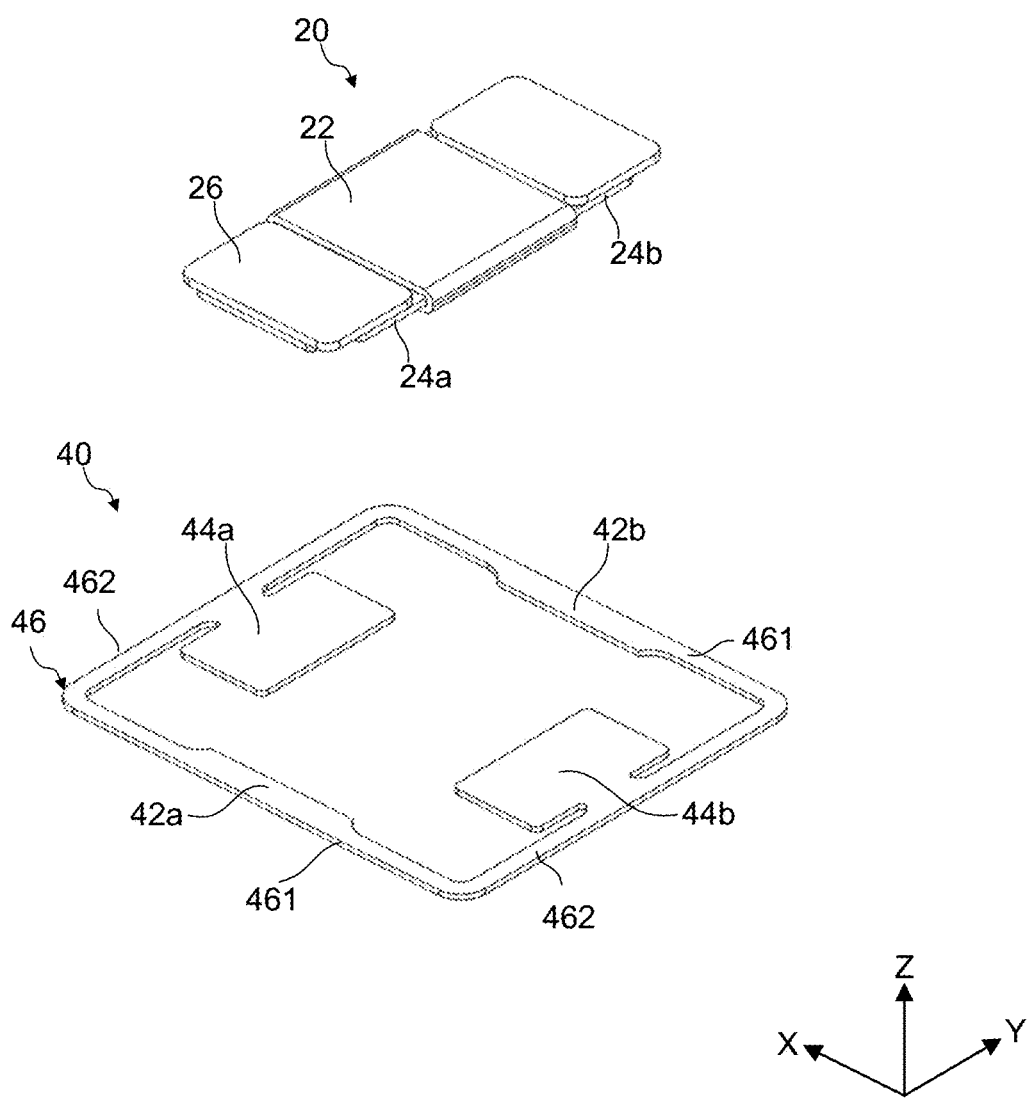
FIG. 9 is an exploded perspective view of the vibration actuator according to the embodiment of the present invention for illustrating the relationship between a movable section and an elastic support section.
Figure 10:
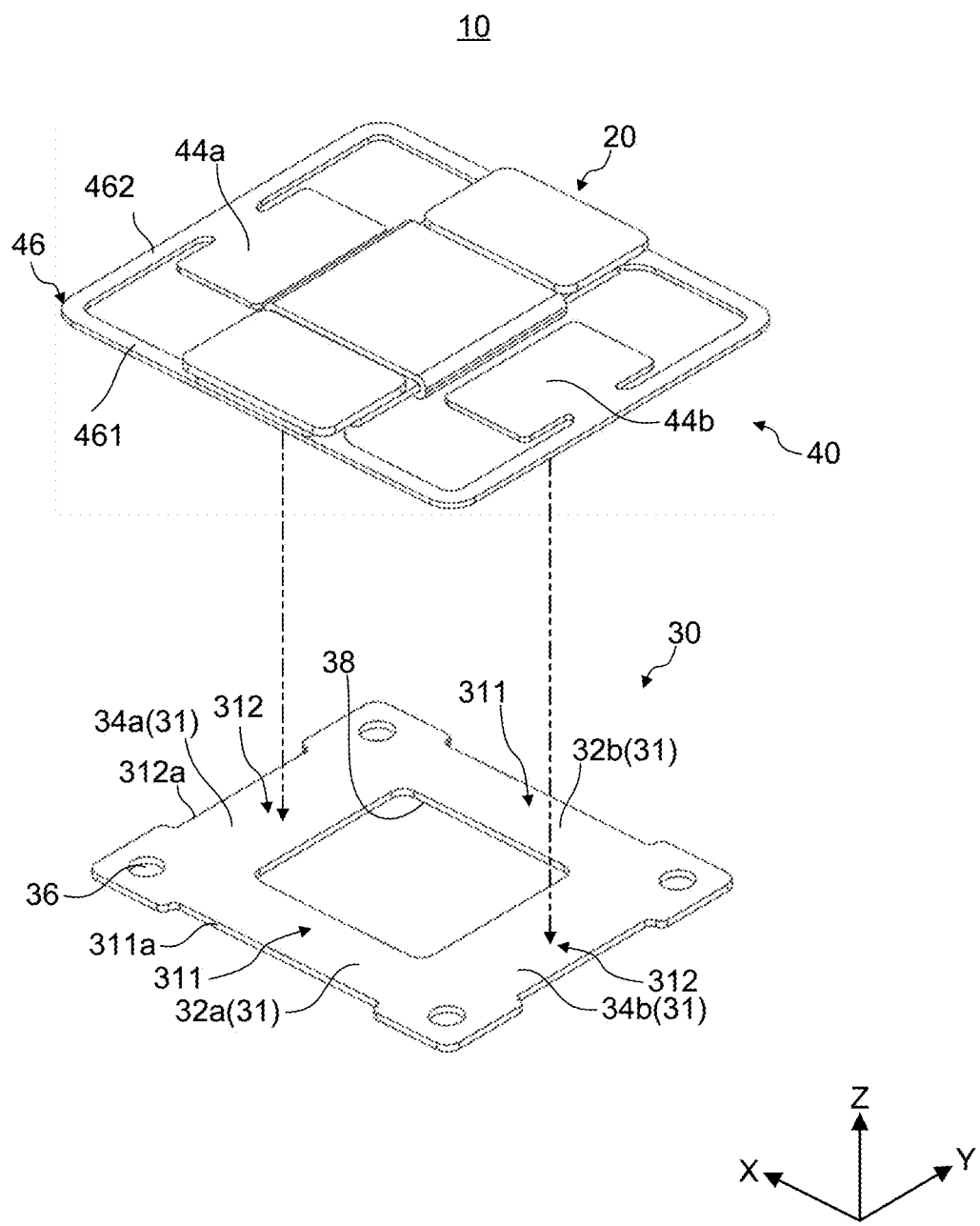
FIG. 10 is an exploded perspective view of the vibration actuator according to the embodiment of the present invention for illustrating the relationship between the movable section, the elastic support section, and a base section.

Hereinafter, an embodiment of the present invention will be described in detail with reference to the accompanying drawings.

An orthogonal coordinate system (X, Y, Z) is used for the description in the present embodiment. The common orthogonal coordinate system (X, Y, Z) is also used in the drawings described below. Hereinafter, the width, the depth, and the height of vibration presentation device 1 (contact-type input device) including vibration actuator 10 are referred to as lengths in the X direction, the Y direction, and the Z direction, respectively, and the width, the depth, and the height of vibration actuator 10 also correspond to the lengths in the X direction, the Y direction, and the Z direction, respectively. Further, the Z-direction plus side is the direction in which vibration feedback is given to the operator, and will be referred to as the "plane side" (or "upper side"), and the Z-direction minus side is the direction in which the operator presses at the time of operation, and will be referred to as the "bottom surface side" (or "lower side"). Note that, in each component that constitutes vibration actuator 10, the surface on the "plane side" (or "upper side") is referred to as the "front surface" (or "upper surface"), and the surface on the "rear side" (or "lower side") is referred to as the "back surface" (or "lower surface").

<Overall Configuration of Vibration Actuator 10>

Vibration actuator 10 is preferably used for a vibration presentation device (see trackpad illustrated in FIG. 13), which is a contact-type input device including operation equipment (see pad main body 110 illustrated in FIG. 13 in the present embodiment) as a vibration presentation section (operation surface) operated by touch by an operator. Vibration actuator 10 can, by vibrating the operation equipment, give an operational sense of touch ("touch" or "force sense") to the operator who operates the operation equipment by touching the operation equipment, depending on the application and the use situation of the operation equipment.

Vibration actuator 10 is a thin vibration actuator having a flat or thin plate shape, and when the Z direction is defined as the thickness direction, is disposed so as to face the side of the back surface of the operation equipment in the thickness direction and to vibrate the operation equipment.

Vibration actuator 10 is formed in a thin plate shape, and includes: movable section 20; base section (also referred to as "base plate") 30; and plate-shaped elastic section 40 as an elastic support section (elastic body) that supports movable section 20 movably with respect to base section 30. Note that the elastic support section is plate-shaped elastic section 40, but is not limited to have a plate shape as long as the elastic support section is capable of movably supporting movable section 20 with respect to base section 30.

Vibration actuator 10 is connectable to a vibration presentation section (for example, pad main body 110 or 110A illustrated in FIGS. 14 to 16) that receives a user's pressing operation through one of movable section 20 and base section 30.

Movable section 20 comes close and moves away in the z direction with respect to base 30, specifically, to and from the side of base section 30, and vibrates, so that movable section 20 gives the vibration, as an operational sense, to the operation equipment to which vibration actuator 10 is attached.

<Movable Section 20>

Movable section 20 is formed in a rectangular plate shape, and includes coil 22, core 24, and weight section 26. The coil is formed in a flat shape and is disposed so as to surround the central portion of core 24. Note that, coil 22 is disposed on the outer periphery of the central portion of core 24 via an insulation material. The insulation material may be, for example, a coating material that is coated and then cured on core 24, or may be configured as a bobbin-shaped insulation member and interposed between coil 22 and core 24. As the insulation material, for example, a resin material such as polybutylene terephthalate (PBT) can be used, and thus, electrical insulation between coil 22 and core 24 can be ensured.

Core (magnetic core) 24 is a magnetic body, and both end portions 24a and 24b in the winding axis direction protrude from coil 22, that is, both end portions 24a and 24b protrude from coil 22 that is wound. At the leading ends of both end portions 24a and 24b of core 24, spring connection portions 241 and 242 each joined to the elastic support section are provided. Core 24 is formed in a rectangular plate shape, and both end portions 24a and 24b each have a rectangular plate shape with a wide width and face base section 30 on the back surface side. To the front surfaces of both end portions 24a and 24b, weight sections 26 that extend on spring connection portions 241 and 242 are attached.

Weight sections 26 each have a plate shape, and are preferably provided so as to correspond to the shape of core 24, for example, the width (length in the X direction) and the length in the depth direction (length in the Y direction). The weight of weight section 26 can be freely set, and can be adjusted, for example, by adjusting the length in the Y direction, by adjusting the length in the Z direction, by adjusting the material, or the like. As described above, weight section 26 can adjust the weight of movable section 20, and a natural vibration frequency can be set by this adjustment. Note that, in a case where the placement space in the thickness (Z direction) is limited, weight section 26 may have a shape in which the weight increases in the XY direction. In a case where the vibration presentation device (for example, trackpad main body or the like) receiving a pressing operation from a user is attached to the side of movable section 20, the vibration presentation device is preferably attached to weight section 26 with a fixing material such as an adhesive, a fastening member, or a bonding member.

Core 24 is magnetized by energization of coil 22, and functions as an electromagnet. Both end portions 24a and 24b serve as magnetic poles, and generate a magnetic attractive force between both end portions 24a and 24b and the adjacent magnetic body, that is, base section 30.

Due to energization of coil 22, both end portions 24a and 24b of core 24, particularly, the back surfaces of both end portions 24a and 24b, serve as planar magnetic pole surfaces. Note that, core 24 is preferably formed of a soft magnetic material such as a silicon steel plate, permalloy, or ferrite. Further, core 24 may be constituted by electromagnetic stainless steel, a sintered material, a metal injection mold (MIM) material, a laminated steel sheet, steel electrolytic cold commercial (SECC), or the like.

<Base Section 30>

As illustrated in FIGS. 1 to 8, base section 30 movably supports, through plate-shaped elastic section 40, movable section 20 in the direction in which movable section 20 comes close to and moves away from base section 30, which is the Z direction in FIG. 1. Base section 30 includes facing portions 32a and 32b, which are magnetic bodies disposed to respectively face both end portions 24a and 24b of core 24 while having gap G in a facing direction intersecting with the winding axis direction of coil 22. Base section 30 is a member having a flat shape with a predetermined thickness in the Z direction, and forms the bottom surface of vibration actuator 10.

Base section 30 includes base main body 31 that is a magnetic body, and base main body portion 31 is provided with facing portions (magnetic bodies) 32a and 32b that are disposed to face both end portions 24a and 24b, spring connection portions 34a and 34b that are elastic section connection portions, and fixing portions 36.

Base main body portion 31 includes opening portion 38 in the center thereof, and is formed in a square frame shape in plan view. Opening portion 38 is a space into which the lower portion of coil 22 is inserted, and has a shape corresponding to the outer shape of coil 22, for example, a square shape.

In base main body 31, facing portions 32a and 32b are formed in a pair of side portions 311 that face each other and are spaced apart from each other, and spring fixing portions 34a and 34b are formed in the other pair of side portions 312 that face each other and are spaced apart from each other between the pair of side portions 311. Facing portions 32a and 32b and spring fixing portions 34a and 34b are formed in the front surface of base main body 31, that is, in the surface on the side of the movable section.

The pair of side portions 311 and the other pair of side portions 312 are planer bodies, and cutout portions 311a and 312a are formed at central portions of four outer edge portions constituting the outer peripheral portion of base main body 31. Cutout portions 311a and 312a are each provided to have a part of the deformation region of disposed plate-shaped elastic section 40.

Facing portions (facing surfaces) 32a and 32b are parts of base section 30, and constitute magnetic bodies which are disposed to respectively face both end portions 24a and 24b of core 24 while having gap G in the facing direction, for example, the Z direction, which intersects with the winding axis direction of coil 22.

Facing portions 32a and 32b are attracted to both end portions 24a and 24b by a magnetic attractive force generated between facing portions 32a and 32b and the back surface of both end portions 24a and 24b by energization of coil 22.

Facing portions 32a and 32b are formed in, for example, central portions of the pair of side portion 311, and are disposed in a position of interposing opening portion 38 in the Y direction.

Since facing portions 32a and 32b are surfaces that face the entire back surface of both end portions 24a and 24b, it is possible to efficiently cause a magnetic flux to flow between facing portions 32a and 32b and the back surface of both end portions 24a and 24b.

Facing portions 32a and 32b are ferromagnetic bodies as parts of base main body portion 31, and formed of, for example, iron (Fe), cobalt (Co), nickel (Ni), gadolinium (Gd), or the like. Facing portions 32a and 32b are particularly formed of metal materials (for example, iron) such as iron, cobalt, nickel, or the like, and constitute base main body 31 together with spring connection portions 34a and 34b and fixing portion 36.

Both end portions 24a and 24b are disposed above (in Z direction) facing portions 32a and 32b apart from facing portions 32a and 32b, and each have a left-right symmetrical shape with respect to centers in the X and Y directions.

Spring connection portions 34a and 34b are disposed so as to interpose opening portion 38 in the X direction, and are joined to the other end portions of plate-shaped elastic section 40 on the side of the front surface of base section 30.

Fixing portion 36 fixes base section 30. Fixing portion 36 is, for example, a fastening hole fastened, using fastening member (for example, screw 170 illustrated in FIG. 13), to operation equipment (vibration presentation section) operated by touch by an operator or a housing (placement portion) on which the operation equipment is placed (see FIGS. 2, 3, and 13).

Fixing portion 36 is formed at four corners of base section 30, and can tightly fasten and fix base section 30 to the fixation target. Although fixing portion 36 is formed at four corners, the number of fixing portions 36 may be any number as long as base section 30 can be fixed to the fixation target.

<Plate-Shaped Elastic Section 40>

Plate-shaped elastic section 40 is plate-shaped, specifically, a plate spring that is elastically deformed, and movably supports movable section 20 with respect to base section 30. Plate-shaped elastic section 40 is formed in a thin plate frame shape having a predetermined thickness (thickness in the Z direction), and is disposed between base section 30 and movable section 20 in a layered manner in the thickness direction (Z direction).

Plate-shaped elastic section 40 is connected to each of movable section 20 and base section 30. Further, plate-shaped elastic section 40 is formed in a frame shape surrounding base section 30, movable section 20 is joined to a pair of side portions 461 parallel to each other, and base section 30 is joined to the other pair of side portions 462 that face each other and are adjacent to the pair of side portions 461. Thus, plate-shaped elastic section 40 supports movable section 20 in a direction perpendicular to the facing direction (X direction and Y direction) with respect to base section 30, symmetrically in the perpendicular direction (X direction, Y direction) and in a well-balanced manner.

Since plate-shaped elastic section 40 is a rectangular frame (thin plate frame body herein), the number of components can be reduced, the overall shape can be made thinner, and further, the component can be manufactured without bending processing or the like. Furthermore, since plate-shaped elastic section 40 is formed as a frame body, plate-shaped elastic section 40 can be disposed without interfering with other components by disposing the other components in the frame body.

Further, by setting spring constant $K_{sp}$, plate-shaped elastic section 40 can determine the displacement amount and the natural vibration frequency of movable section 20, and also causes a mechanical sense of touch by the occurrence of the displacement when movable section 20 is driven, that is, when coil 22 is energized.

Plate-shaped elastic section 40 includes: movable-section-side fixing portions 42a and 42b; base-section-side fixing portions 44a and 44b; and elastic main body portion 46 having a planar shape and including an arm that connects movable-section-side fixing portions 42a and 42b and base-section-side fixing portions 44a and 44b together and elastically deforms.

Elastic main body portion 46 connects movable-section-side fixing portions 42a and 42b and base-section-side fixing portions 44a and 44b together so as to be elastically deformable in the Z direction.

Elastic main body portion 46 includes deformable arm portions that connect movable-section-side fixing portions 42a and 42b and base-section-side fixing portions 44a and 44b together. The arm portions are each formed, for example, in an L shape, and are formed in a frame shape that surrounds base section 30 in plan view, and are freely deformed in the Z direction on the side of the outer periphery of base section 30.

In elastic main body portion 46, a pair of side portions 461 parallel to each other is formed by movable-section-side fixing portions 42a and 42b and one side of the L-shaped arm linearly connected to each of movable fixing portions 42a and 42b, and on the other pair of side portions 462 adjacent to the pair of side portions 461, base-section-side fixing portions 44a and 44b are formed so as to protrude inward.

In plate-shaped elastic section 40, elastic main body portion 46, movable-section-side fixing portions 42a and 42b, and base-section-side fixing portions 44a and 44b are disposed on the same plane.

Movable-section-side fixing portions 42a and 42b each have a planar shape and are fixed to movable section 20. Movable-section-side fixing portions 42a and 42b are provided at central portions of a pair of side portions 311 disposed outside base section 30 in plan view in elastic main body portion 46, and, on the front surface, are fixed to the sides of the back surfaces of spring connection portions 241 and 242 of core 24 by surface contact. Movable-section-side fixing portions 42a and 42b are provided so as to be symmetrical with respect to the center in the X direction or the center in the Y direction in each direction. Base-section-side fixing portions 44a and 44b each have a planar shape and are fixed to base section 30.

Plate-shaped elastic section 40 includes an arm of elastic main body portion 46 to ensure elasticity, and the arm shape may be any shape as long as the arm shape can connect movable-section-side fixing portions 42a and 42b and base-section-side fixing portions 44a and 44b in a displaceable manner in the Z direction.

Further, elastic main body portion 46 may have any shape, as long as elastic main body portion 46 is formed in a shape capable of being deformed in a balanced manner so as to move movable section 20 in the Z direction (vibration application direction) while movable section 20 is located on the XY plane.

Plate-shaped elastic section 40 supports movable section 20 such that the back surfaces of the both end portions of movable section 20 and facing portions 32a and 32b of base section 30 face each other while having gap G therebetween in the vibration direction (Z direction), which is the vertical direction for movable section 20 and base section 30. Plate-shaped elastic section 40 forms gap G by its thickness (length in the Z direction).

Plate-shaped elastic section 40 is deformed between the upper surface of core 24 or coil 22 and the bottom surface of base section 30. As described above, plate-shaped elastic section 40 is formed in a rectangular frame shape, and movable-section-side fixing portions 42a and 42b and base-section-side fixing portions 44a and 44b are disposed in central portions of respective side portions constituting the rectangular frame. When movable section 20 is driven, movable-section-side fixing portions 42a and 42b are displaced with respect to base-section-side fixing portions 44a and 44b.

In elastic main body portion 46, movable section 20 is supported on both sides by movable-section-side fixing portions 42a and 42b and arms having L-shapes connected to base-section-side fixing portions 44a and 44b. This makes it possible to disperse stress at the time of the elastic deformation and to move movable section 20 in the vibration direction (Z direction) without movable section 20 been inclined with respect to base section 30, thereby increasing the reliability and enhancing the stability of the vibration state.

<Magnetic Circuit of Vibration Actuator 10>

Figure 11A:
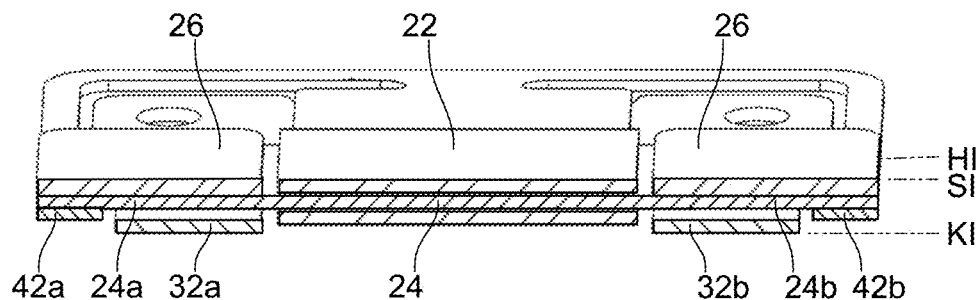
FIGS. 11A, 11B, and 11C are diagrams for describing the operation of the vibration actuator.
Figure 11B:
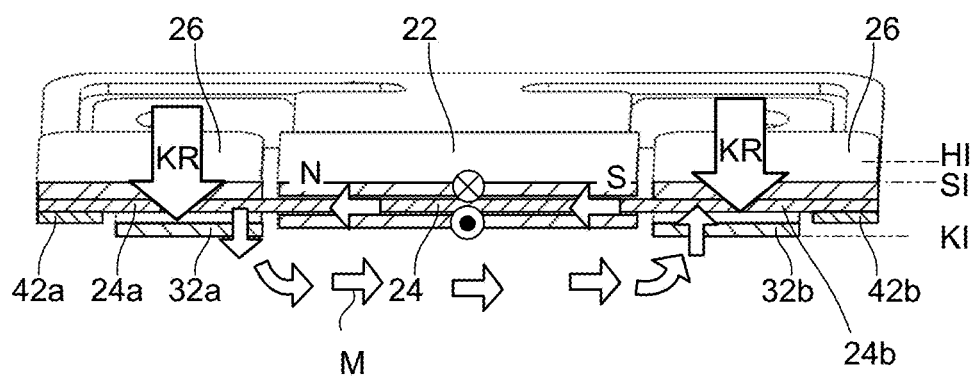
Figure 11C:
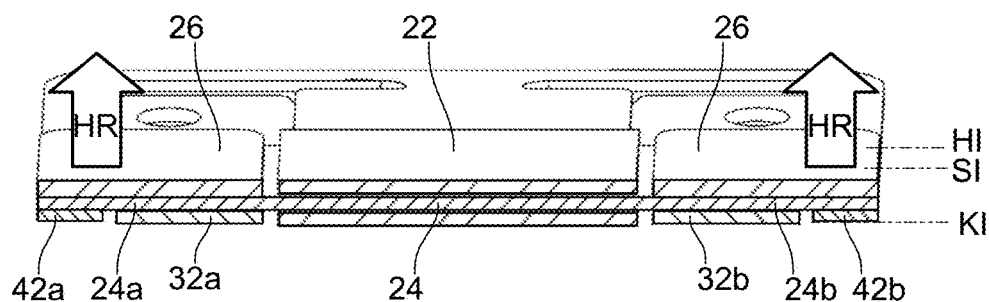

FIGS. 11A to 11C are diagrams for describing the operation of the vibration actuator. FIGS. 11A to 11C are perspective views of a part of vibration actuator 10 taken along line B-B in FIG. 2, and the magnetic circuit has magnetic flux flow M in a portion not illustrated as well as in the illustrated portion.

FIG. 11A is a view of vibration actuator 10 in a still state (located at a still position SI). When a current flows through coil 22 of vibration actuator 10 illustrated in FIG. 11A, core 24 is excited to generate a magnetic field, and both end portions 24a and 24b of core 24 serve as magnetic poles. For example, in FIG. 11B, one end portion 24a of core 24 serves as an N pole, and the other end portion 24b of core 24 serves as an S pole. Then, the magnetic circuit illustrated by magnetic flux flow M is formed between core 24 and facing portions 32a and 32b of base section 30. Magnetic flux flow M in this magnetic circuit flows from one end portion 24a to facing portion 32a facing one end portion 24a, from facing portion 32a to facing portion 32b, and from facing portion 32b to the other end portion 24b of core 24, passes through core 24, and is emitted again from one end portion 24a.

Thus, both end portions 24a and 24b of core 24 generate magnetic attraction force KR based on the principle of the electromagnetic solenoid. Then, both end portions 24a and 24b are attracted to facing portions 32a and 32b of base section 30. Since base section 30 is fixed to a housing or the like via fixing portion 36, both end portions 24a, 24b are attracted to and adsorbed by facing portions 32a, 32b. That is, plate-shaped elastic section 40 is deformed, and movable section 20 is attracted toward the side of base section 30. Movable section 20 is disposed close to the side of the position (KI) where base section 30 is fixed.

Subsequently, when the energization of coil 22 is stopped, the magnetic field disappears, and as illustrated in FIG. 11C, magnetic attractive force KR of movable section 20 disappears and the biasing force of plate-shaped elastic section 40 deformed to the side of base section 30 is released. That is, reaction force HR of the spring as plate-shaped elastic section 40 is generated, and movable section 20 moves to the original position (position SI in the non-driven still state, which is the reference position) by reaction force HR of plate-shaped elastic section 40 (moves in the plus Z direction which is the direction opposite to the attraction direction of magnetic attraction force KR). At this time, movable section 20 moves to position HI, where movable section 20 is displaced by reaction force HR in a direction further away from still position SI in the still state from base section 30, thereby generating strong vibration.

Movable section 20 repeats free vibration while vibration attenuates as the excitation force attenuates. Further, movable section 20 may generate vibration by reciprocating in the Z direction by repeating energization and de-energization of coil 22. In vibration actuator 10, movable section 20 supported while being suspended by plate-shaped elastic section 40 with respect to base section 30 mechanically displaces due to the magnetic attractive force generated, when energization is started, between the electromagnet and facing portions 32a and 32b, which are magnetic bodies, and then free vibration is performed.

As described above, in vibration actuator 10, magnetic attraction force between core 24 and facing portions (magnetic bodies) 32a and 32b generated by turning electricity to coil 22 causes movable section 20 to move to the side of base section 30. This movement generates vibration of movable section 20 by the elastic force (biasing force) generated in plate-shaped elastic section 40, thereby giving the user a sense of touch.

In vibration actuator 10, core 24 around which coil 22 is wound is movably supported with respect to base section 30 in the Z direction by plate-shaped elastic section 40 while coil 22 is inserted into opening portion 38 of base section 30. Vibration actuator 10 can be configured only by stacking core 24 having a thin plate shape, the portion of coil 22 on core 24, plate-shaped elastic section 40, and base section 30. Thus, vibration actuator 10 can be configured in a thin plate shape, thereby achieving space saving in the arrangement space. Further, the present configuration has a thinner configuration as compared to a configuration in which a portion that generates magnetism to drive the movable section in the Z direction is stacked in the Z direction, such as a configuration in which the coil and the magnet are disposed to face each other in the Z direction.

Further, core 24 having a plate shape is disposed to face facing portions 32a and 32b of base section 30 in the vertical direction, and movable section 20 is held so as to be vertically movable (in the vibration direction) through plate-shaped elastic section 40, which is a plate spring disposed between core 24 and base section 30. Thus, core 24 is supported so as to be capable of vibrating while a space corresponding to the thickness of plate-shaped elastic section 40 with respect to base section 30 is secured as a gap for the amplitude.

Base section 30 has a plate shape in which opening portion 38 (opening) is provided, and into opening portion 38, coil 22 is inserted so as to be movable in the facing direction. Around opening portion 38 in base section 30, fixing portion 36 is provided for fixing base section 30 to a vibration presentation section (for example, pad main body 110 and 110A in FIGS. 14 to 16) that receives an pressing operation by the user or to a placement portion (for example, bottom section 120 in FIGS. 14 to 16) where the vibration presentation section is disposed. Plate-shaped elastic section 40 extends outside fixing portion 36 so as to surround base section 30. Thus, plate-shaped elastic section 40 can be elastically deformed without interfering with the fixing of base section 30, and further, a stroke for the elastic deformation can be secured.

Further, in vibration actuator 10, base section 30, plate-shaped elastic section 40, movable section 20, and constituent elements such as weight section 26 are all assembled in the Z direction, that is, in the thickness direction. This makes assembly easy and allows for manufacturing of the vibration actuator in which variations at the time of assembly are less likely to occur and which can be driven stably.

Further, vibration actuator 10 has a configuration in which the distance between core 24 and base section 30 is secured by the thickness of plate-shaped elastic section 40. This eliminates the need to provide another member to have a distance between core 24 and base section 30, the number of components can be further reduced, and it is further possible to achieve size reduction, simplification of assembly, and cost reduction.

Further, since plate-shaped elastic section 40 is a plate spring whose thickness is highly accurate in manufacturing, the gap between core 24 and base section 30 (specifically facing portions 32a and 32b) is secured as a gap with little variation and a stable gap. Since core 24 has a configuration in which the front surfaces of both end portions 24a and 24b are exposed, an increase in weight on the side of movable section 20 can be easily performed by using the space on the front surface.

Further, since vibration is generated by linearly reciprocating movable section 20 without using a magnet, cost reduction can be achieved as compared to the configuration using a magnet.

Further, this configuration reduces the number of components and makes manufacturing easy.

Vibration actuator 10 can be easily assembled, has a reduced thickness, and can suitably vibrate while being disposed in a space-saving manner. In addition, vibration actuator 10 can be made thin and small, and can provide a suitable sense of touch corresponding to the user's pressing operation to the vibration presentation section.

<Drive Principle of Vibration Actuator 10>

Hereinafter, a driving principle of vibration actuator 10 will be described briefly. Vibration actuator 10 can also be driven by generating a resonance phenomenon with a pulse using the following motion equation and circuit equation. Note that, the operation is not resonance driving, and represents the operational sense on the trackpad (see FIG. 13) as vibration presentation device 100, and vibration actuator 10 may be driven, for example, by inputting a current pulse (may be one or a plurality of pulses) via a control device (not illustrated).

Note that, movable section 20 in vibration actuator 10 performs reciprocating motion based on Equations 1 and 2.

[1]
$$m\frac{d^2x(t)}{dt^2} = K_f i(t) - K_{sp}x(t) - D\frac{dx(t)}{dt} \quad \text{(Equation 1)}$$

m: mass [kg]
x(t): displacement [m]
$K_f$: thrust constant [N/A]
i(t): current [A]
$K_{sp}$: spring constant [N/m]
D: damping coefficient [N/(m/s)]

[2]
$$e(t) = Ri(t) + L\frac{di(t)}{dt} + K_e\frac{dx(t)}{dt} \quad \text{(Equation 2)}$$

e(t): voltage [V]
R: resistance [Ω]
L: inductance [H]
$K_e$: counter electromotive force constant [V/(rad/s)]

That is, mass m [Kg], displacement x(t) [m], thrust constant $K_f$ [N/A], current i(t) [A], spring constant $K_{sp}$ [N/m], damping coefficient D [N/(m/s)], and the like in vibration actuator 10 can be appropriately changed within a range satisfying Equation 1. Further, voltage e(t) [V], resistance R [Ω], inductance L [H], and counter electromotive force constant $K_e$ [V/(rad/s)] may be appropriately changed within a range satisfying Equation 2.

As described above, the vibration of vibration actuator 10 is determined by mass m of movable section 20 and spring constant $K_{sp}$ of the metal spring (plate spring in the present embodiment) as plate-shaped elastic section 40. Further, the vibration generated by vibration actuator 10 can be set according to the input voltage (pulse) and, in a case where a vibration damping section (damper section 190 or the like illustrated in FIG. 14) is provided, the damping degree of the vibration damping portion.

In addition, in vibration actuator 10, the joining of base section 30 and plate-shaped elastic section 40 and the joining of plate-shaped elastic section 40 and movable section 20 are performed with an adhesive as a fastening member or by welding or the like. A screw may be used as the fastening member.

<Drive Circuit for Vibration Actuator 10>

Figure 12:
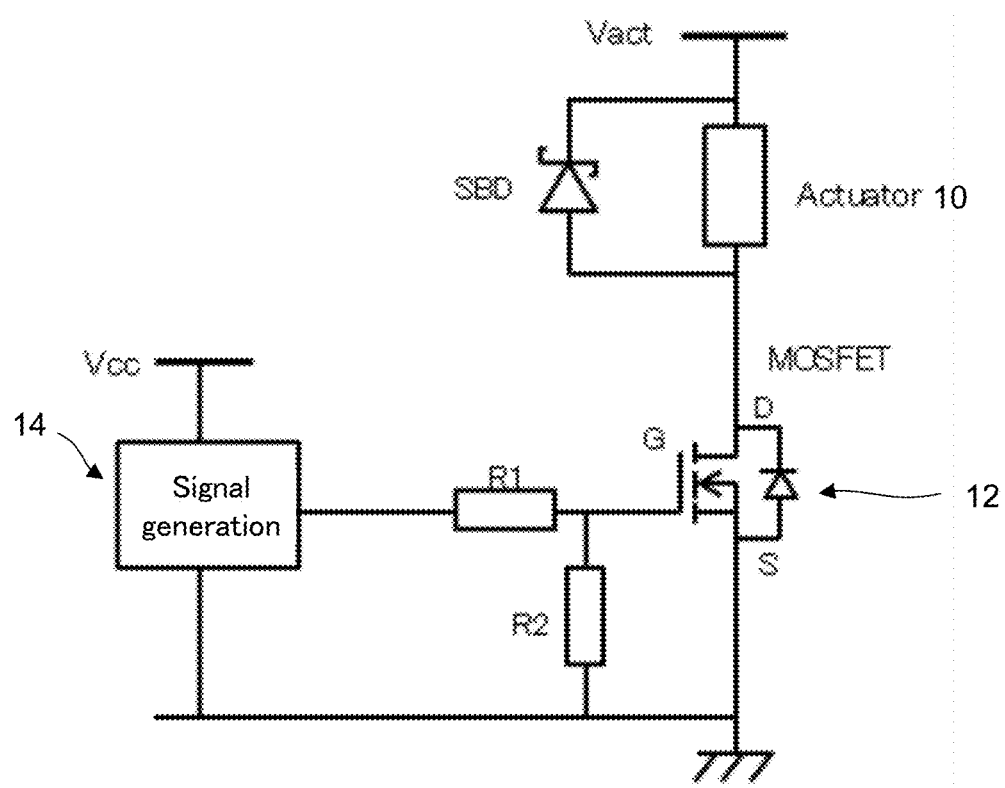
FIG. 12 is a diagram illustrating an example of a drive circuit for an actuator main body.

FIG. 12 illustrates an example of the drive circuit in the actuator main body.

The drive circuit illustrated in FIG. 12 is included in, for example, a control unit. The drive circuit includes switching element 12 as a current pulse supply unit configured by a MOSFET (metal-oxide-semiconductor field-effect transistor), signal generation 14 as a voltage pulse application unit, resistors R1 and R2, and SBDs (Schottky Barrier Diodes).

In the control unit, signal generation unit 14 connected to power source voltage Vcc is connected to a gate of switching element 12. Switching element 12 is a discharge switch. Switching element 12 is connected to vibration actuator 10 (indicated by (Actuator) in FIG. 12) and SBD, and is connected to vibration actuator 10 to which a voltage is supplied from power source unit Vact.

When the input of the actuator drive signal is stopped, this vibration actuator 10 releases the biasing force and moves movable section 20 to the side of the other direction (Z-direction plus side) by the biasing force. Vibration actuator 10 vibrates movable section 20 by inputting and stopping the actuator drive signal. Vibration actuator 10 vibrates movable section 20 without using a magnet.

Note that, in the embodiment, the actuator drive signal corresponds to a drive current pulse (also referred to as "current pulse") supplied to coil 22 as a drive current that drives the movable section and the operation equipment. In vibration actuator 10, when a current pulse is supplied to coil 22, movable section 20 moves in one direction and is mechanically displaced by the magnetic attractive force between the electromagnet of movable section 20 and facing portions 32a and 32b of base section 30, the supply is stopped, and then movable section 20 freely vibrates. The vibration generated by this action is given to the operation equipment. Plate-shaped elastic section 40 can control the displacement and the free vibration period caused by the magnetic attractive force.

Further, the actuator drive signal is generated by inputting a signal from a detector that detects an operator's operation. The detector may use, for example, a pressure sensitivity sensor that detects pressing by the operator as a pressure signal, converts the pressure signal into an electrical signal, and outputs the signal. Further, the detector may be a proximity sensor or the like that detects a capacitive type and the position of the finger (pressing object) of the operator who performs an operation of pressing the vibration presentation section by detecting a capacity coupling between the detector and the finger.

<Vibration Presentation Device 100>

Figure 13:
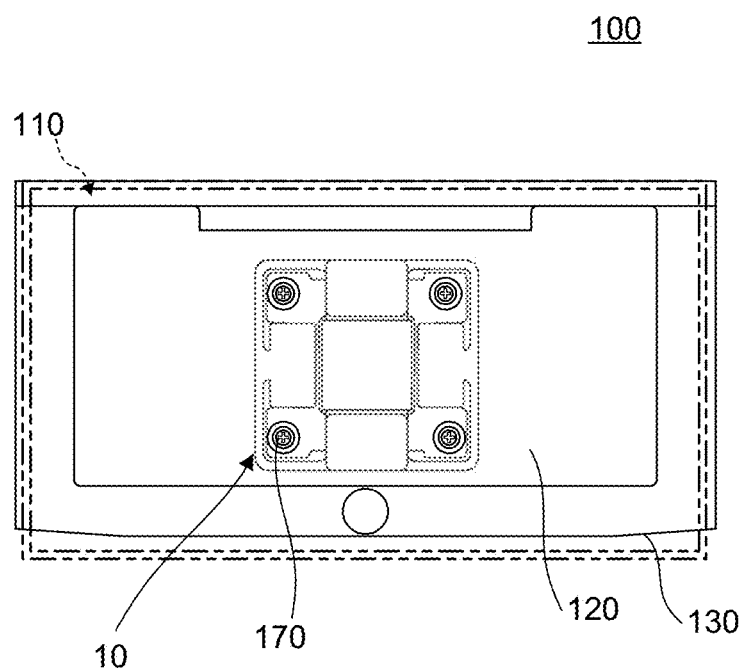
FIG. 13 is a perspective view of an exemplary vibration presentation device including the vibration actuator.

FIG. 13 is a plan view of an exemplary vibration presentation device including a vibration actuator. Note that, in FIG. 13, a planar trackpad main body operated by the operator with a finger is transparently illustrated for convenience.

Vibration presentation device 100 is, for example, a trackpad used as a pointing device instead of a mouse in a notebook computer or the like.

The trackpad as vibration presentation device 100 is disposed in a rectangular opening portion provided in a housing such as a notebook computer. The trackpad includes: pad main body 110 that has a plate shape and is traced with a finger as a contact operation; vibration actuator 10 that is disposed at a back surface of pad main body 110; and frame section 130 that surrounds vibration actuator 10.

In the trackpad, when the operator performs a touching operation such as tracing or patting pad main body 110 with a finger, vibration actuator 10 gives vibration, which serves as a sense of touch.

Figure 14:
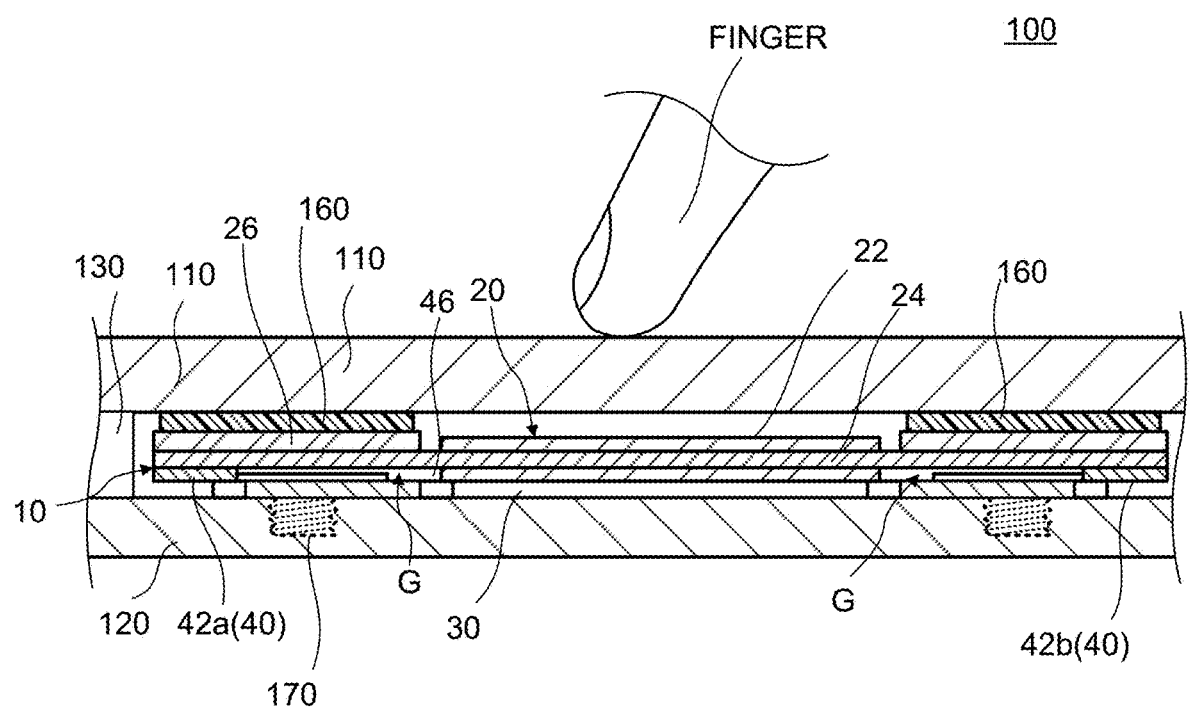
FIG. 14 is a schematic cross-sectional view of a main configuration of the vibration presentation device.

Vibration actuator 10 in the trackpad is attached so as to directly drive pad main body 110 together with movable section 20 to give vibration. Specifically, as illustrated in FIG. 14, base section 30 is fixed to bottom section 120 of the opening portion of the housing through screw 170 as a fastening material, and movable section 20 is fixed to the side of pad main body 110.

Pad main body 110 is disposed on bottom section 120 via frame section 130 disposed so as to surround vibration actuator 10. Pad main body 110 is disposed on movable section 20, and is fixed at a central portion to weight section 26 of movable section 20 through double-sided tape 160 as a fixing material.

The outer peripheral portion of pad main body 110 is attached to frame section 130 via damper section (buffer section) 190 so that pad main body 110 can move with respect to the housing. Damper section 190 is constituted of, for example, elastomers or the like, but may be configured in any manner as long as damper section 190 can support pad main body 110 so that pad main body 11 can be displaced along with the driving of vibration actuator 10.

Figure 15A:
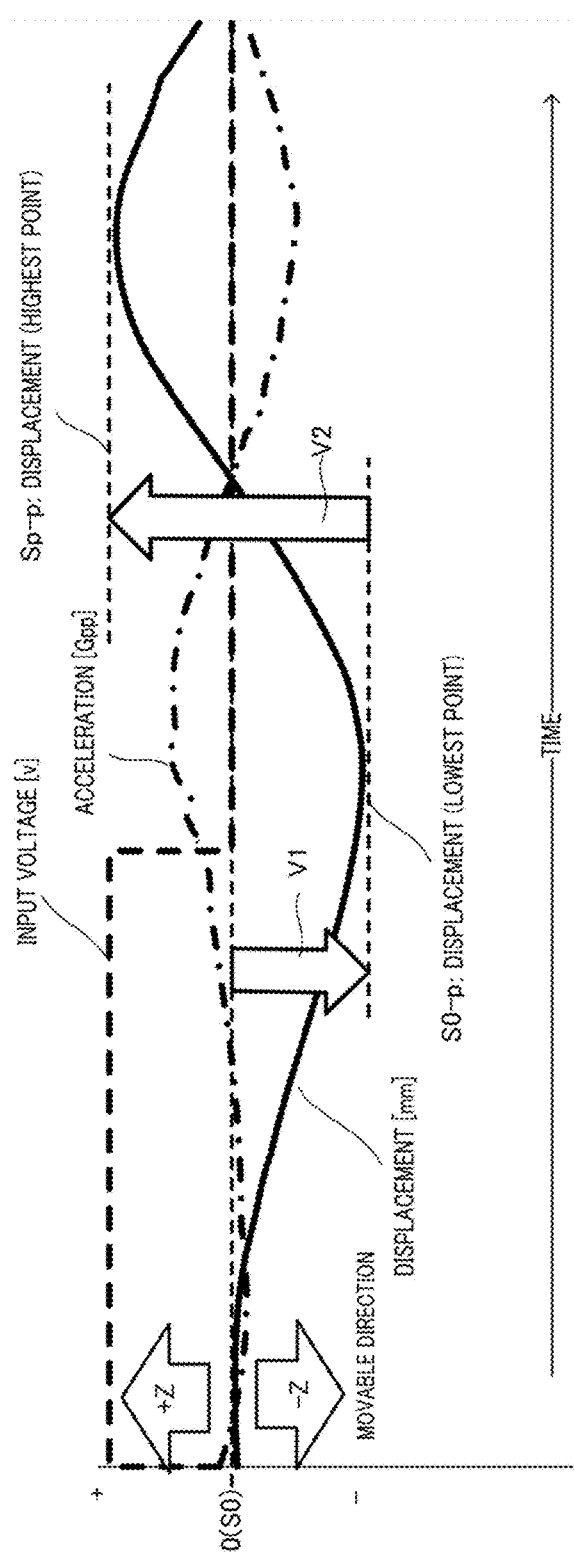
FIGS. 15A and 15B are diagrams illustrating a sense of touch given by the vibration presentation device in a time series of images.
Figure 15B:
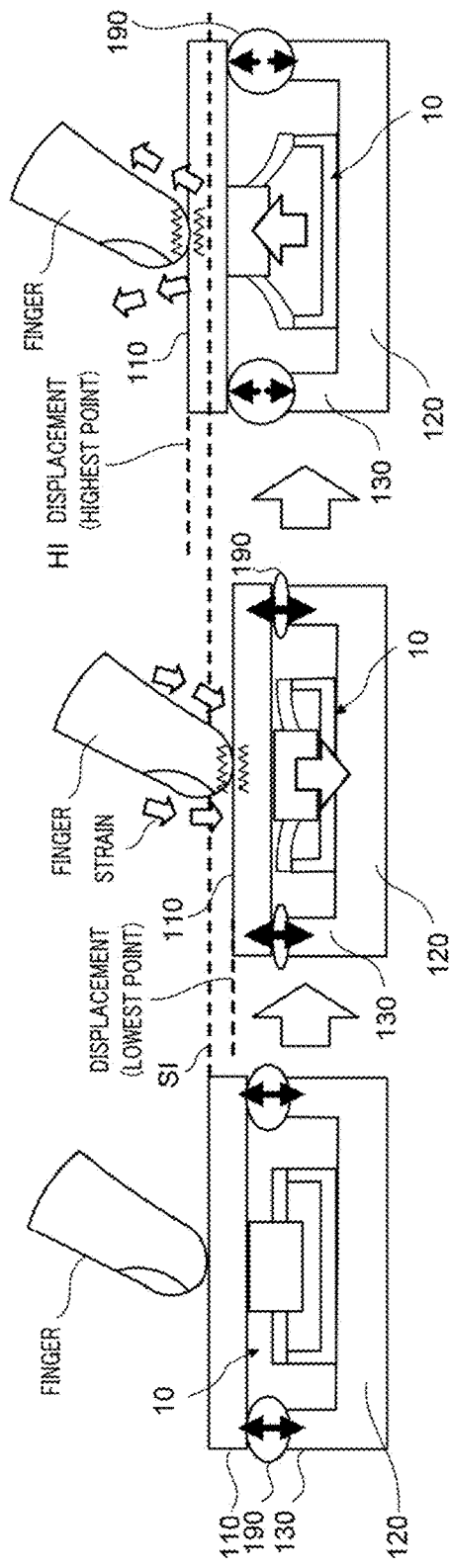

FIG. 15 is a diagram illustrating a sense of tough given by vibration presentation device 100 as chronological images. FIG. 15A illustrates the relationship in a time series between the input voltage, the acceleration of movable section 20, and the displacement of movable section 20 when the sense of tough is generated, and FIG. 15B is a schematic view of a specific operation state corresponding to FIG. 15A. In the trackpad as vibration presentation device 100, an operation of tracing pad main body 110 or an operation of tapping pad main body 110 such as clicking, is performed with a finger. The operation is detected as a strain by a strain sensor as a pressure sensitivity sensor.

Immediately after this operation is started, as illustrated in FIG. 15, a signal (actuator drive signal) is output to the vibration actuator by sensing pressure sensitivity (see input voltage in FIG. 15A), and movable section 20 and pad main body 110 attached to movable section 20 start to move in the pressing direction (−Z direction). Vibration actuator 10 is driven in the pressing direction in this manner. Then, the acceleration of movable section 20 and pad main body 110 in the pressing direction increases by vibration actuator 10, pad main body 110 is displaced in the pressing direction, that is, in the direction in which pad main body 110 is pushed down, and reaches the lowest point (S0-p). At this time, an operator is given an operational sense such as a pressing sense to the finger.

Then, when vibration actuator 10 is in the non-driven state, pad main body 110 moves to a position (displacement Sp-p) equal to or more than the operation reference position, which is the initial position (the same as still position SI in FIG. 11), by the reaction force of plate-shaped elastic section 40. Thus, a gap is generated by the difference in vectors (V1, V2) by acceleration and displacement, a strong sense of touch can be given to the finger, and a sense of tough corresponding to the operation can be given to the operation target. For example, in the case of an operation of pressing a switch, a sense of pressing the switch can be provided. Note that, since base section 30 is fixed to bottom section 120, which is a placement portion of a housing of a trackpad and has high rigidity, the vibration transmitted from movable section 20 to bottom section (configuration) 120 via base section 30 is counteracted, and the reaction force is transmitted to the side of pad main body 110 as vibration. The vibration generated as described above is efficiently transmitted to the user's finger.

In vibration presentation device 100, damper section 190 is preferably provided between pad main body 110 and frame section 130 with being crushed in advance, that is, being contracted, to keep the connection state with pad main body 110 when movable section 20 is driven and vibration (displacement, strain) is generated with respect to pad main body 110. This can cause the effect of amplifying and damping vibration using the repulsive force of damper section 190.

Note that, in a configuration of vibration presentation device 100, vibration actuator 10 may be attached so as to indirectly drive pad main body 110 through movable section 20 to give vibration.

Figure 16:
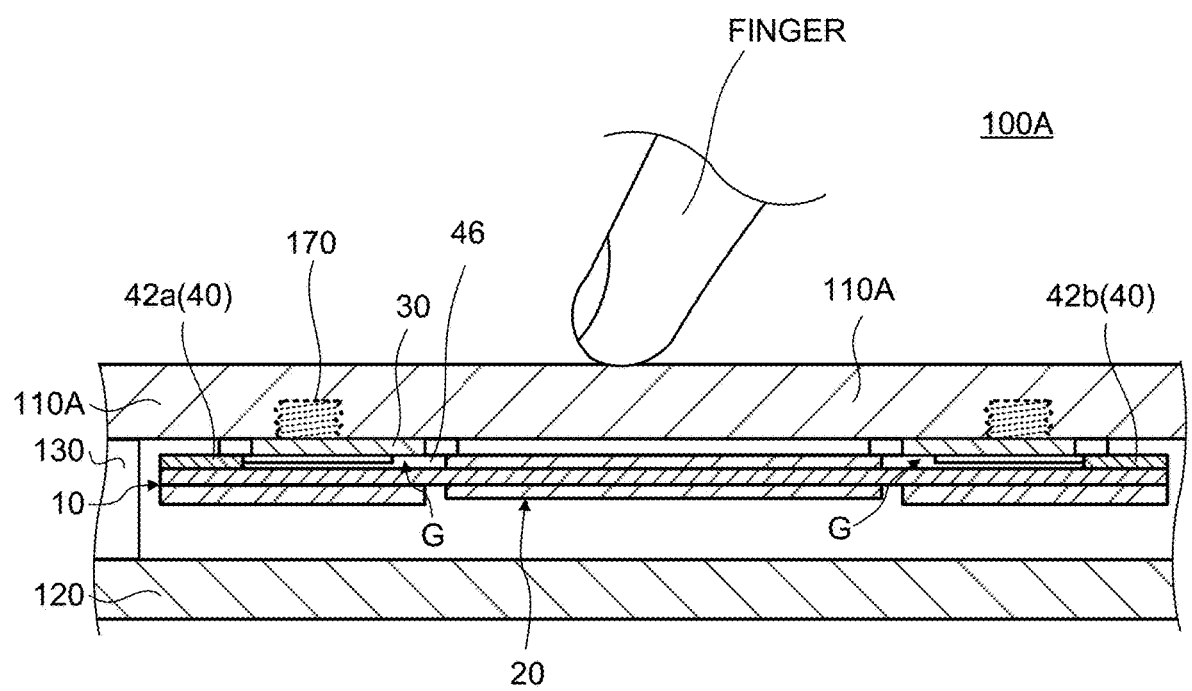
FIG. 16 is a schematic cross-sectional view of a variation of the vibration presentation device.

FIG. 16 is a schematic cross-sectional view of a variation of the vibration presentation device.

In the trackpad as vibration presentation device 100A, the base section of vibration actuator 10 is attached to pad main body 110 in vibration presentation device 100.

In vibration presentation device 100A, frame section 130 is disposed on bottom section 120 of the opening portion of the housing, and pad main body 110A having flexibility is disposed on frame section 130.

In frame section 130, base section 30 of vibration actuator 10 is fixed to the back surface of pad main body 110A with screw 170 inserted into fixing portion 36.

Vibration actuator 10 is disposed with movable section 20 being directed downward, and a gap, which serves as a movable region of movable section 20, is formed in a space between this movable section 20 and bottom section 120.

When a touching operation such as tracing or tapping pad main body 110 with a finger is performed in this configuration, this operation is detected by a pressure sensitivity sensor. Immediately after the operation is started, an input signal (actuator drive signal) is input from the pressure sensitivity sensor to the vibration actuator, and movable section 20 begins to move in the pressing direction (Z direction). Next, pad main body 110 is displaced in the direction in which pad main body 110 is pushed down, and reaches the lowest point. Movable section 20 causes, by the reaction force of the spring, pad main body 110 to move to the position (the same position as position Sp-p) equal to or more than the operation reference position, which is the initial position. Thus, a gap is generated by the difference in vectors (V1, V2) by acceleration and displacement, a strong sense of touch can be given to the finger, and a sense of tough corresponding to the operation can be given to the operation target. For example, in the case of an operation of pressing a switch, a sense of pressing the switch can be provided.

As described above, in vibration presentation device 100, specifically when a pressing object such as a finger pad of an operator touches and operates pad main body 110 of a track pad, vibration actuator 10 is driven to vibrate corresponding to this operation. This vibration gives the operator a sense of touch.

In a case where electronic equipment including a trackpad is provided with a display such as a liquid crystal display, vibration actuator 10 may give various kinds of senses of touch to the trackpad depending on the display image operated by the operator. For example, vibration actuator 10 may generate vibration so as to give a sense of touch of a mechanical switch corresponding to an image that is a target to be touched and operated. The mechanical switch is, for example, a tactile switch, an alternate switch, a momentary switch, a toggle switch, a slide switch, a rotary switch, a DIP switch, a rocker switch, or the like. Further, a push-type switch can give senses of touch of switches whose degrees of pushing are different from each other.

As described above, vibration presentation device 1 of the present embodiment realizes a realistic sense of touch expression, such as a sense of touch of a switch, with a realistic sense of touch expression based on load detection.

<Other Variations>

Each of the following other variations is formed by changing a part of the configuration of vibration actuator 10 described above, adding a part to the configuration of vibration actuator 10, or the like, and when each of the other variations has the same function as the components described above, the same name and the same reference numeral are given and the description thereof will be omitted. Further, hereinafter, the above-described configuration elements will be referred to by different names for convenience. Specifically, the configuration in which coil 22 is disposed on core 24 is hereinafter referred to as electromagnet D according to its function, the plate-shaped elastic section (elastic support section) is referred to as an elastic body. Further, specifically, the plate-shaped base section is referred to as a base, more specifically, a base plate, the base-section-side fixing portions is referred to as a plate connection portion, the movable-section-side fixing portion is referred to as a core connection portion, and the weight section is referred to as a weight or a weight plate.

As a material for each component having the configuration of the embodiment described above, a coil has high conductivity and is made of, for example, copper. The core is made of a material having magnetic permeability (which is a ferromagnetic body and simply referred to as a magnetic body) and is preferably made of SECC, a silicon steel plate, SUS, or the like. The plate-shaped elastic section and the elastic body are preferably non-magnetic bodies, and as a non-magnetic material that constitutes the plate-shaped elastic section and the elastic body, SUS, phosphor bronze, resin, rubber, or the like may be applied. Further, the base section and the base plate are preferably made of a material having high magnetic permeability, such as SECC, a silicon steel plate, or SUS (ferromagnetic SUS). The weight section, the weight, and the weight plate are formed of a material having high relative density, such as phosphor bronze, SUS, or tungsten.

Each of the following vibration actuators has a basic configuration similar to that of vibration actuator 10. Each vibration actuator basically includes: a plate of a magnetic body; an electromagnet which is disposed on the plate and in which a coil is disposed at a central portion of a core; and an elastic body that supports the core at the both sides of the coil and is connected to the plate.

The electromagnet may have a flat plate shape, and the elastic body may have a flat plate shape and may support the electromagnet while the axis of the coil is disposed parallel to the plate and a space is provided between the coil and the plate.

The plate may have, in a region corresponding to the coil, an opening, which serves as a part of a vibration space of the electromagnet. In the vibration actuator, one of a coil and a plate vibrates by being displaced to be close to the other, by a magnetic force generated by energization of an electromagnet. For example, the coil and the core may be displaced to the side of the plate and vibrated, or the plate may be displaced to the side of the coil and the core and vibrated.

Further, each vibration actuator defines the vibration amplitude of electromagnet D in a space formed between the electromagnet and the plate by the spring constant of the plate-shaped elastic section or the elastic body. The vibration amplitude of the electromagnet in a space formed between electromagnet D and the plate is defined by the thickness of the elastic body.

Further, in each vibration actuator, in a case where the elastic body (plate-shaped elastic section) is a rectangular frame-shaped elastic body (frame) as illustrated in vibration actuator 10 of the present embodiment, the elastic body may support the core with one pair of opposite sides and may be connected to the plate with the other pair of opposite sides. Further, the elastic body may include a core connection portion and a plate connection portion, and may be configured to include a pair of core connection portions and a pair of plate connection portions.

1. Other Variations 1, 2, and 3

In vibration actuator 10 in the above-described embodiment, a configuration has been described in which the side of base section 30 having a plate shape is fixed to the back surface of the housing of pad main body 110, and an electromagnetic composed of coil 22 and core 24 is vibrated. However, as in vibration actuator 1010 illustrated in FIGS. 17 and 18, elastic body 1040 having a plate shape may be configured to include bent portions 1046 (the same applies to the bent portions in other variations) between a pair of connection portions (are also "fixing-portion-side fixing portions" and referred to as "plate connection portions") connected to base plate 30 as a base section and connection portions 1042 (are also "movable-section-side fixing portions" and referred to as "core connection portions") connected to core 24. Bent portions 1046 (the same applies to the bent portions in other variations) define the vibration amplitude of electromagnet D in a space formed between electromagnet D and base plate 30.

Figure 17:
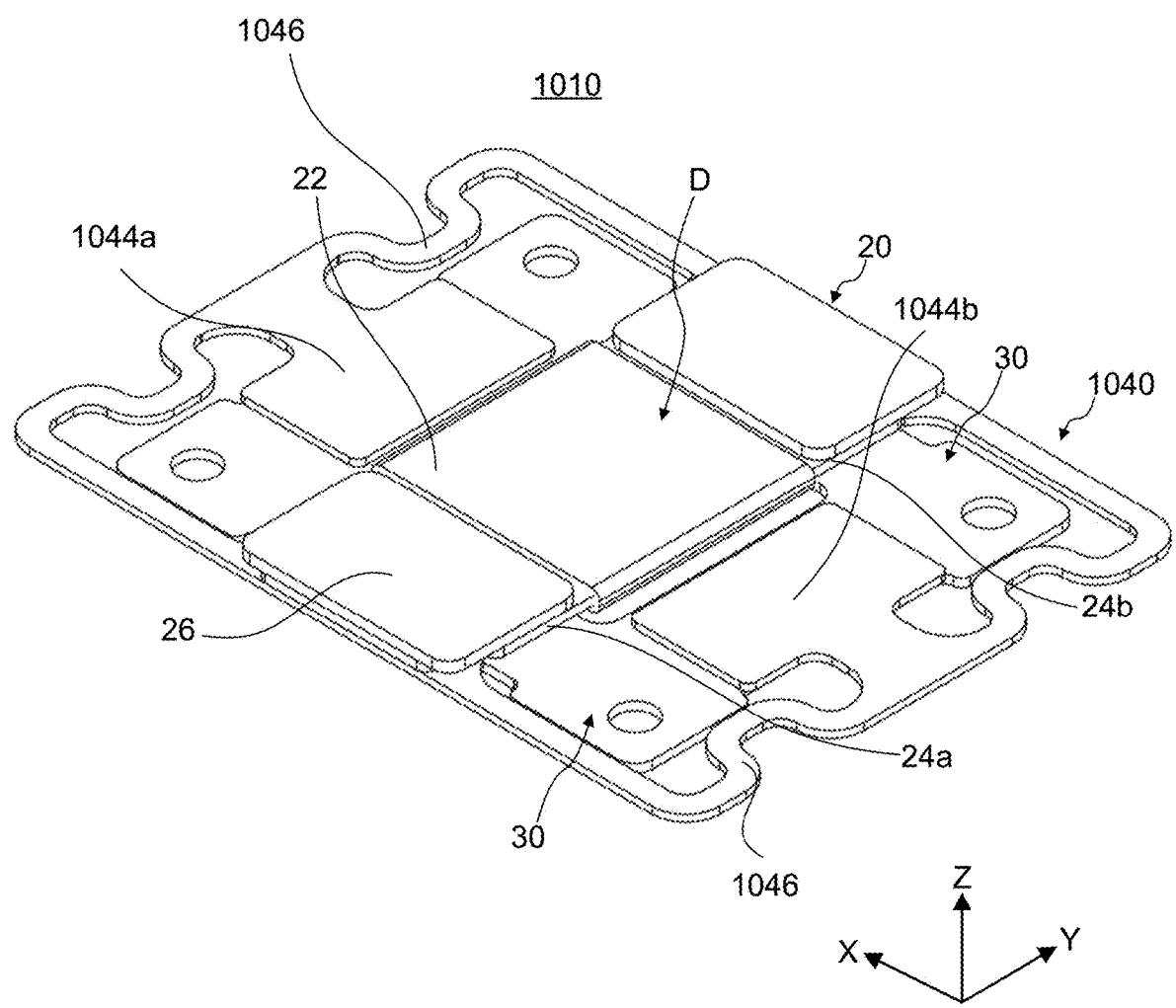
FIG. 17 is a perspective view of other variation 1 of the vibration actuator according to the embodiment of the present invention.
Figure 18:
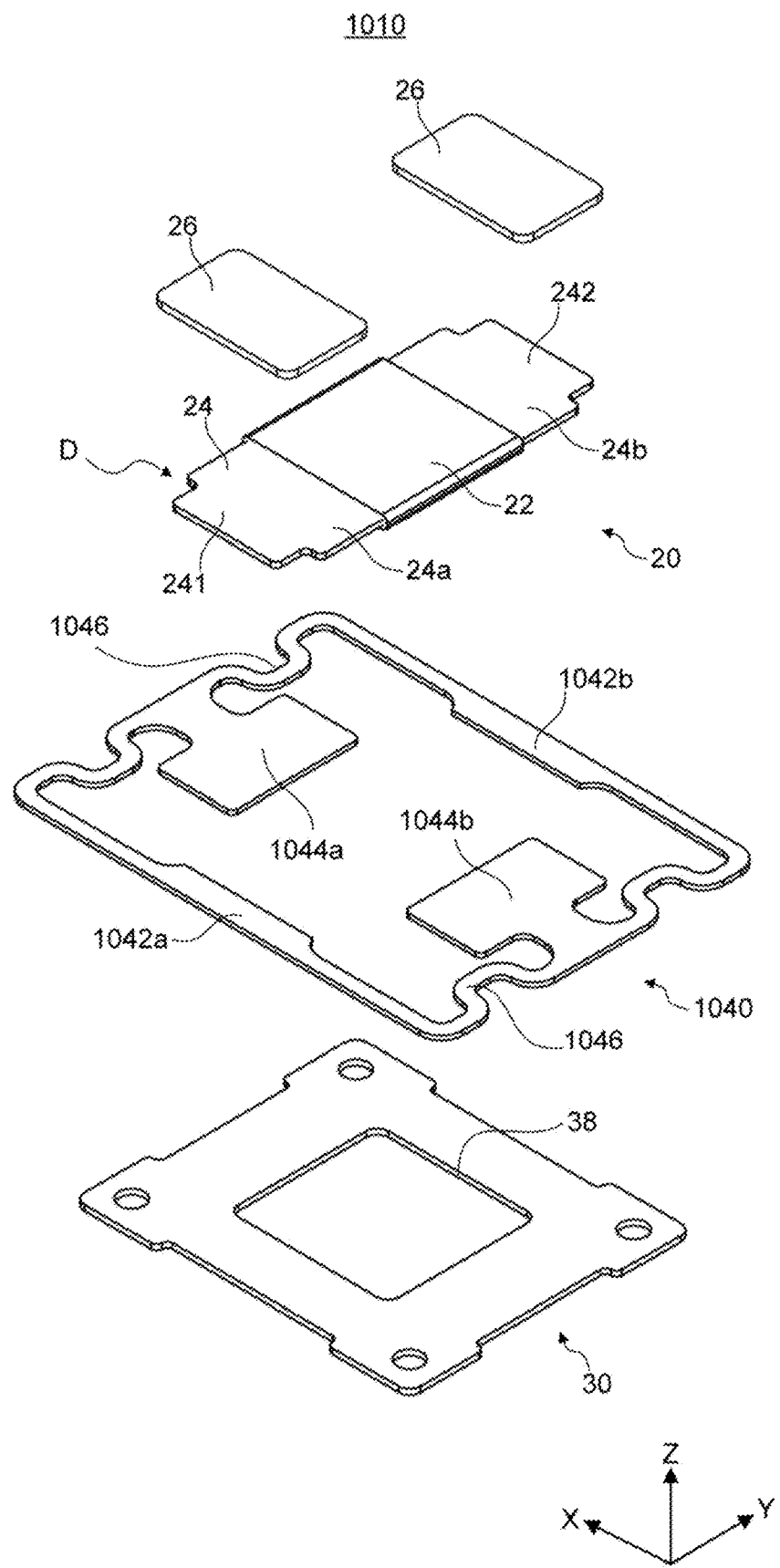
FIG. 18 is an exploded perspective view of other variation 1 of the vibration actuator.

Note that, vibration actuator 1010 illustrated in FIGS. 17 and 18 has a different configuration from that of vibration actuator 10 in that the configuration of plate-like elastic body 1040 is different, and has the same configuration as vibration actuator 10 in other respects. Elastic body 1040 is a plate spring formed in a so-called rectangular frame shape and may be formed of metal or a resin.

Elastic body 1040 includes: core connection portions 1042a and 1042b, which are movable-section-side fixing portions; plate connection portions 1044a and 1044b, which are base-section-side fixing portions; and an elastic main body portion including bent portions 1046 each having a meandering shape. The elastic main body portion connects core connection portions 1042a and 1042b and base-section-side fixing portions 1044a and 1044b together and is elastically deformed.

Bent portion 1046 is disposed as a part of a side parallel to an extending direction of core 24 (axial direction of core 24) constituting electromagnet D with coil 22 in a plan view, and is connected to core connection portions 1042a and 1042b. With this configuration, it is possible to suitably perform elastic deformation by ensuring a length elastically deformable even in a case where the placement space of vibration actuator 1010 is limited.

Figure 19:
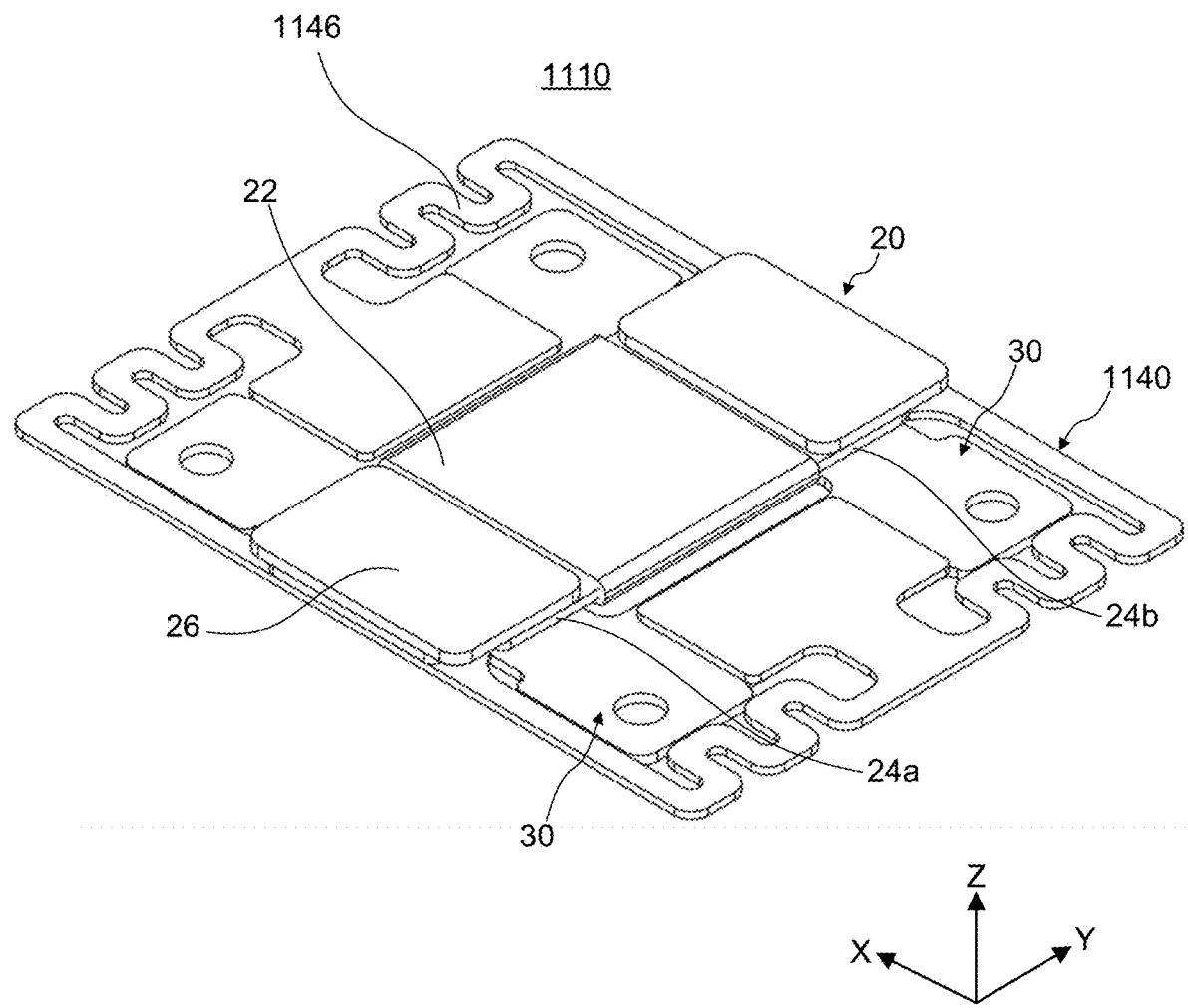
FIG. 19 is a perspective view of other variation 2 of the vibration actuator.

The shape of meandering shape portion 1146 as the bent portion may be, for example, the shape in which the number of bending (folded portions) is increased, as illustrated in elastic body 1140 of vibration actuator 1110 of other variation 2 in FIG. 19. As illustrated in FIG. 19, meandering shape portion 1146 as the bent portion may be provided at each of the pair of opposite sides (opposite sides in which plate connection portion 1044a and 1044b are disposed) extending in the plus and minus Y directions parallel to the axial direction of the core, as illustrated in FIG. 19. Vibration actuators 1010 and 1110 displace the electromagnet (coil 22) to the side of the base plate (base section) 30 and vibrate the electromagnet.

Figure 20:
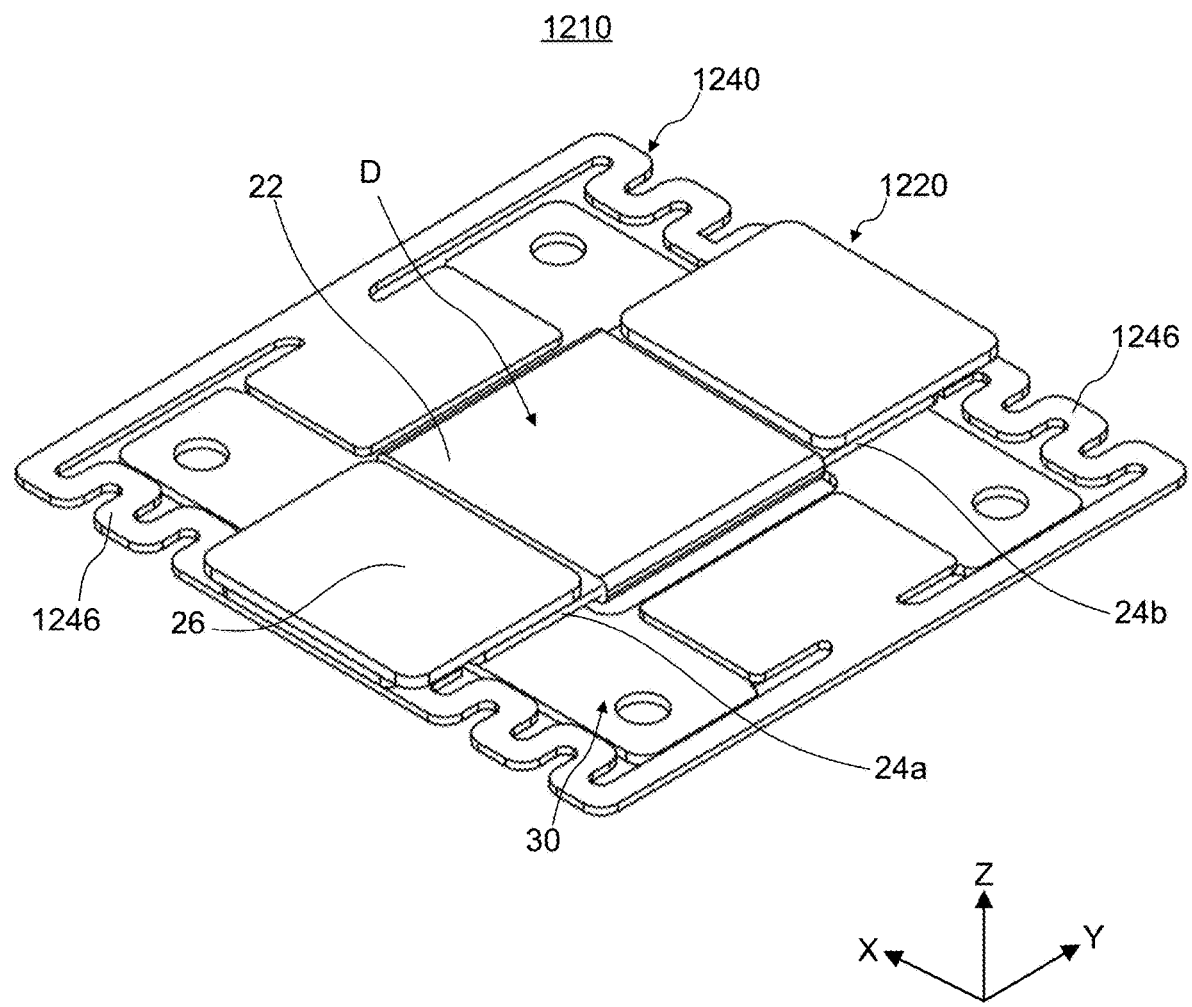
FIG. 20 is a perspective view of other variation 3 of the vibration actuator.

Further, as in vibration actuator 1210 as other variation 3 illustrated in FIG. 20, each of the bent portions described above may be a meandering shape portion 1146 as a bent portion provided in each of a pair of opposite sides (a pair of opposite sides of core connection portions) in a direction orthogonal to the core axis in elastic body 1240 having a square shape. Vibration actuator 1210 includes elastic body 1040, base plate (base section) 30, and movable section 1220 that is electromagnet D including coil 22 and core both end portions 24a and 24b.

Further, elastic body 1040, 1140, and 1240 each having bent portions, and plate-shaped elastic section 40 are rectangular frames, and one pair of opposite sides supports the core and the other pair of opposite sides has a shape connected to the base plate (base section). This configuration eliminates the need to provide a component for disposing other components inside the frame and having a deformation region for the elastic body, thereby reducing the number of components and achieving overall thinning. Further, a process of bending a component at the time of manufacturing the vibration actuator is eliminated, and the vibration actuator itself can be disposed so as not to interfere with other components. In other variations described below, the same effect as the above can be obtained as long as an elastic member that is a rectangular frame is included.

2. Other Variation 4

Figure 21:
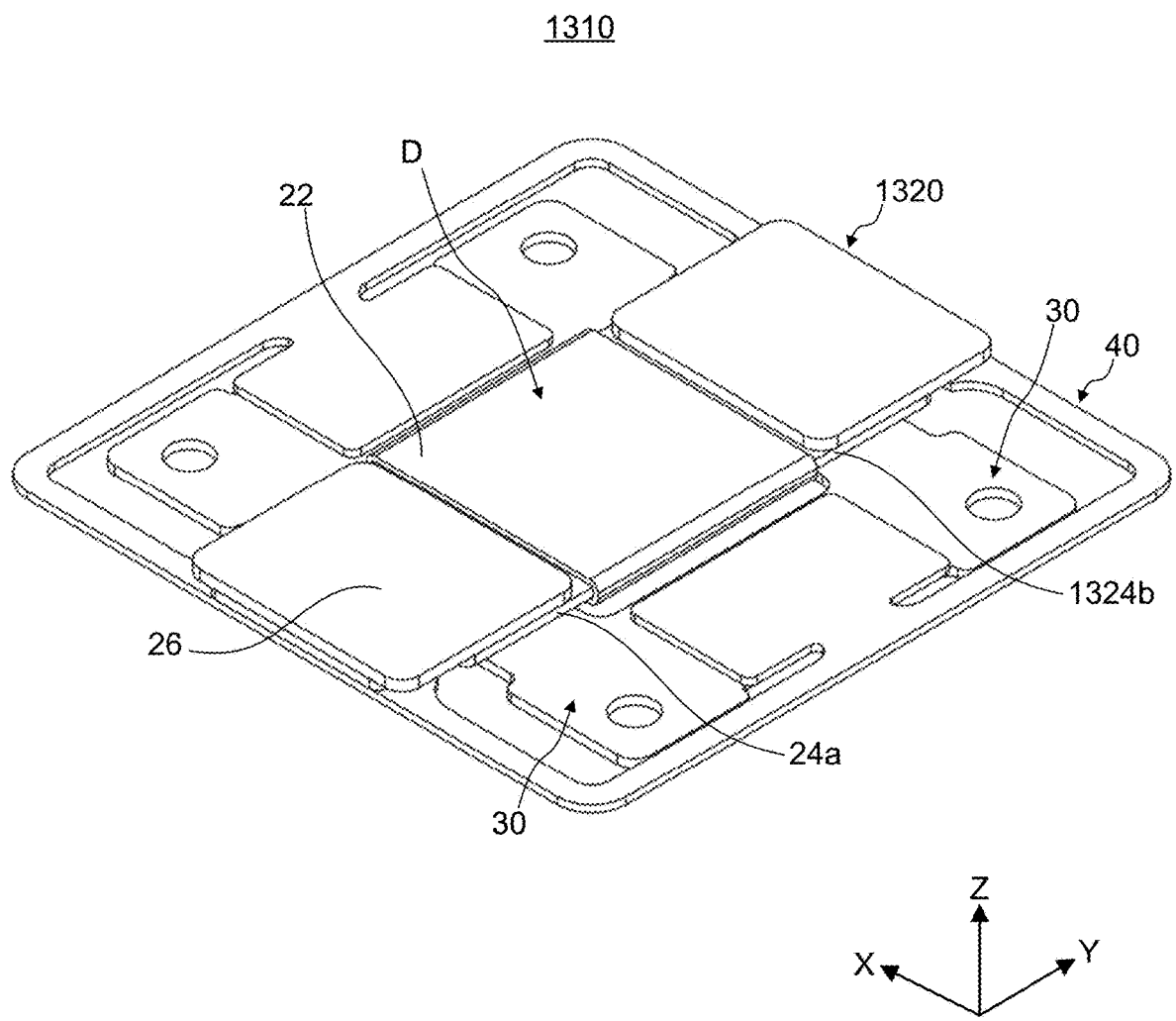
FIG. 21 is a perspective view of other variation 4 of the vibration actuator.
Figure 22:
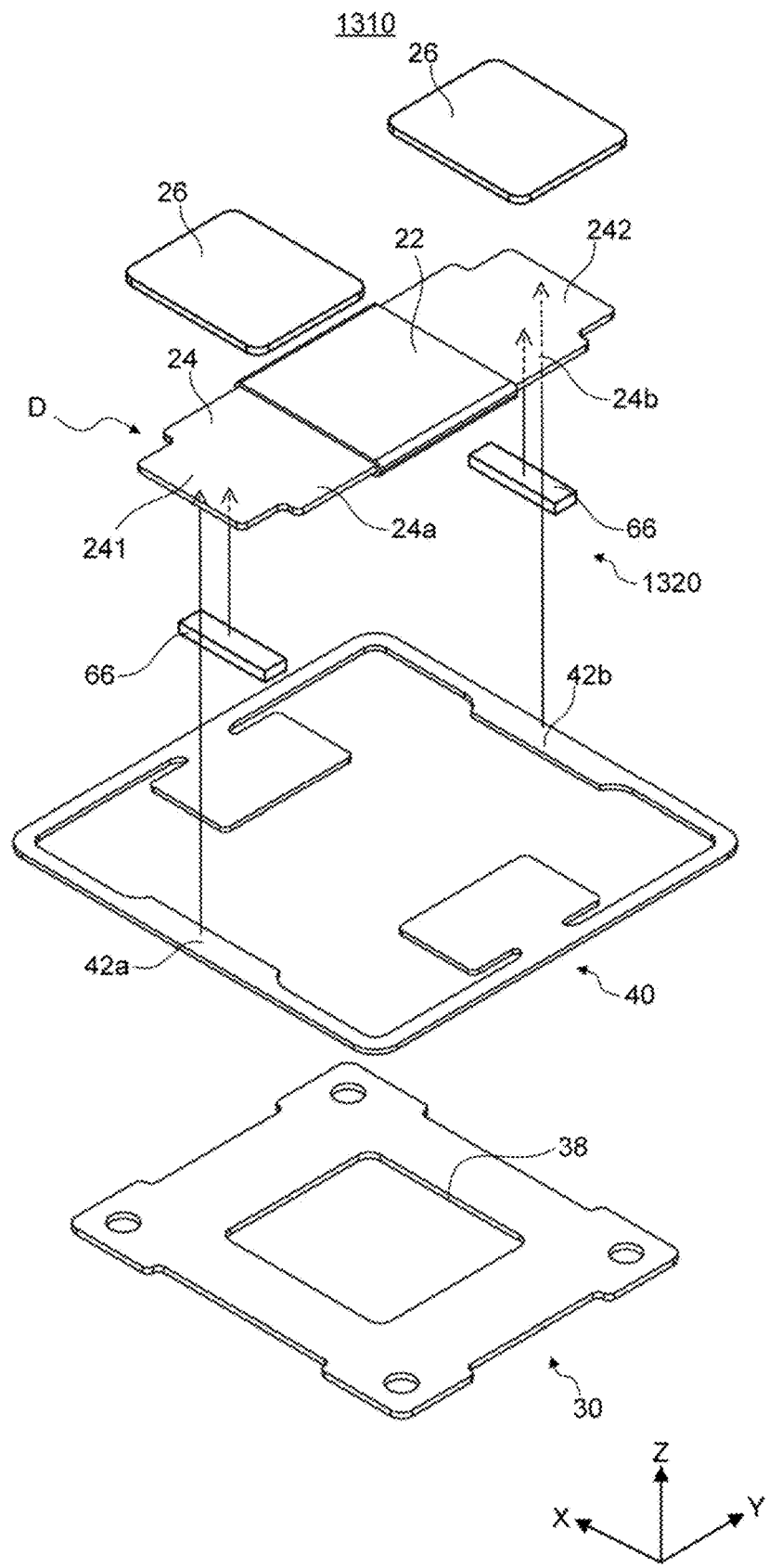
FIG. 22 is an exploded perspective view of other variation 4 of the vibration actuator.

FIGS. 21 and 22 are perspective views of other variation 4 of the vibration actuator according to the embodiment of the present invention.

As in vibration actuator 1310 illustrated in the drawings, damper 66 may be provided for damping vibration caused by a plate spring that is plate-shaped elastic section (elastic body) 40, that is, for controlling vibration of the plate spring, when base plate 30 is attached to the attachment target region (device main body or the like). Note that, the attachment target region is also referred to as a region of a fixation target, and damper 66 is a vibration damping member and is also referred to as a damping member.

Damper 66 is attached to plate-shaped elastic section 40 so as to be interposed between the attachment target region and plate shape elastic portion 40 when vibration actuator 1310 is fixed to the attachment target region. Damper 66 is disposed at the back surface of both end portions 24a and 24b of core 24 of movable section 1320 so as to be adjacent in a surface direction to the back surface of base plate 30 from the position adjacent to spring connection portions 241 and 242.

Damper 66 has a function of damping the vibration of electromagnet D (coil core). Damper 66 may be any damper as long as damper 66 is configured to damp vibration, and may be, for example, thermoplastic elastomers, specifically, a thermosetting silicone rubber or a thermoplastic butyl rubber. By having a configuration in which the vibration of electromagnetic D subsides, that is, damps, in a period of time by damper 66, a clean vibration can be fed back as a feeling of an operation.

The upper surface of damper 66 is fixed to the core, and the lower surface is positioned outside the base and is provided so as to be in contact with the attachment target region on the device side.

3. Other Variation 5

Figure 23:
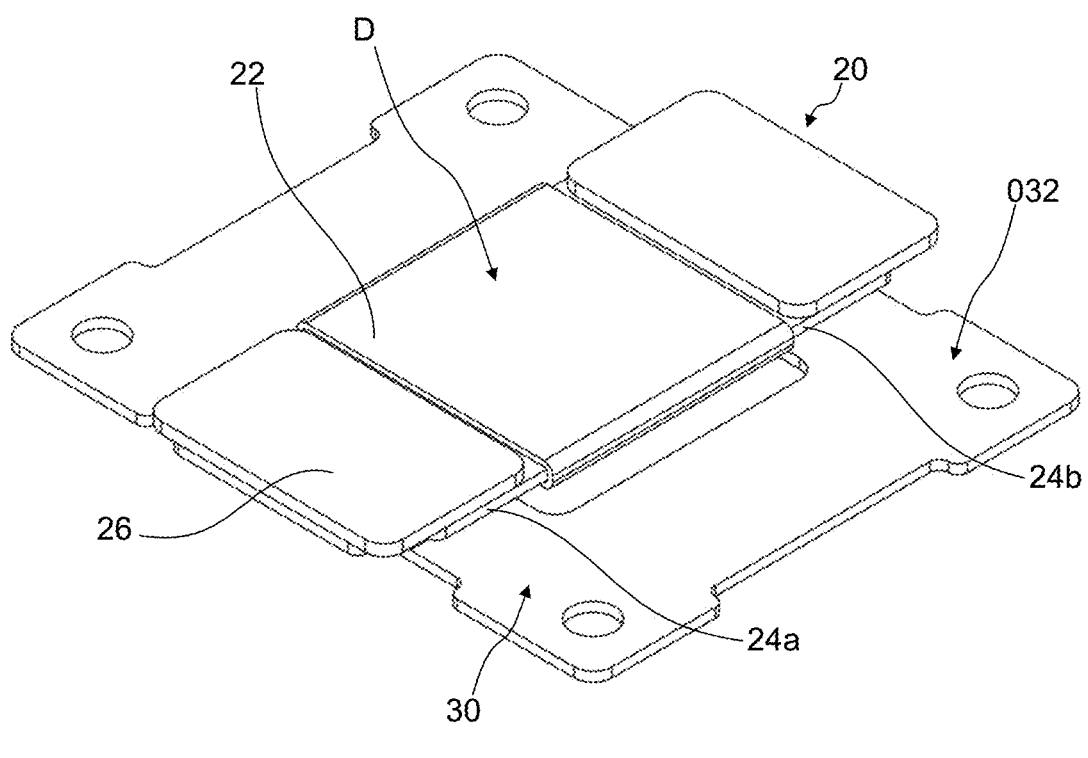
FIG. 23 is a perspective view of other variation 5 of the vibration actuator.
Figure 24:
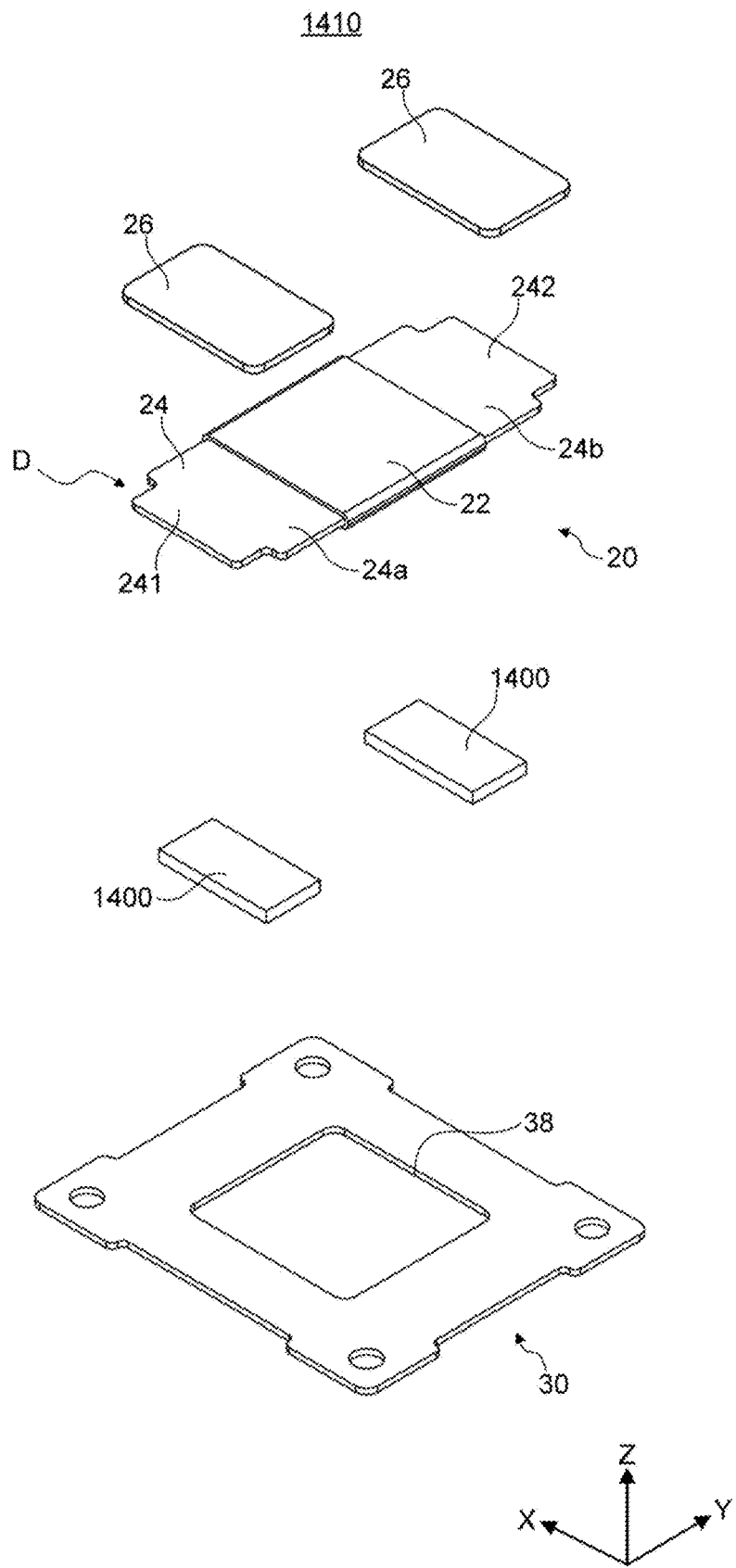
FIG. 24 is an exploded perspective view of other variation 5 of the vibration actuator.

FIGS. 23 and 24 are perspective views of other variation 5 of the vibration actuator according to the embodiment of the present invention.

As in vibration actuator 1410 illustrated in the drawing, elastic bodies 1400 that are made of resins and can contract may be used as elastic bodies disposed between base plate 30 and electromagnet D (core 24 on both sides of coil 22). Elastic bodies 1400 are a pair of flat plates, and support electromagnet D so that electromagnet D can be displaced with respect to base plate 30 in a direction perpendicular to the plate surface.

Note that, vibration actuator 1410 includes: base plate 30, which is a base section; and movable section 20 that has a flat plate shape and is electromagnet D, which is disposed on base plate 30 and in which coil 22 is disposed at the central portion of core 24. In vibration actuator 1410, movable section 20 is vibrated by being displaced toward base plate 30 by the magnetic force generated by energization of coil 22. Further, weight section 26 is appropriately attached to movable section 20.

This configuration allows for easy assembly, reduction in height, and suitable vibration with disposition in a space-saving manner. Further, in a case where elastic body 1400 is constituted by an elastic material such as silicone, the size, the material, and the like can be easily changed, and the function as a spring can be easily adjusted. Further, elastic body 1400 may be formed by applying an elastic material. Elastic body 1400 can be formed only by applying an elastic material between the two members between which elastic body 1400 is interposed.

As described above, elastic body 1400 is a pair of flat-shaped elastic members interposed between base plate 30 and core 24, and thus, vibration actuator 1410 can be manufactured without needing other components or without processing the elastic body.

4. Other Variations 6 and 7

Figure 25:
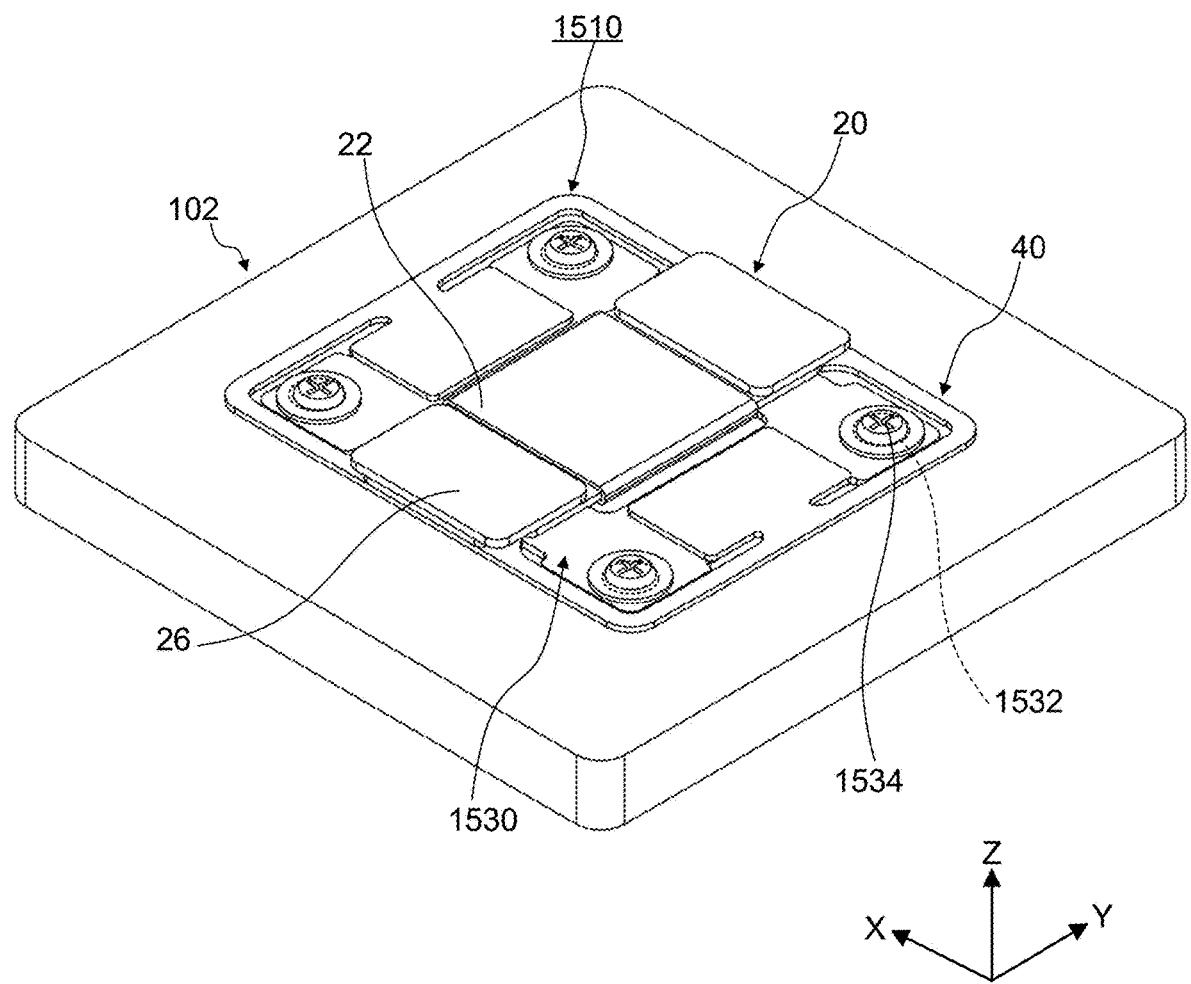
FIG. 25 is a perspective view of other variation 6 of the vibration actuator.

FIG. 25 is a perspective view of other variation 6 of the vibration actuator according to the embodiment of the present invention.

As illustrated, in vibration actuator 1510, base plate 1530 may be a plate having high permeability, and fixing hole 1532 may be provided in this base plate 1530.

Base plate 1530 is fixed to the attachment target (for example, PCB or pad 102) through fixing hole 1532 by fastening member 1534 such as a screw or by an adhesive.

Figure 26:
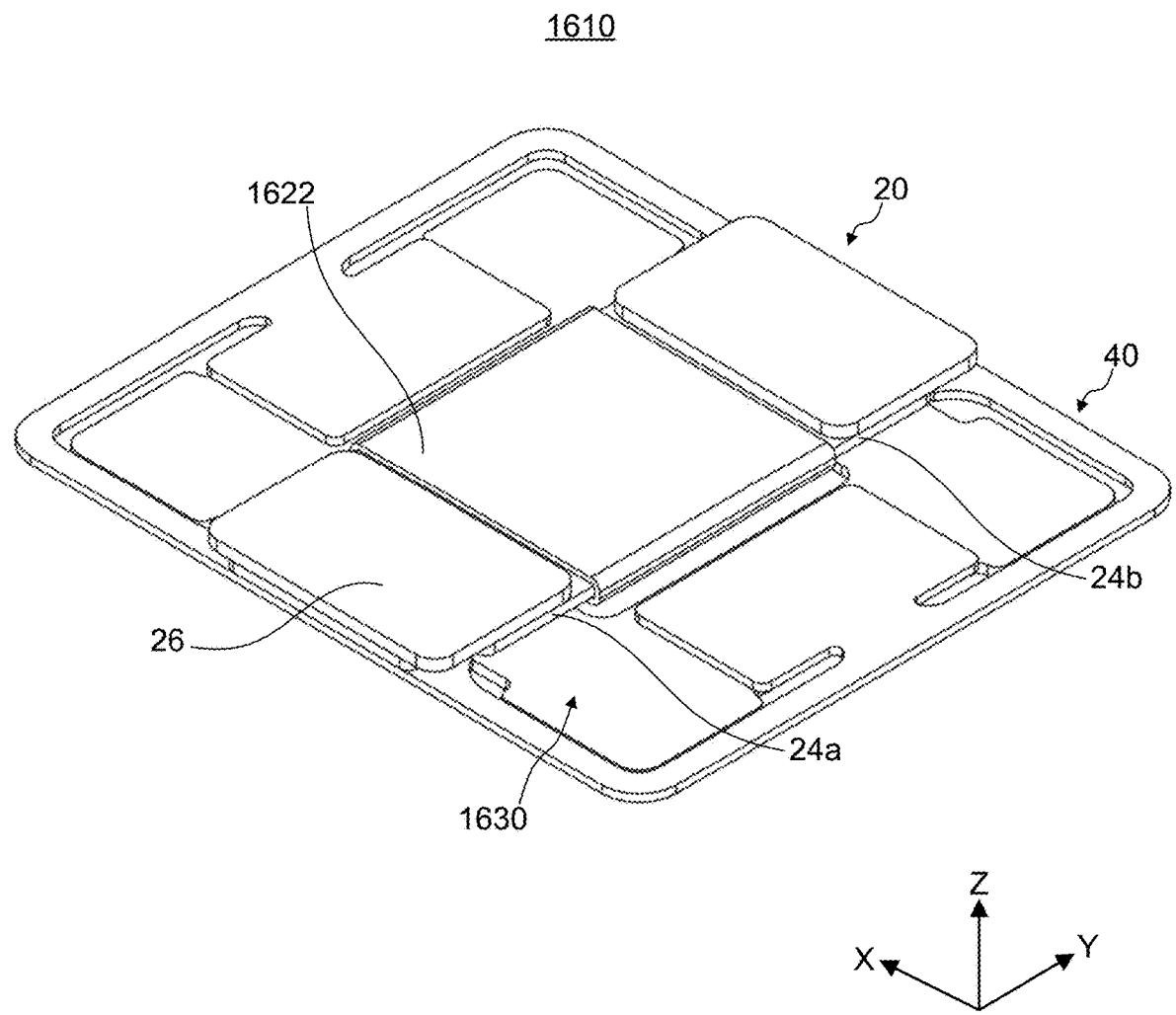
FIG. 26 is a perspective view of other variation 7 of the vibration actuator.

In addition, the position of fixing hole 1532 provided in base plate 1530 is changeable. In a case where the base plate is fixed to the attachment target by an adhesive as in vibration actuator 1610 illustrated in FIG. 26, the vibration actuator may have a configuration including base plate 1630 obtained by eliminating fixing hole 1532 (see FIG. 25) from base plate 1530 (see FIG. 25). This configuration makes it possible to increase, in base plate 1630, the adhesive area with the attachment target and to attach the base plate to the attachment target more firmly than in a case where a fixing hole is provided. Further, according to the configuration, since the portion in which fixing hole 1532 is provided does not function as a magnetic circuit, eliminating the portion for fixing hole 1532 from base plate 1630 can reduce the area of the vibration actuator. This makes it possible to reduce the size of the actuator, or utilize the unoccupied space in the vibration actuator for a spring design in which a spring portion having a meandering shape is disposed to secure the length of the spring (increasing the deformation region).

Figure 27:
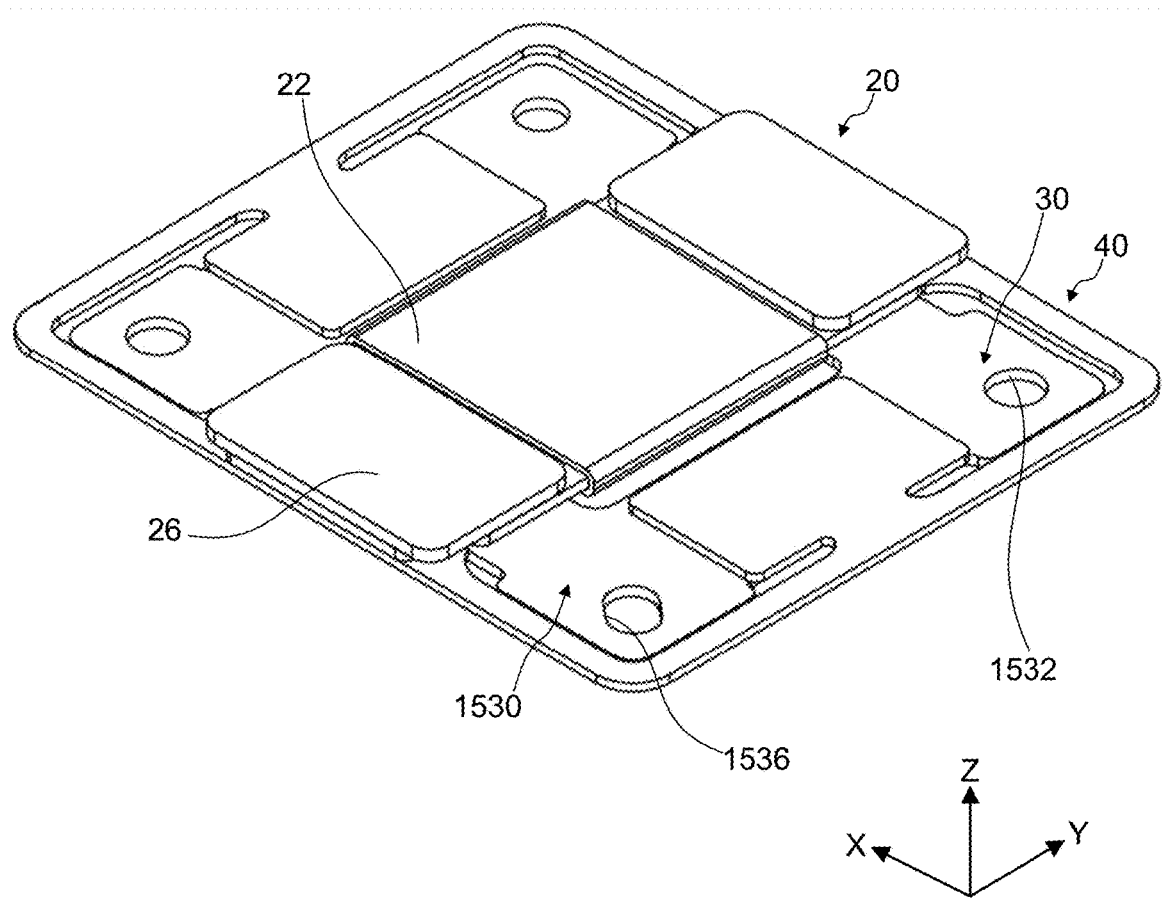
FIG. 27 is a perspective view of other variation 8 of the vibration actuator.

As shown in vibration actuator 1510 of variation 8 illustrated in FIG. 27, any of fixing holes 1532 may be elongated hole 1536 in the same configuration as vibration actuator 1710 (see FIG. 25). With this configuration, when the vibration actuator is fixed to the attachment target such as pad 102, positioning can be performed while fastening members 1534 is inserted into fixing holes 1532 and elongated hole 1536 for temporary fastening and the vibration actuator can be fixed to the desired position.

5. Other Variation 9

Figure 28:
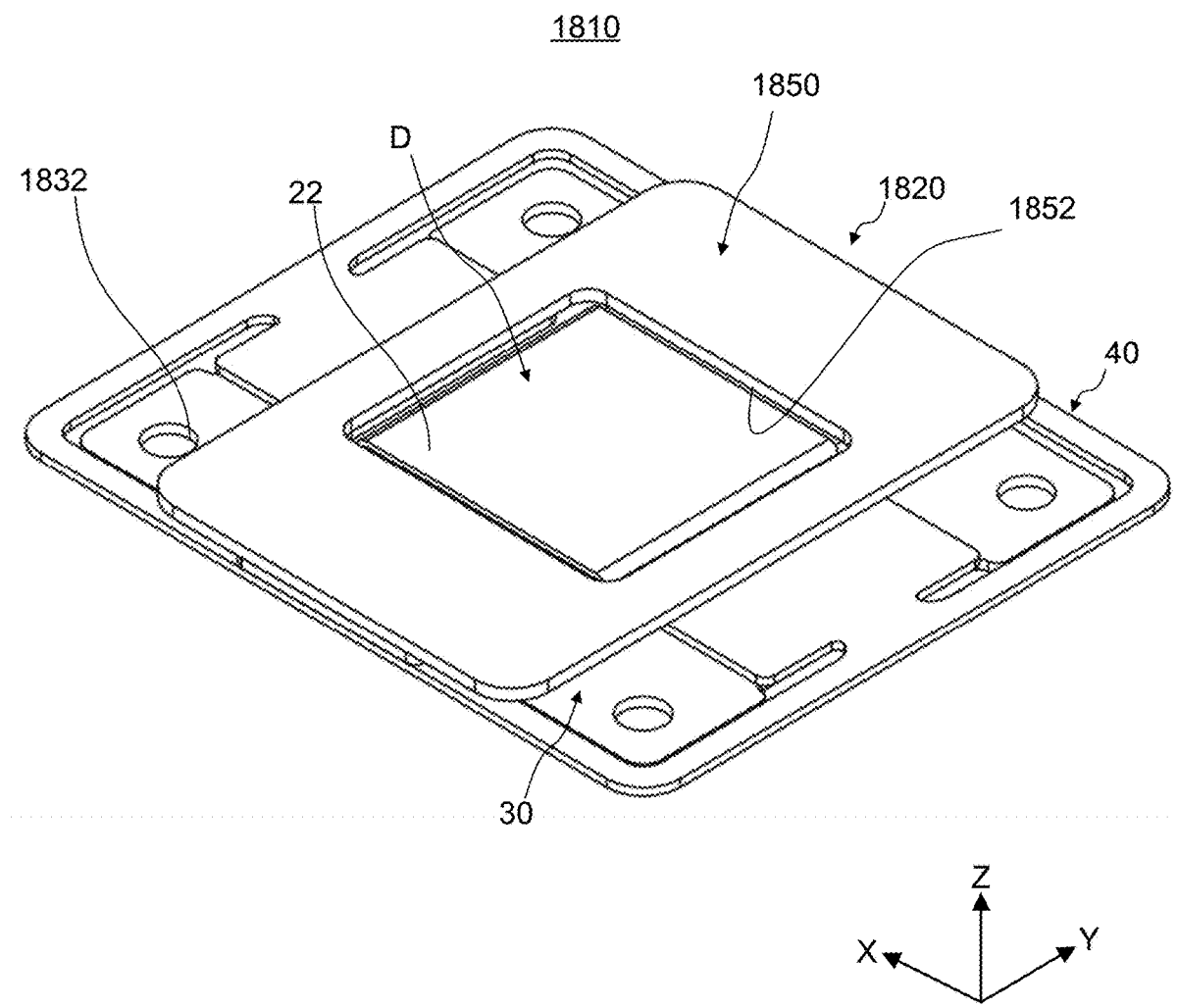
FIG. 28 is a perspective view of other variation 9 of the vibration actuator.

FIG. 28 is a perspective view of other variation 9 of the vibration actuator according to the embodiment of the present invention.

As shown in vibration actuator 1810 illustrated in the drawing, weight section 26 (see FIG. 1) attached to movable section 20 may be replaced with weight plate 1850 having a flat plate shape, and this weight plate 1850 may include opening portion 1852 into which coil 22 is inserted.

Weight plate 1850 includes an opening (opening portion 1852) in a region of coil 22, and electromagnet D fixes weight plate 1850 having a shape that does not overlap with coil 22 to core 24 on both sides of coil 22. This configuration makes it possible to ensure the movable region of movable section 1820 and achieve height reduction.

Figure 29:
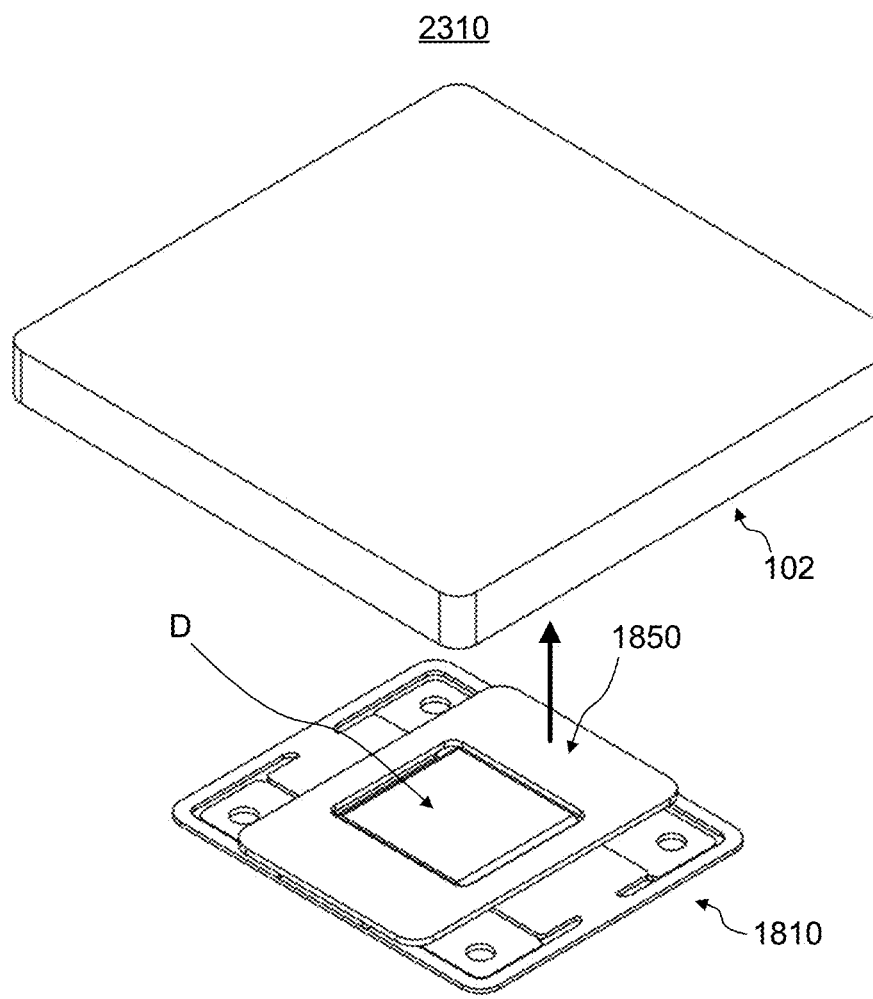
FIG. 29 is a perspective view of exemplary vibration presentation device having other variation 9 of the vibration actuator.

Further, as illustrated in FIG. 29, weight plate 1850 may be attached to the back surface of the attachment target (for example, PCB or pad 102) as a fixing portion. With this configuration, vibration actuator 1810 and pad 102 can constitute haptic presentation device 2310, which can generate vibration and give a sense of tough in response to an operation such as a pressing operation performed on pad 102.

6. Other Variation 10

Figure 30:
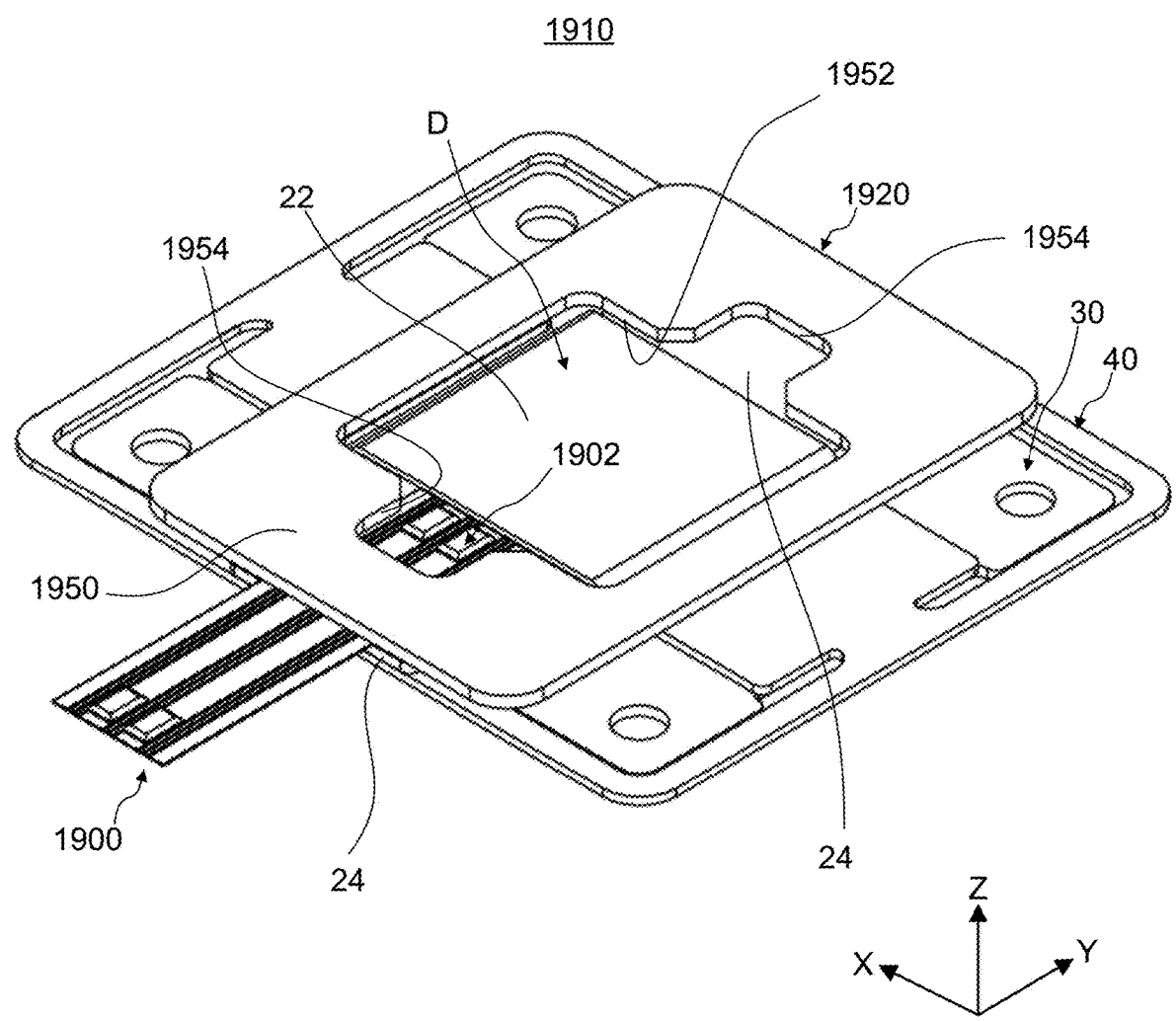
FIG. 30 is a perspective view of other variation 10 of the vibration actuator.

FIG. 30 is a perspective view of other variation 10 of the vibration actuator according to the embodiment of the present invention.

As shown in vibration actuator 1910 illustrated in the drawing, weight section 26 (see FIG. 1) attached to movable section 20 may be replaced with weight plate 1950 as a flat-plate-shaped weight section.

Weight plate 1950 is a frame member including opening portion 1952 in the region of coil 22. In other words, electromagnet D in which coil 22 is disposed on core 24 fixes weight plate 1950 having a shape that does not overlap with coil 22 to the core on both sides of coil 22. Opening portion 1952 is provided in the central portion of weight plate 1950, and coil 22 is inserted therein. Thus, the thickness of vibration actuator 1910 in the vibration direction can be reduced.

Further, weight plate 1950 includes board opening portion (escape portion) 1954 that opens in a region of coil wiring connection portion (land) 1902 of flexible printed circuit (FPC) 1900.

Coil wiring connection portion 1902 is a connection portion between the wiring of flexible printed circuit 1900 and coil 22. A plurality of board opening portions 1954 is formed at opening portion 1952 in weight plate 1950 continuously in the axial direction of coil 22. Thus, even when weight plate 1950 is disposed with its orientation reversed in the coil axial direction, one of board opening portion 1954 is disposed to open in the region of coil wiring connection portion 1902.

Further, weight plate 1950 can be suitably attached to core 24 while avoiding coil wiring connection portion 1902 regardless of the shape of coil wiring connection portion 1902. Thus, it is possible to ensure the movable region of movable section 1920 and to achieve reduction in the height of vibration actuator 1910. Further, in vibration actuator 1910, the front surface of weight plate 1950 can be surely fixed to and be in flat face contact with the back surface of the operation surface.

7. Other Variations 11, 12, and 13

Figure 31:
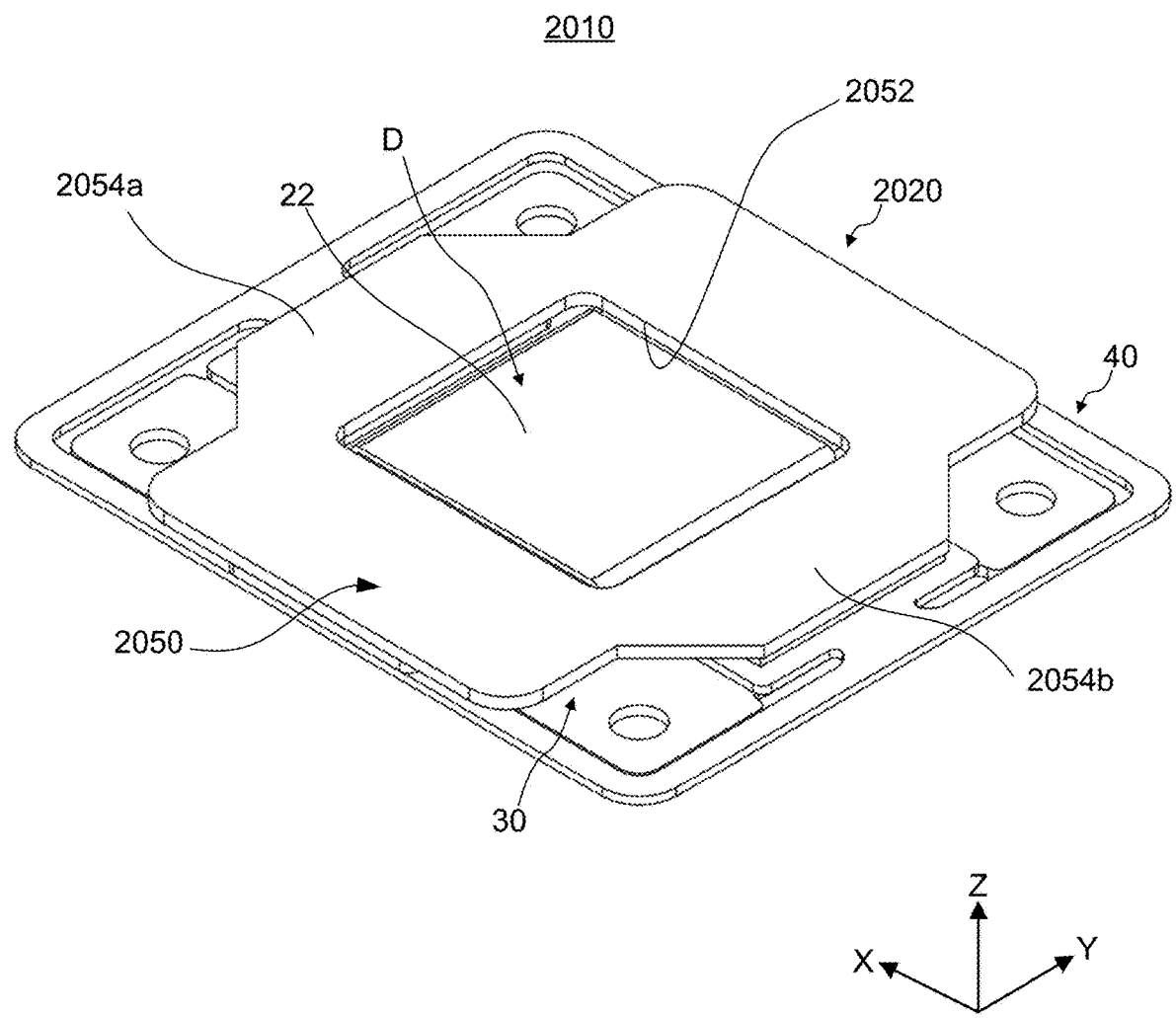
FIG. 31 is a perspective view of other variation 11 of the vibration actuator.
Figure 32:
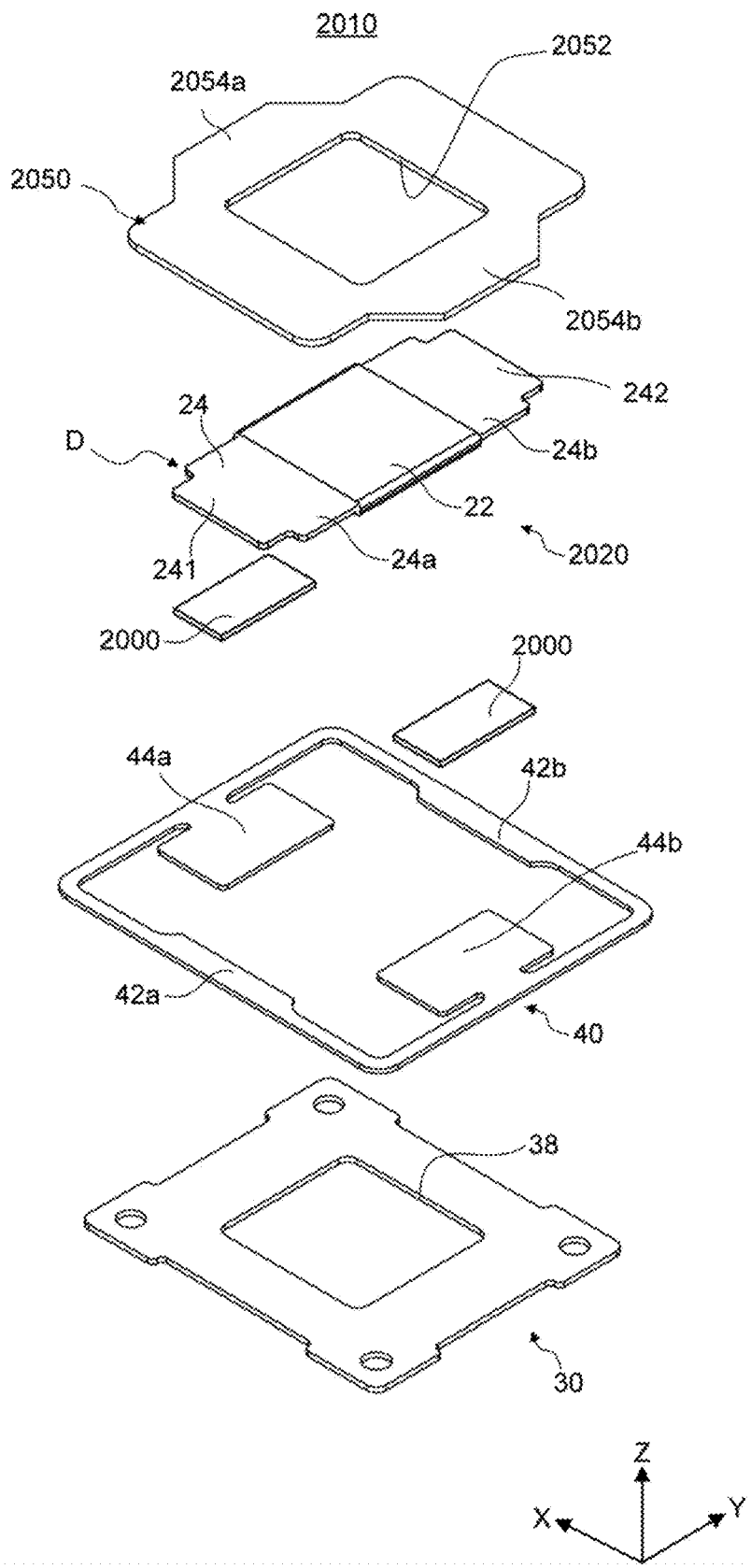
FIG. 32 is an exploded perspective view of other variation 11 of the vibration actuator.

FIG. 31 is a perspective view of other variation 11 of the vibration actuator according to the embodiment of the present invention, and FIG. 32 is an exploded perspective view of the vibration actuator of other variation 11 illustrated in FIG. 31.

As shown in vibration actuator 2010 illustrated the drawings, damper (vibration damping member) 2000 that dampens the elastic deformation of plate-shaped elastic section (elastic body) 40, that is, damps vibration, may be provided between weight plate 2050 of movable section 2020 and plate-shaped elastic section 40.

Damper 2000 is disposed between base-section-side fixing portions 44a and 44b, which are core connection portions of plate-shaped elastic section 40, and protrusion surface portions 2054a and 2054b, which protrude in a direction orthogonal to the axis of core 24 from the central portion of weight plate 2050.

Note that, weight plate 2050 has a shape that does not overlap with coil 22, is fixed to core 24 (in detail, both end portions 24a and 24b of core 24) on both sides of core 22 in electromagnet D including core 24 and coil 22, and constitutes movable section 2020. Weight plate 2050 includes opening portion 2052 that opens in the region of coil 22.

As described above, movable section 2020 is connected to movable-section-side fixing portions 42a and 42b, which is a pair of opposite sides of plate-shaped elastic section 40, at spring connection portions 241 and 242 of both ends of core 24. Meanwhile, weight plate 2050 is connected to base-side fixing portions 44a and 44b, which are the other pair of opposite sides of plate-shaped elastic section 40, through damper 2000. Thus, the thickness of vibration actuator 2010 can be reduced by the thickness of damper 2000, and the vibration of plate-shaped elastic section 40 can be damped. Note that, base-side fixing portions 44a and 44b are disposed on the base plate and are fixed thereto.

Further, in the vibration actuator in the present embodiment, damper 2000 may be provided between the weight and the base plate, or between the weight and the attachment target to which the base plate is fixed. Both of the configurations can damp the vibration of plate-shaped elastic section 40, and the vibration can be suitably performed.

Figure 33:
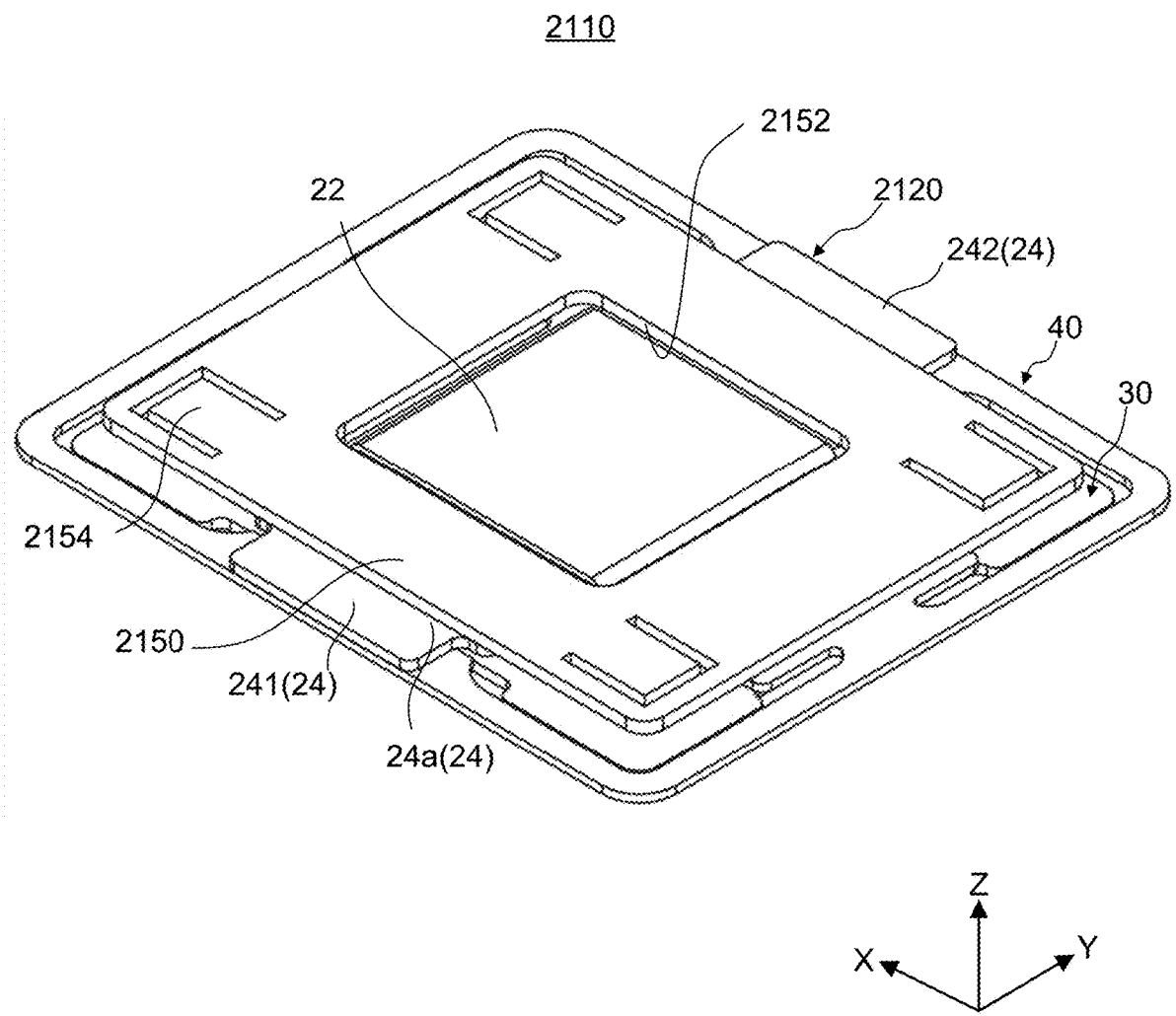
FIG. 33 is a perspective view of other variation 12 of the vibration actuator.
Figure 34:
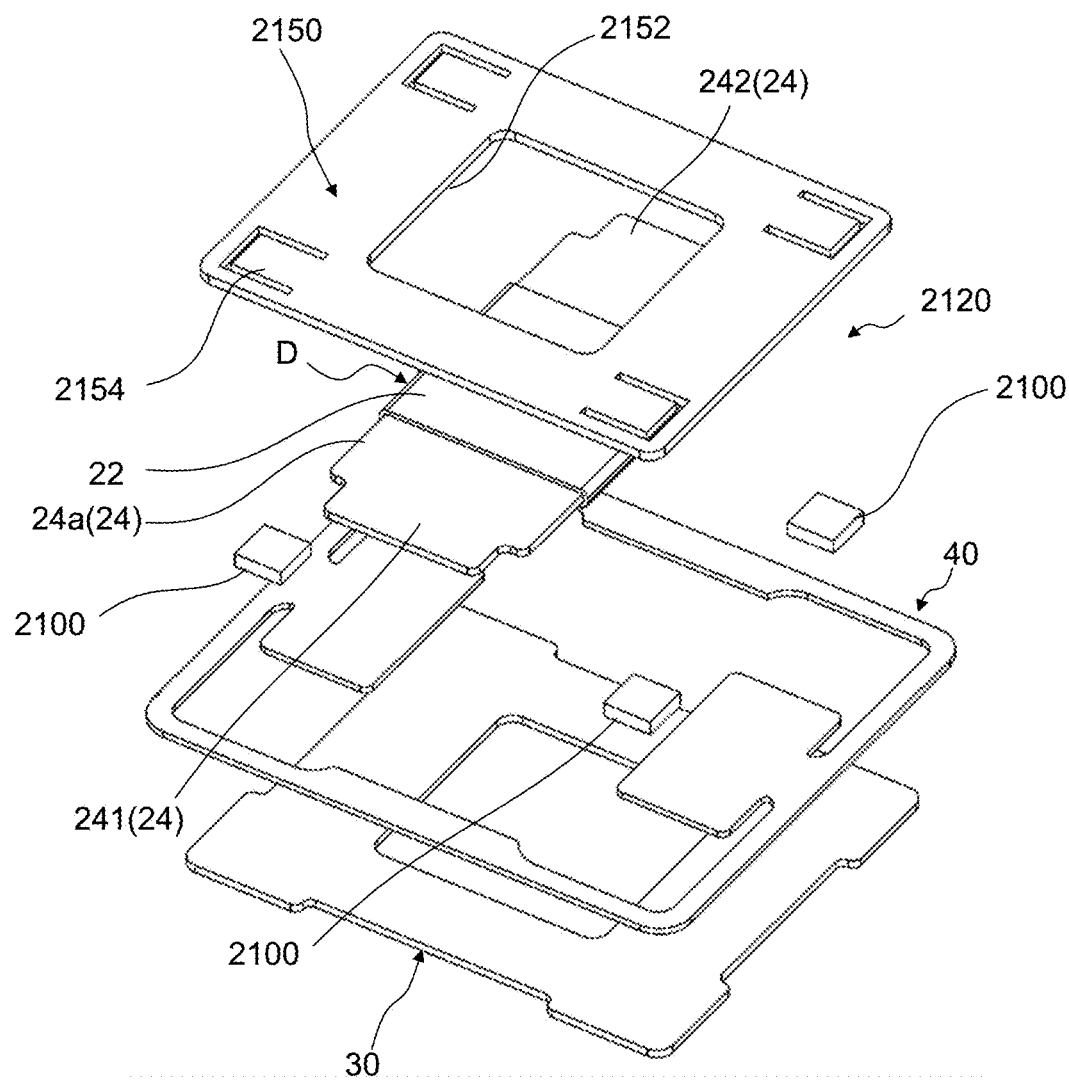
FIG. 34 is an exploded perspective view of other variation 12 of the vibration actuator.
Figure 35:
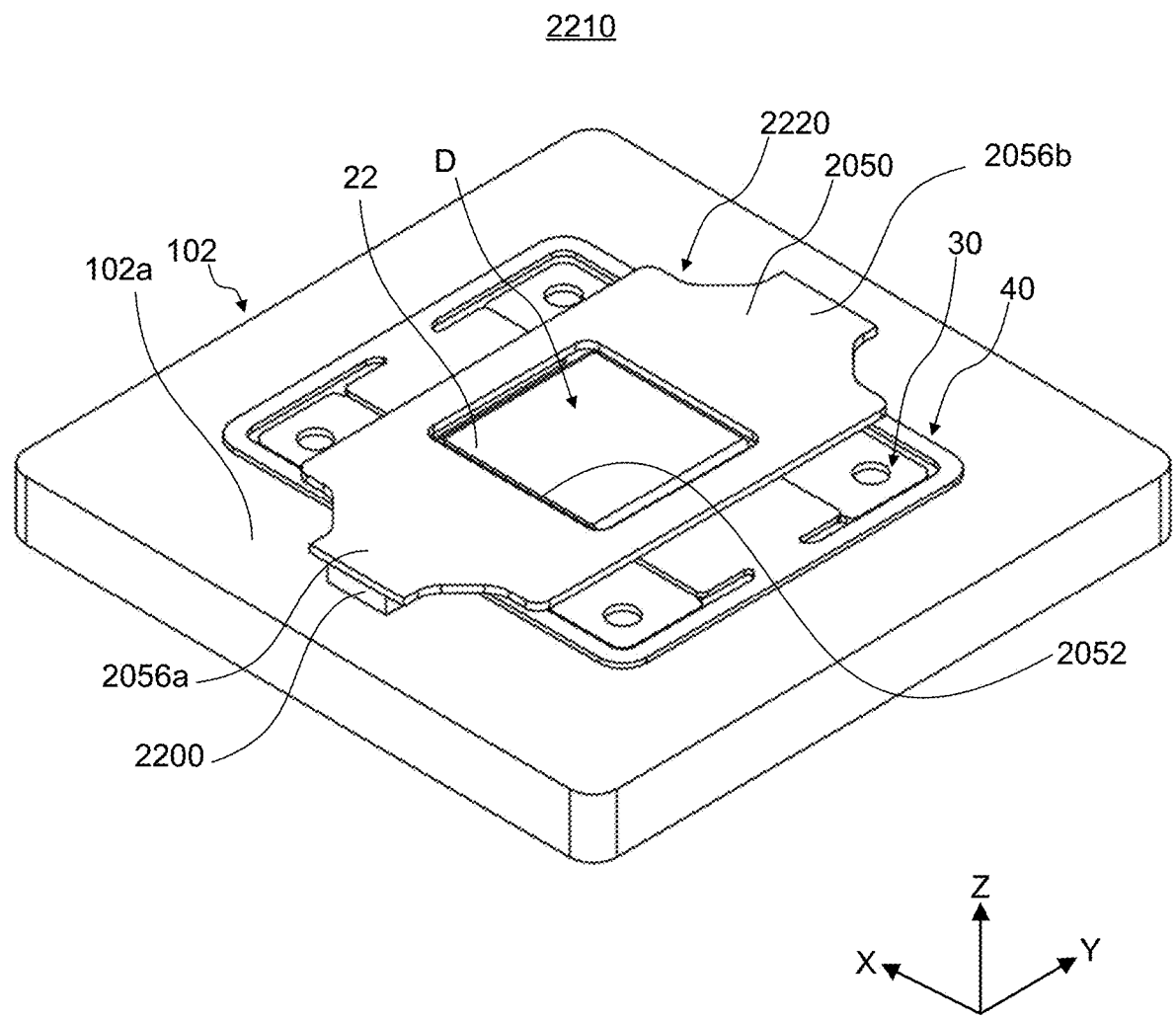
FIG. 35 is a perspective view of other variation 13 of the vibration actuator.

FIG. 33 is a perspective view of other variation 12 of the vibration actuator according to the embodiment of the present invention, FIG. 34 is an exploded perspective view of the vibration actuator illustrated in FIG. 33, and FIG. 35 is a perspective view of other variation 13 of the vibration actuator according to the embodiment of the present invention.

As shown in vibration actuator 2110 as other variation 12 in FIGS. 33 and 34, dampers 2100 may be provided and interposed between weight plate 2150 and base plate 30. In vibration actuator 2110, dampers 2100 may be attached to either of weight plate 2150 and base plate 30.

In vibration actuator 2110, with respect to weight plate 2150, damper 2100 is configured to be in contact with the main body part of weight plate 2150 at spring piece portion 2154 that has a plate shape and is independently deformable. Spring piece 2154 is formed by performing cut processing on a predetermined position of weight plate 2150, which is, the corner of weight plate 2150 having a rectangular shape including a square shape. Spring piece 2154 is formed at a part of the main body portion of weight plate 2150 so as to be elastically deformable.

Thus, when weight plate 2150 moves along with the movement of movable section 2120, spring piece 2154 and damper 2100 are deformed by the movement, and the resonance of plate-shaped elastic section 40 at the time of vibration can be suppressed, and thus, suitable vibration can be realized.

Further, as illustrated in FIG. 35, damper 2200 may be provided and interposed between weight plate 2050 including opening portion 2052 and attachment surface 102a of the attachment target (for example, pad 102) to which vibration actuator 2210 is attached.

Dampers 2200 are attached, for example, in movable section 2220, to back surfaces (surfaces on the side of base plate 30) of both end portions 2056a and 2056b of weight plate 2050 disposed on electromagnet D (coil core) in which coil 22 is disposed in the central portion of the core.

Both end portions 2056a and 2056b are disposed so as to protrude further to the end portion side in the core axial direction than the core both end portions in coil 22, and when electromagnet D moves in a through-plane direction to the side of base plate 30 with respect to base plate 30 via plate-shaped elastic section 40, moves along with the movement. Thus, dampers 2200 attached to the back surfaces of both end portions 2056a and 2056b move to and come into contact with the side of attachment surface 102a of the attachment target (for example, pad 102), and have the same effects as those of above-described dampers 2000 and 2100.

8. Other Variation 14

Figure 36:
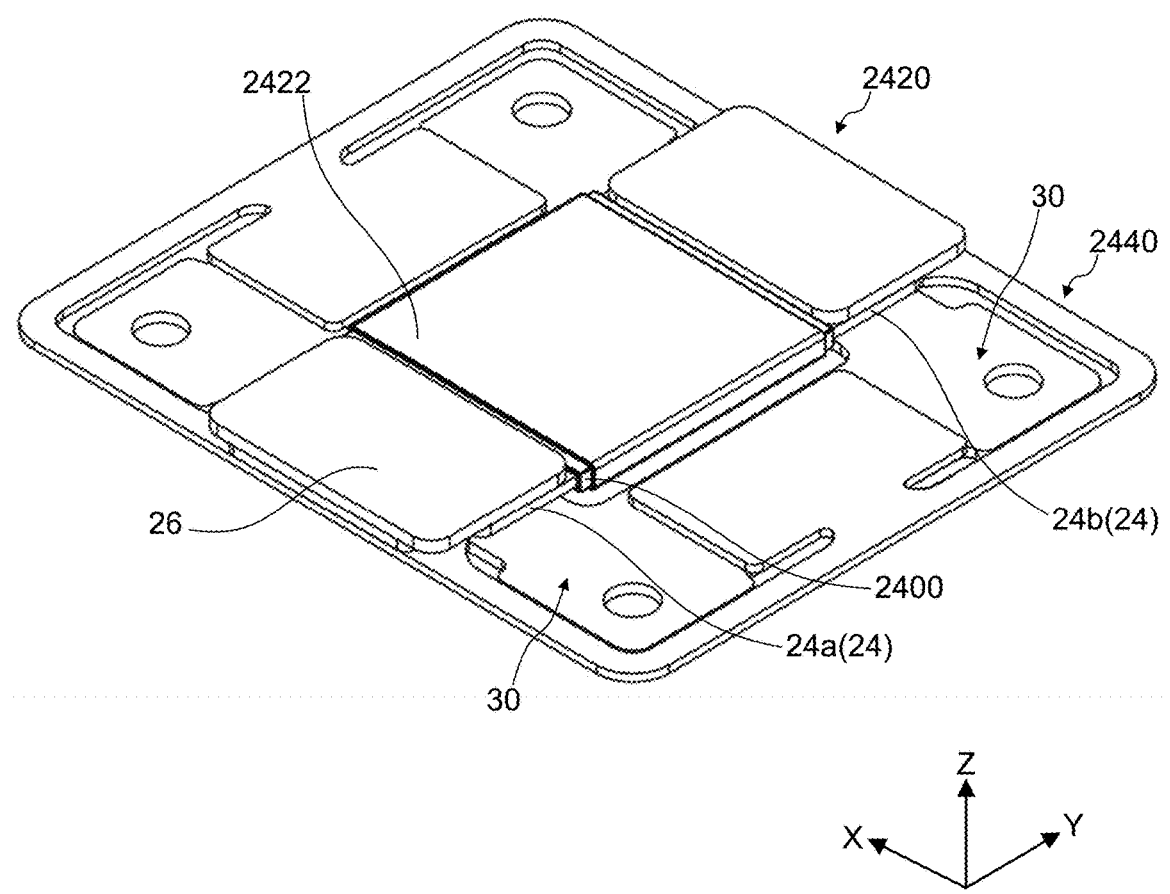
FIG. 36 is a perspective view of other variation 14 of the vibration actuator.

FIG. 36 is a perspective view of other variation 14 of the vibration actuator according to the embodiment of the present invention.

As shown in vibration actuator 2410 illustrated in the drawing, coil 2422 disposed so as to be wound around core 24 in movable section 2420 may be an air-core coil, and is provided on the outer periphery of bobbin 2400 having a plate shape in which slits passed by core 24 are formed on the both side portions. Bobbin 2400 with the coil is inserted into core 24 and attached to core 24, so that the coil can be easily disposed around the central portion of core 24.

Further, as the bobbin, flanges are provided at both end portions apart from each other in the axial direction. The, the bobbin with the flanges may be attached to core 24, and the coil may be directly wound between the flanges of the bobbin and provided at the central portion of the core. Thus, by providing a coil between the flanges, coil 2422 becomes a coil having a defined width, which makes it possible to provide coil 2422 accurately on a core with the desired width and to adjust the amount of winding of the coil when winding the coil.

9. Other Variation 15

Figure 37:
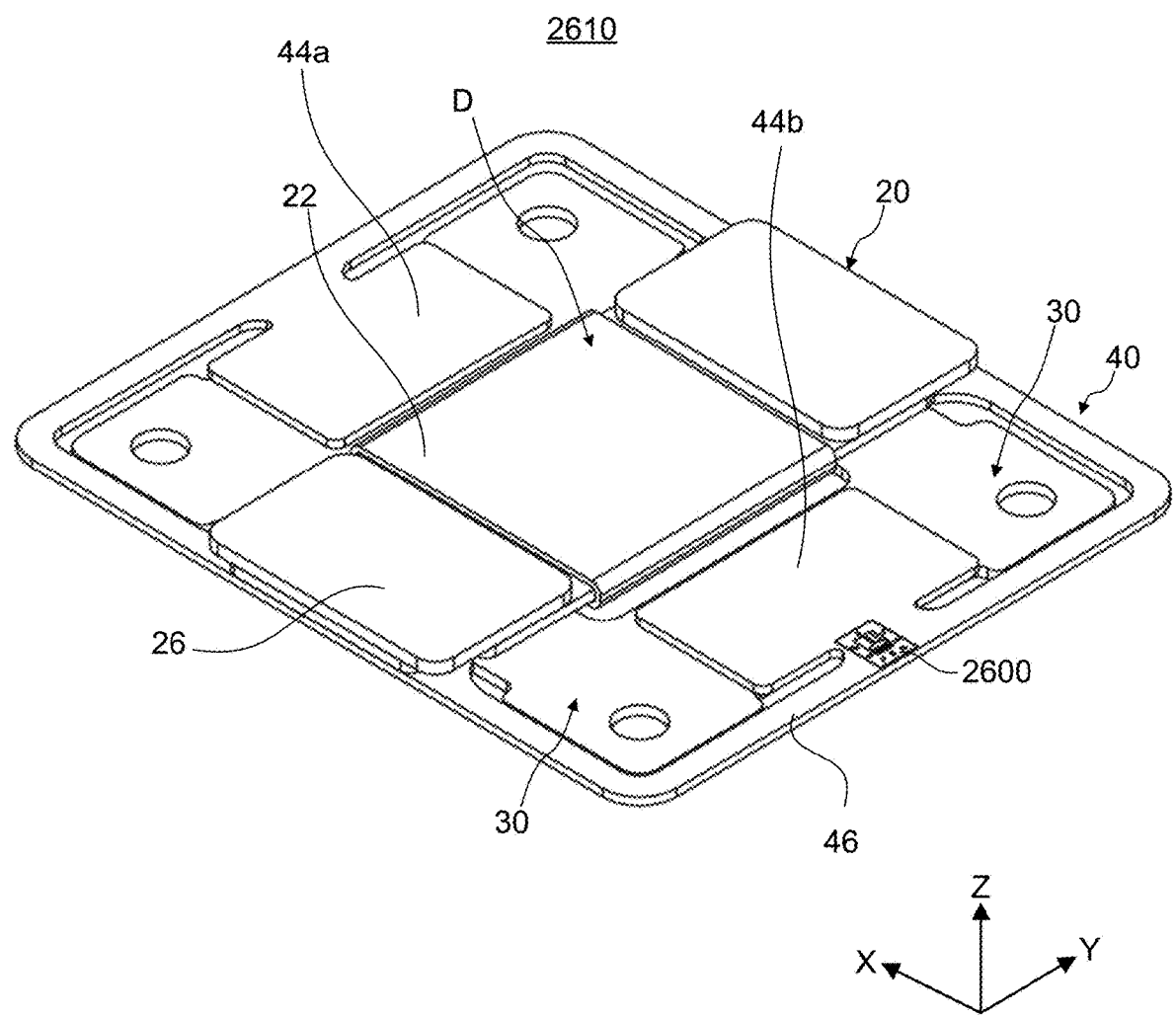
FIG. 37 is a perspective view of other variation 15 of the vibration actuator.

FIG. 37 is a perspective view of other variation 15 of the vibration actuator according to the embodiment of the present invention.

As shown in vibration actuator 2610 illustrated in the drawing, strain detection portion 2600 may be provided at plate-shaped elastic section (elastic support section) 40. That is, plate-shaped elastic section 40 includes strain detection portion 2600. For example, strain detection portion 2600 is disposed at a portion that is deformed and strained in plate-shaped elastic section 40. The strained portion is a connection portion between base-side fixing portion 44b and elastic main body portion 46 including the arm that elastically deforms.

Strain detection portion 2600 detects strain generated by a load applied to a connection portion, which functions as a strain generation body at the time of driving vibration actuator 2610, that is, at the time of vibration. Thus, for example, vibration actuator 2610 is driven depending on the detection result, and vibration can be given to the equipment to which vibration actuator 2610 is attached. For example, when operation equipment such as a touch panel is operated, an operator is given a touch of sense through the operation equipment, that is, feedback of a sense of touch can be realized.

Note that each of the vibration actuators described above (for example, vibration actuator 2610) may be a contact-type input device in which the base plate is fixed to the attachment target such as a pad or PCB and which is used so as to give vibration to the operation surface connected to the movable section on the upper side. This contact-type input device presents a sense of touch to the operator by energizing coil 22 and vibrating electromagnet D in response to the operator's operation of touching an operation surface. Note that the operation surface may be a display, an operation panel, or a touchpad.

Figure 38:
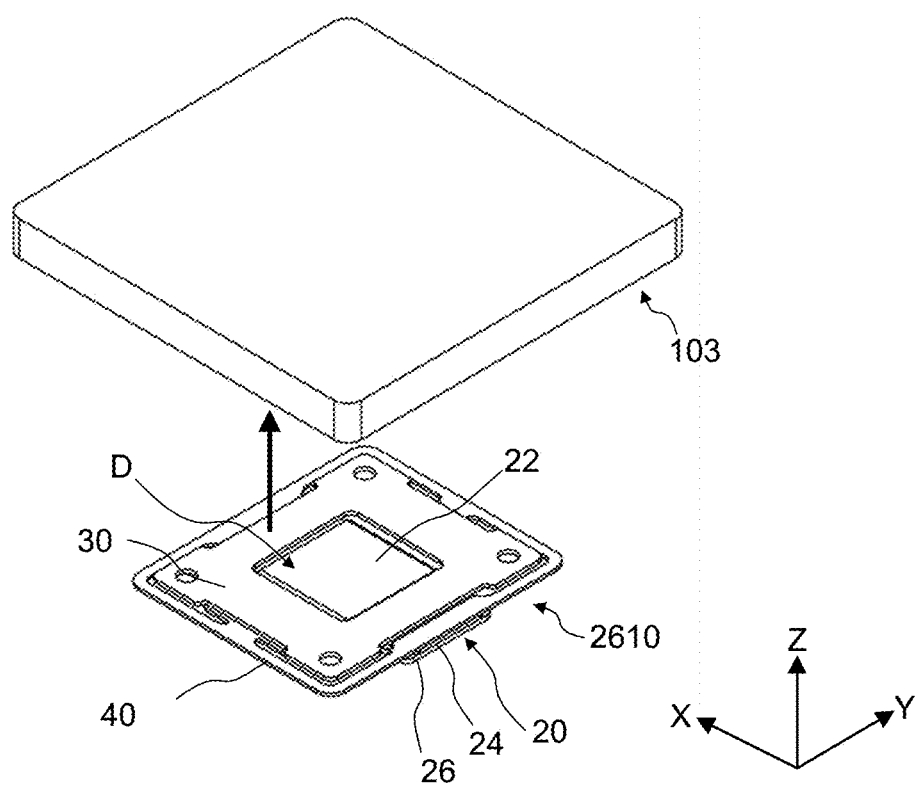
FIG. 38 is a diagram for describing an attachment structure of other variation 15 of the vibration actuator.

Further, as illustrated in FIG. 38, each vibration actuator (for example, vibration actuator 2610) described above may be used in a state where the vibration actuator is fixed to attachment target 103 with base plate 30 being placed on the upper side and is suspended with the side of movable section 20 being placed on the lower side. For example, in vibration actuator 2610 in this state, strain detection portion 2600 can check the displacement of the movable section, and this confirmation is output to the control unit or the like as an additional signal, thereby controlling feedback for the timing of acceleration or a brake generated for changing vibration.

Further, in a configuration in which a weight plate is provided on the side of electromagnetic stone D including a coil core, the weight plate may be fixed to the attachment target by disposing the weight plate on the upper side and disposing the base plate on the lower side. In each of other variations of the vibration actuator, either the base plate or the electromagnet is placed on the back surface of the operation surface.

10. Other Variation 16

Figure 39:
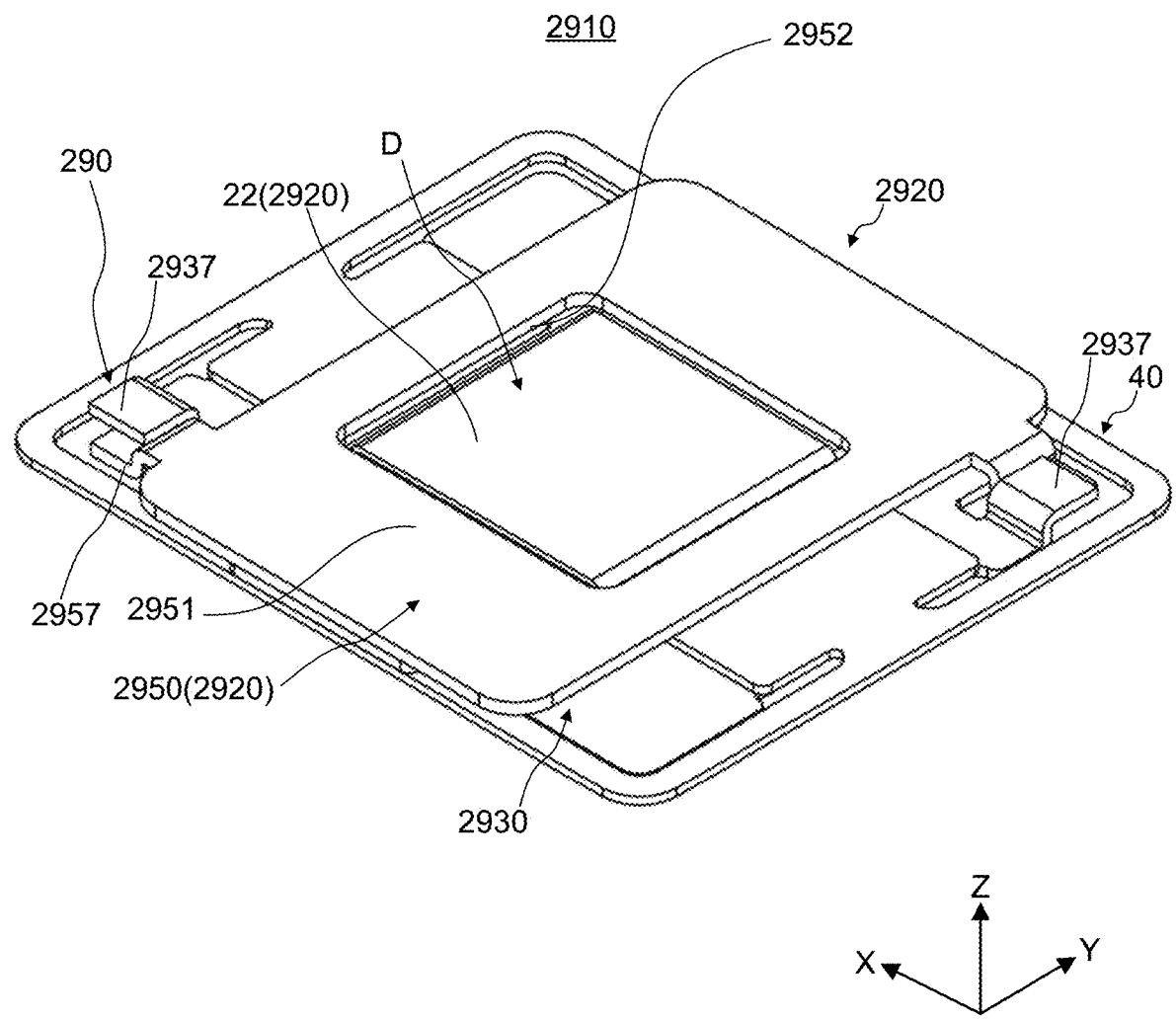
FIG. 39 is a perspective view of other variation 16 of the vibration actuator.

FIG. 39 is a perspective view of other variation 16 of the vibration actuator according to the embodiment of the present invention. In a case where the vibration actuator of the present embodiment or each of the vibration actuators in the variations is used in a state of being suspended (see FIG. 38), that is, one of the device main body, which serves as an attachment target, and the vibration application target is in a state of being suspended to the other. In this case, there is no restriction in a direction in which the device main body and the attachment target are spaced from each other due to their own weights or the like.

In contrast, as shown in vibration actuator 2910 illustrated in FIG. 39, restriction mechanism 290 may be provided to restrict movement in the direction in which base plate 2930 and movable section (in detail, electromagnet D in which coil 22 is disposed on a core) 2920 relatively separate from each other.

Regulation mechanism 290 includes, for example, movement engagement portion 2957 provided on the movable section side, and movement restriction portion 2937 provided on the base plate side, and when the movable section and the base plate moves in a direction in which the movable section and the base plate relatively separate from each other, movement engagement portion 2957 and movement restriction portion 2937 engage with each other and restrict the movement in the separation direction. Restriction mechanism 290 may be provided at four corners in a plan view in the vibration actuator, or may be provided at diagonal positions in a vibration actuator 2920 having a rectangular shape in a plan view, for example.

Note that, vibration actuator 2910 is configured in the same manner as vibration actuator 1810, and movable section 2920 is configured by attaching weight plate 2950 to electromagnet D. Movement engagement portion 2957 is provided, in weight plate 2950, at a leading end of a portion that protrudes from a part of an outer periphery of main body 2951 including opening portion 2952 at the central portion and having a rectangular shape and bends to the side of base plate 2930. Meanwhile, movement restriction portion 2937 is provided so as to be located on a side opposite to base plate 2930 with respect to movement engagement portion 2957 and at a position facing and separating from movement engagement portion 2957.

Further, movement restriction portion 2937 is made of metal since movement restriction portion 2937 is integral with base plate 2930. Since movable engagement portion 2957 is weight plate 2950, which is a non-magnetic body, movable engagement portion 2957 may be formed of a resin or the like.

Separation distance between base plate 2930 and movable section 2920 is restricted by restriction mechanism 290, and base plate 2930 and movable section 2920 are not separated from each other more than necessary and are not removed from each other. Accordingly, for example, in a case where vibration actuator 2910 is attached to attachment target 103 such as a PCB or a pad instead of vibration actuator 2610 illustrated in FIG. 38, vibration actuator 2910 can be suitably operated even when vibration actuator 2910 is attached by base plate 2930 and is suspended. Further, even in a case where vibration actuator 2910 is attached by movable section 2920, base plate 2930 and movable section 2920 do not separate from each other more than necessary, and thus, the present embodiment functions suitably.

11. Other Variation 17

Figure 40:
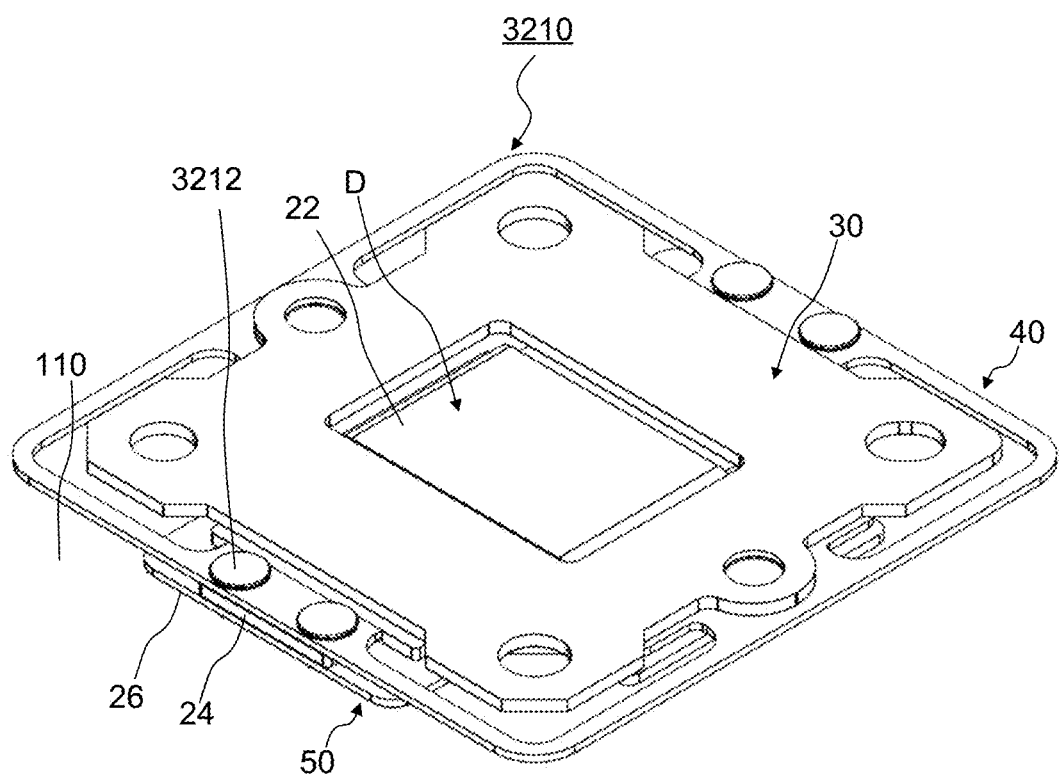
FIG. 40 is a perspective view of other variation 17 of the vibration actuator.

In vibration actuator 10 of the embodiment (see FIGS. 1 to 10), a configuration has been described in which the side of base section 30 having a plate shape is fixed to the back surface of the housing of pad main body 110 and electromagnet D constituted by coil 22 and core 24 is vibrated. However, as shown in vibration actuator 3210 illustrated in FIG. 40, base plate (base section 30) may be vibrated by fixing core 24 (electromagnet D) and weight section 26 to the housing (for example, pad main body 110) through fastening member 3212. In vibration actuator 3210, fastening member (screw, rivet, or the like) 3212 penetrates a plate connection portion of plate-shaped elastic section 40, which is an elastic body having a frame shape, and weight section 26, and is attached to pad main body 110.

12. Other Variation 18

Figure 41:
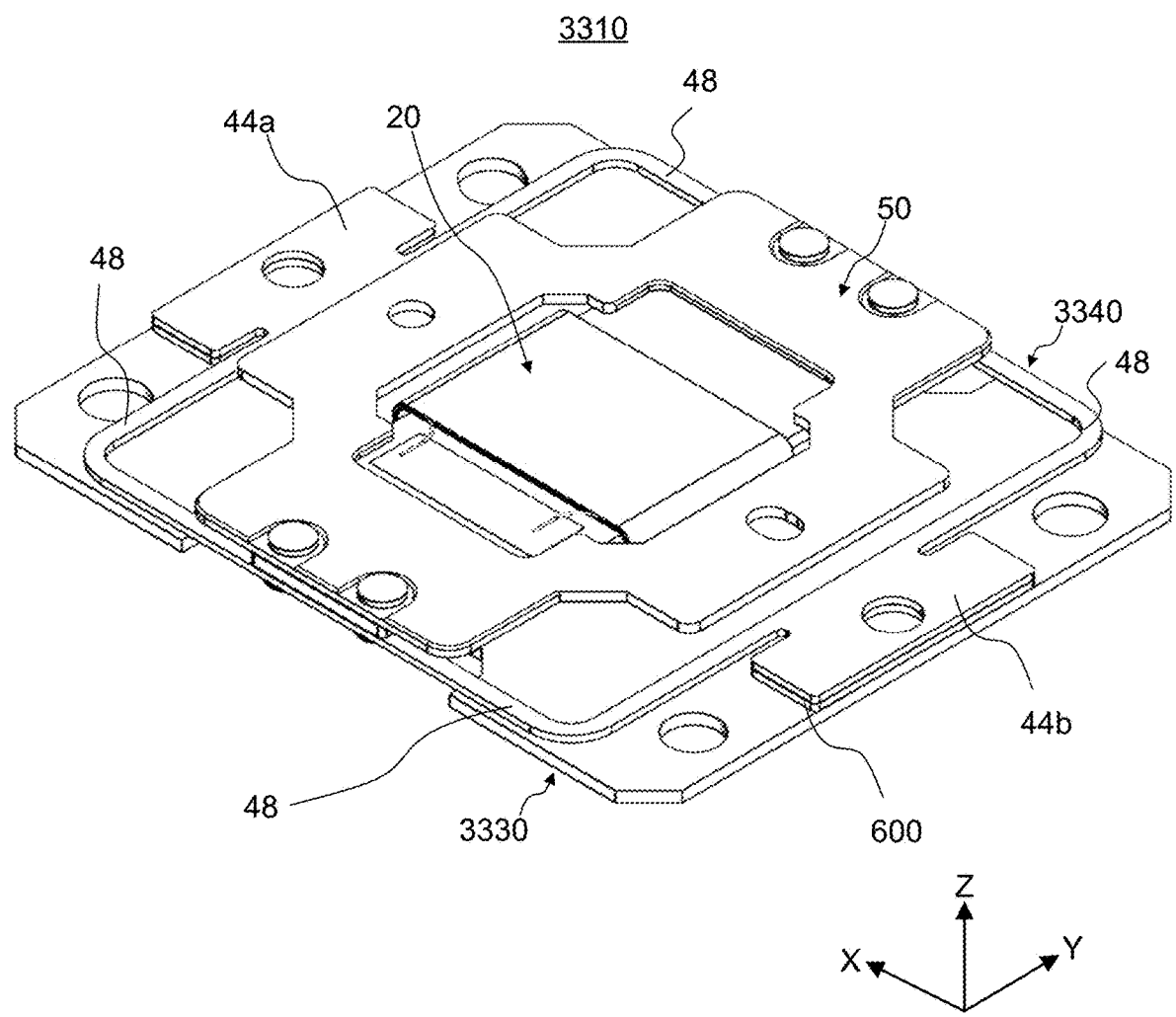
FIG. 41 is a perspective view of other variation 18 of the vibration actuator.
Figure 42:
FIG. 42 is an exploded perspective view of other variation 18 of the vibration actuator.
Figure 42:
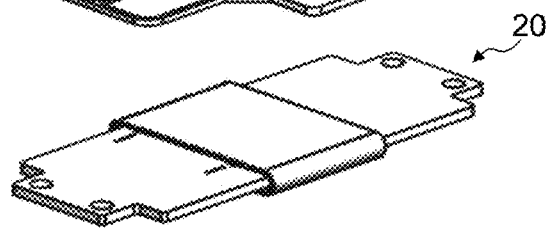
Figure 42:
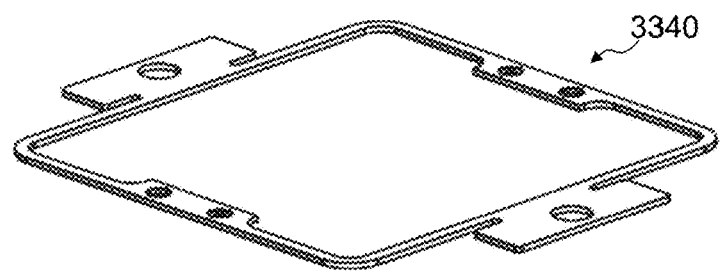
Figure 42:
Figure 42:
Figure 42:
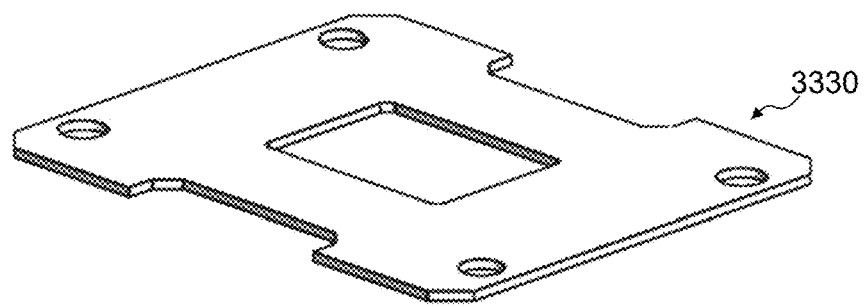
Figure 42:
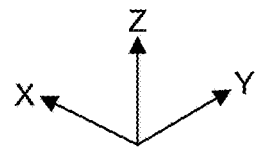

FIG. 41 is a perspective view of other variation 18 of the vibration actuator according to the embodiment of the present invention, and FIG. 42 is an exploded perspective view of other variation 18.

As illustrated, in plate spring 3340, which is a plate-shaped elastic section, arm 48 having a frame shape and connected to base plate 3330 may be placed on the inside of the outer periphery of base plate 3330, not the outside of the outer periphery. Specifically, base-side fixing portions 44*a* and 44*b* that connect plate spring 3340 having a frame shape and base plate 3330 are provided on the outside of the frame-shaped portion, not the inside of the frame shaped portion. In this case, spacer 600 having a flat plate shape may be interposed between base plate 3330 and plate spring 3340 in order to secure the vibration space of plate spring 3340. Spacer 600 defines the vibration amplitude of electromagnet D in a space formed between electromagnet D and base plate 3330.

13. Other Variation 19

Figure 43:
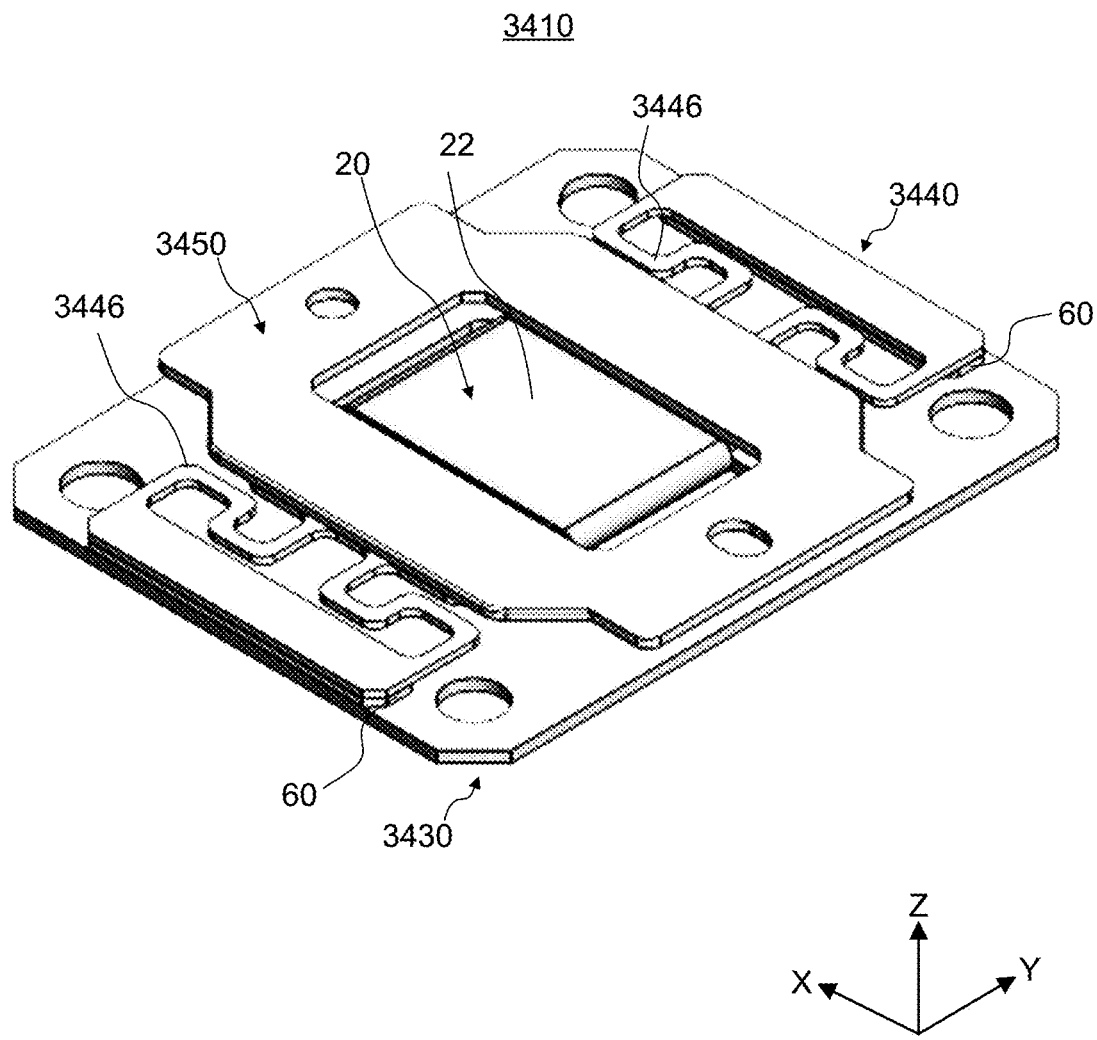
FIG. 43 is a perspective view of other variation 19 of the vibration actuator.
Figure 44:
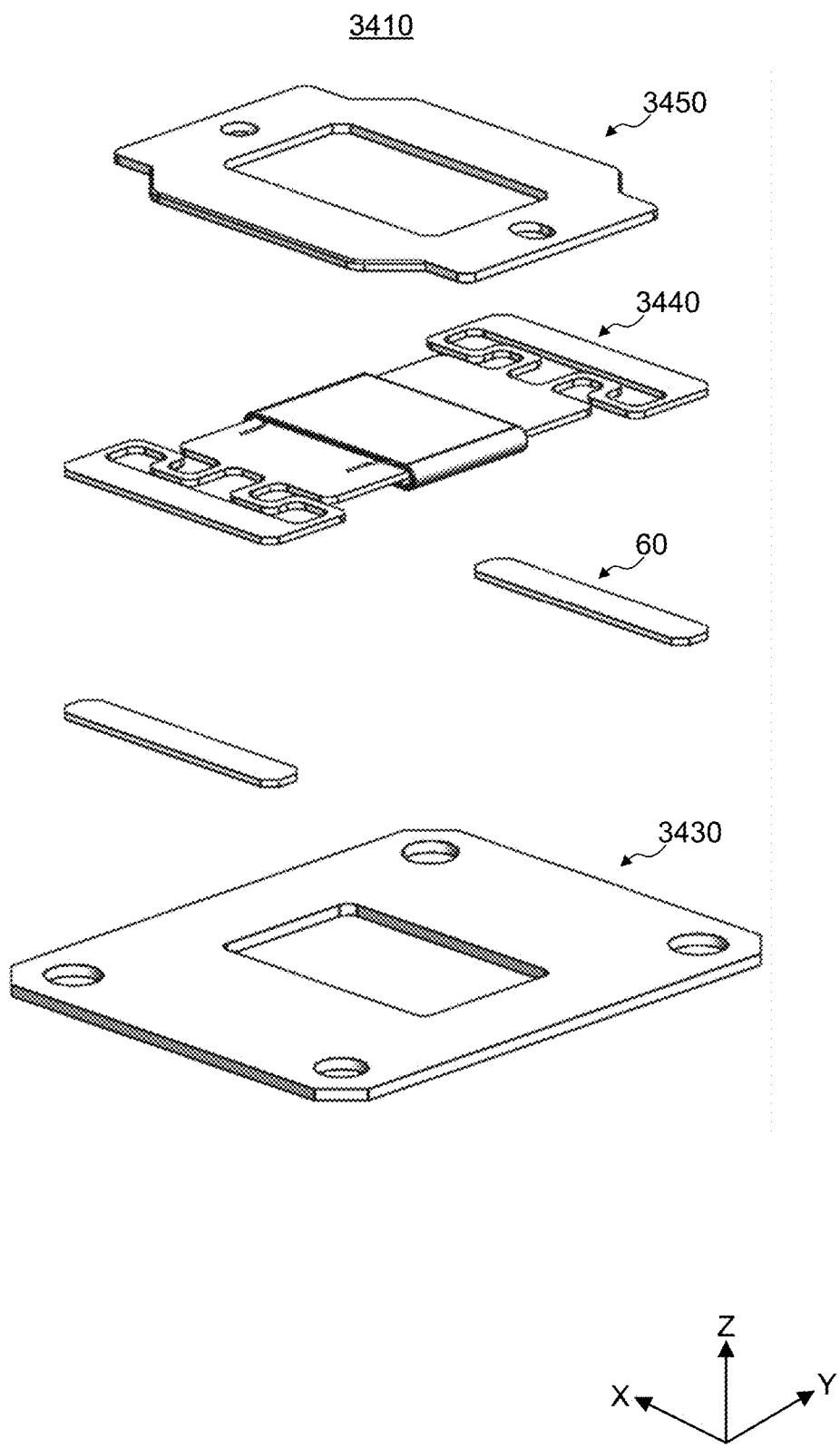
FIG. 44 is an exploded perspective view of other variation 19 of the vibration actuator.

FIG. 43 is a perspective view of other variation 19 of the vibration actuator according to the embodiment of the present invention, and FIG. 44 is an exploded perspective view of other variation 19.

As shown in vibration actuator 3410 illustrated in the drawing, the core of the electromagnet (portion to which weight 3450 is attached and portion other than the central portion in which coil 22 is disposed) and spring 3446 of elastic deformation portion 3440 may be integrated and formed of the same material. Spring 3446 has a meandering shape, and spacer 60 having a flat plate shape is preferred to be interposed between base plate 3430 and spring 3446 in order to have a space for vibration of spring 3446.

Further, either of base plate 3430 and spring 3446 may be deformed so as to obtain the height. According to the above configuration, it is possible to reduce the number of components. Providing spacer 60 makes it possible to adjust the thickness of vibration actuator 3410.

14. Other Variation 20

Figure 45:
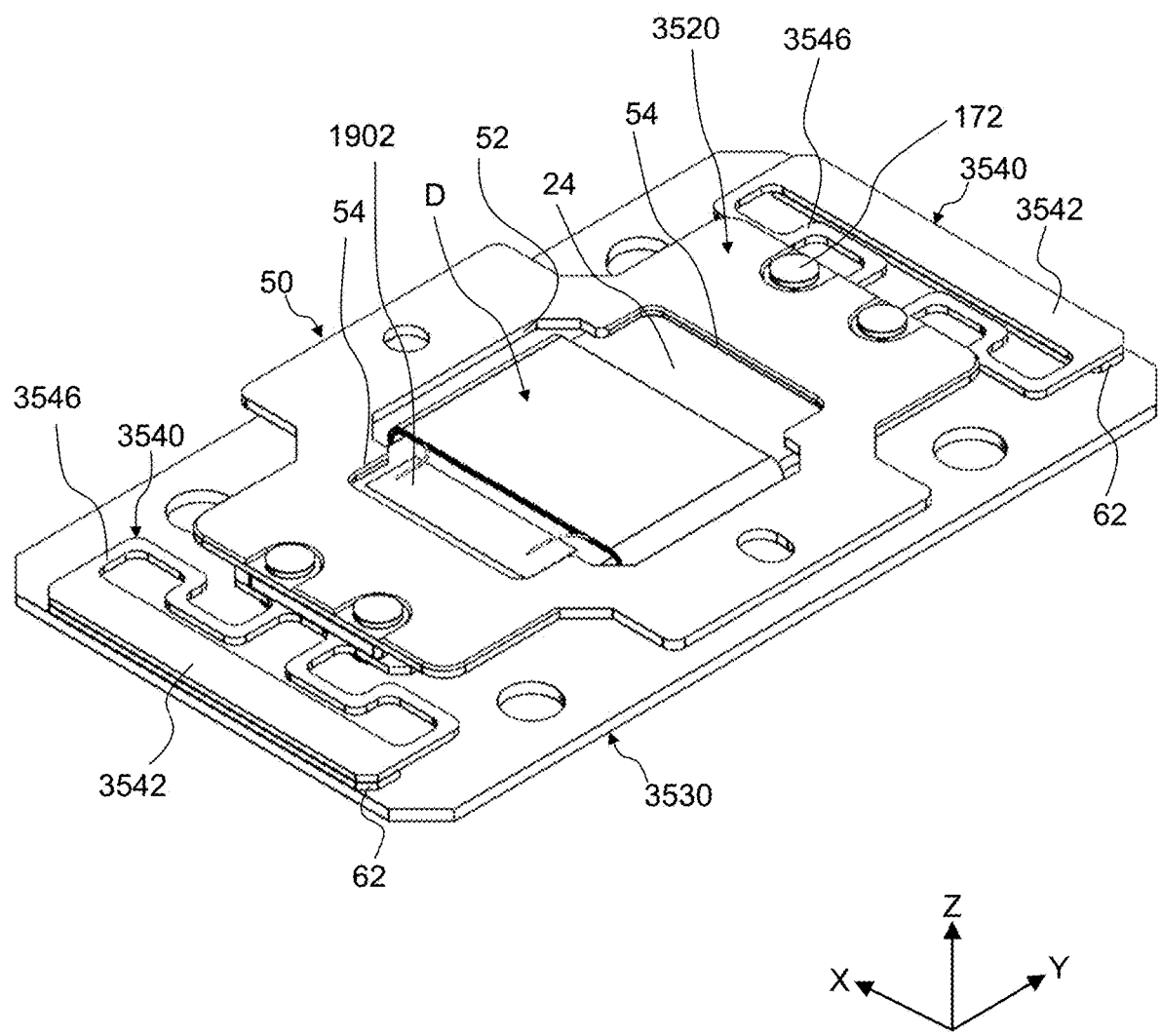
FIG. 45 is a perspective view of other variation 20 of the vibration actuator.
Figure 46:
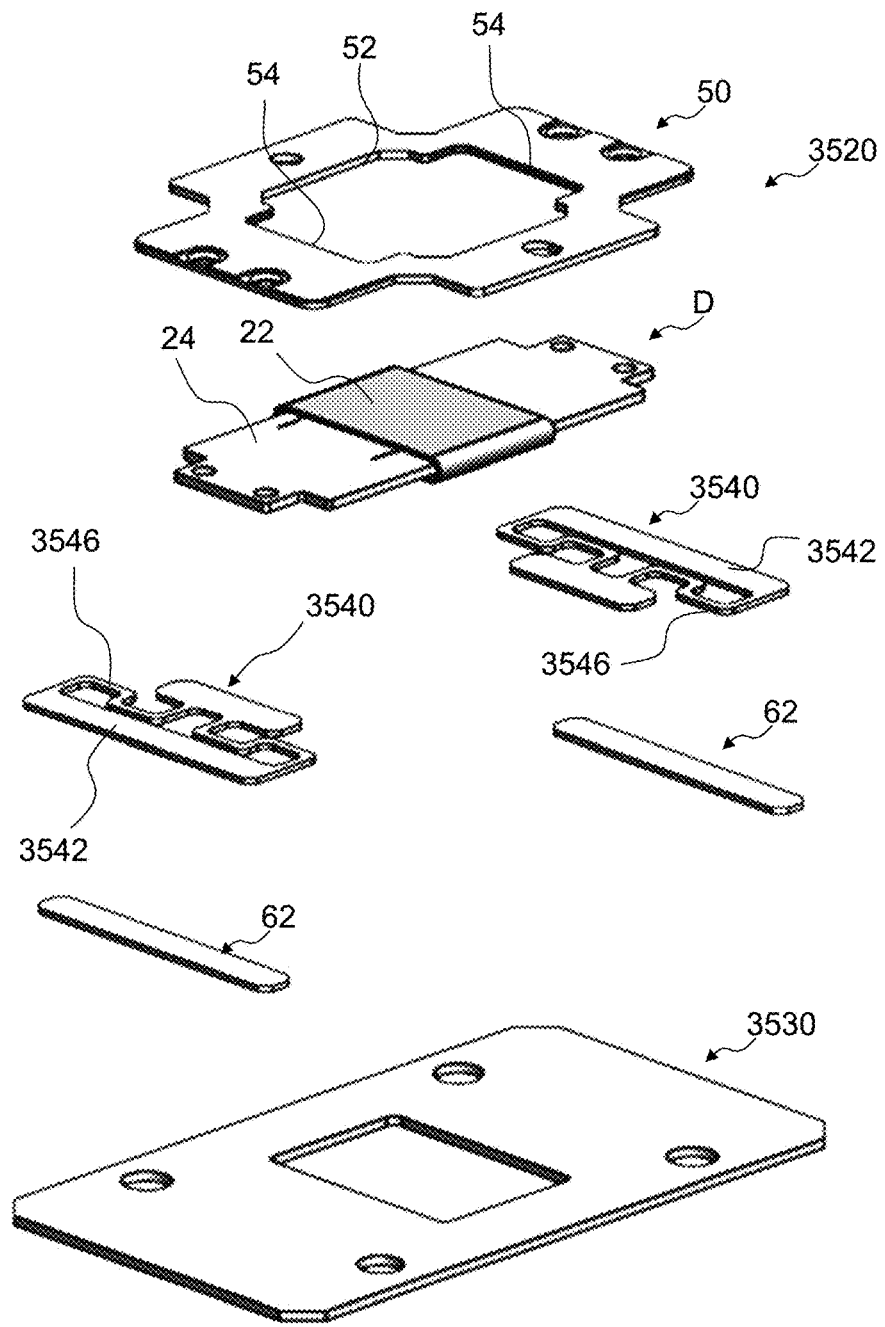
FIG. 46 is an exploded perspective view of other variation 20 of the vibration actuator.

FIG. 45 is a perspective view of other variation 20 of the vibration actuator according to the embodiment of the present invention; and FIG. 46 is an exploded perspective view of other variation 20.

As shown in vibration actuator 3510, the both end portions of core 24 apart from each other in the core axial direction in movable section 3520 including electromagnet D may be supported by a pair of springs (elastic body) 3540, and the pair of springs 3540 may be attached to base plate 3530 through a pair of spacers 62.

Spacer 62 illustrated in the drawings is disposed between plate-side fixing portion 3542 connecting with bent portion 3546 that elastically deforms in spring 3540, and base plate 3530, and connects plate-side fixing portion 3542 and base plate 3530 together. Note that, bent portion 3546 is fixed to both end portions of core 24 together with weight plate 50 by fastening member 172. According to this configuration, the facing surface of core 24 and the base plate, and the fixed portion of spring 3540 and the base plate are in the same direction, thereby reducing the width of the product.

Further, weight plate 50 is formed in a shape that does not overlap with coil 22, and includes opening portion 52 in which coil 22 is disposed, and board opening portion (escape portion) 54 that opens in a region of coil wiring connection portion 1902 connected to coil 22. Thus, the thickness of vibration actuator 3510 in the vibration direction becomes thin.

15. Other Variation 21

Figure 47:
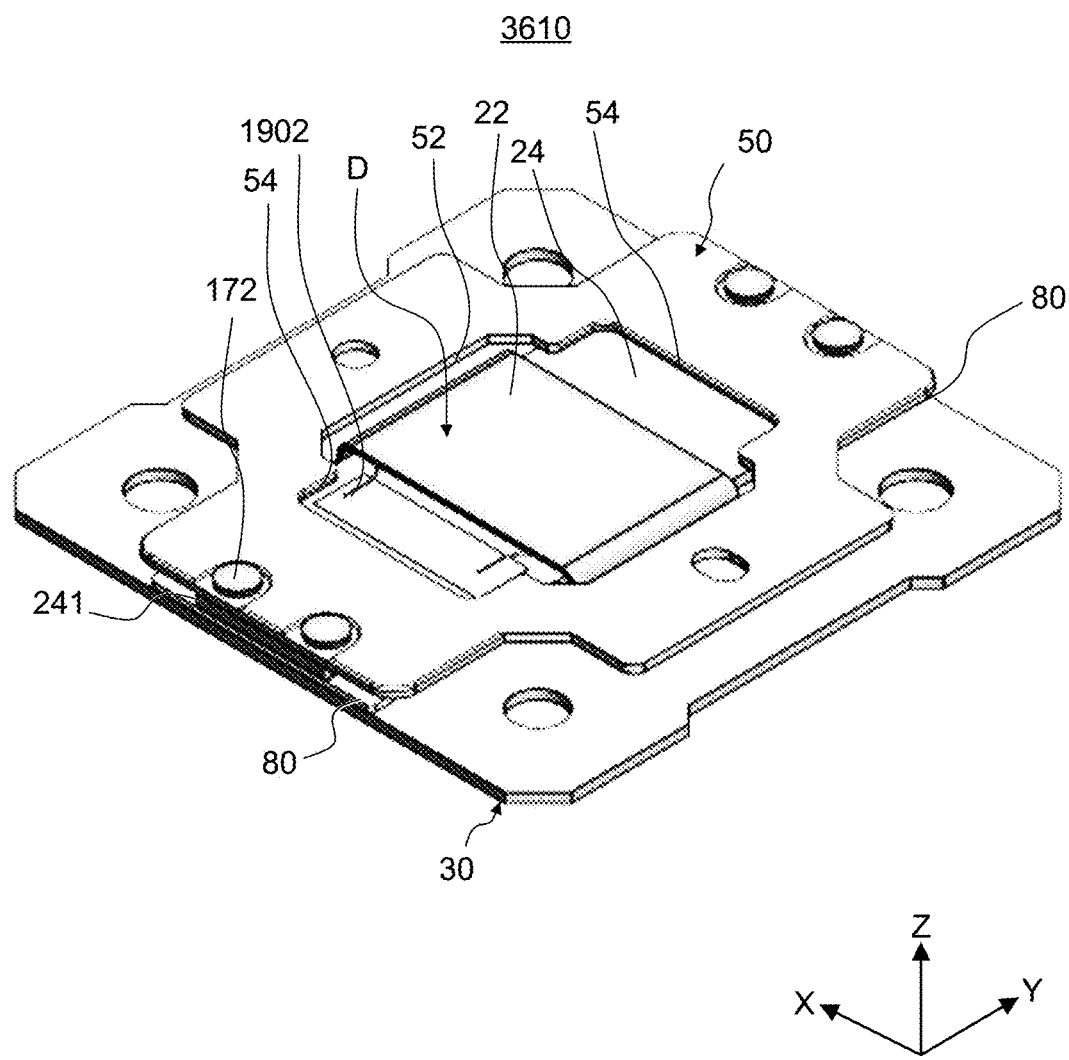
FIG. 47 is a perspective view of other variation 21 of the vibration actuator.
Figure 48:
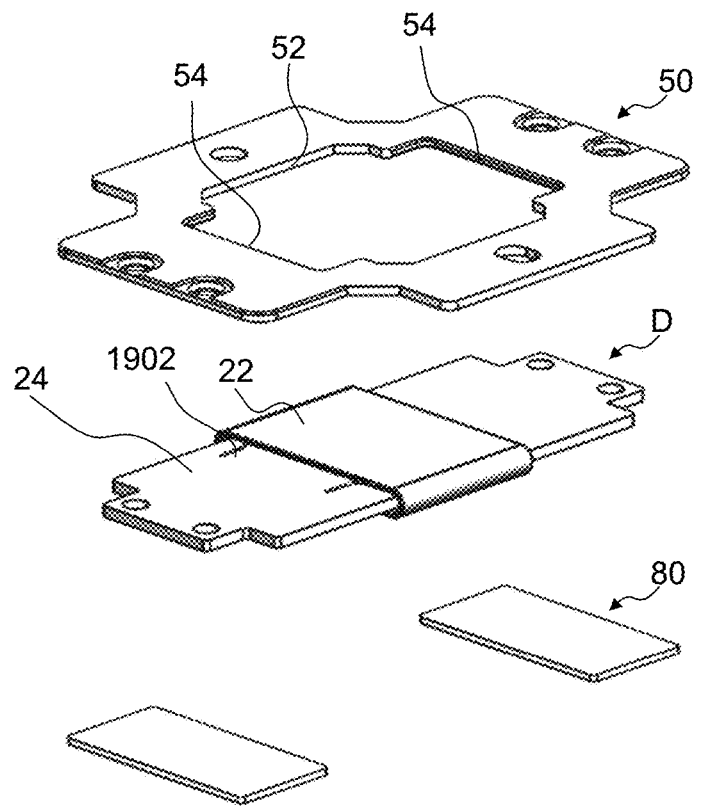
FIG. 48 is an exploded perspective view of other variation 21 of the vibration actuator.
Figure 48:
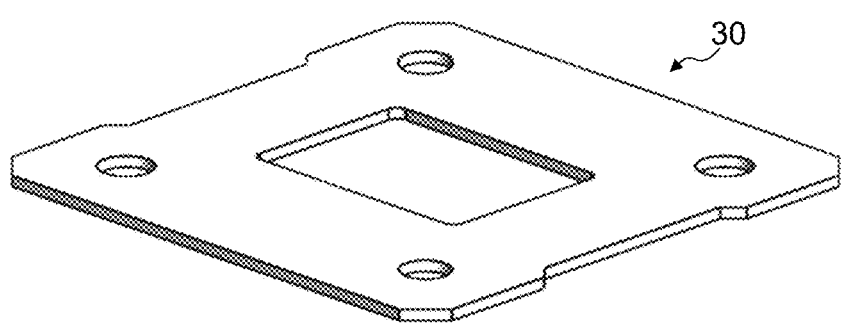
Figure 49:
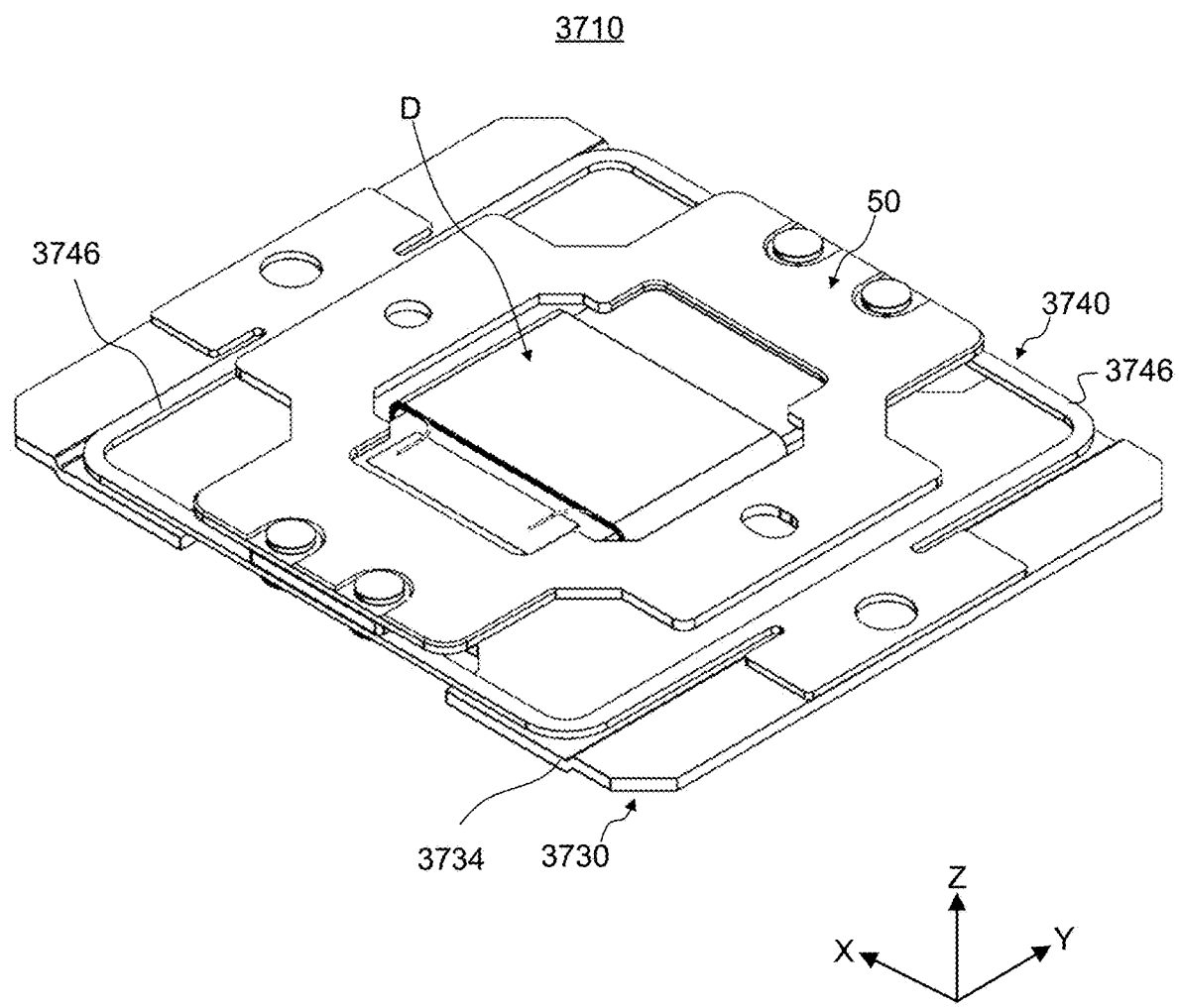
FIG. 49 is a perspective view of other variation 22 of the vibration actuator.
Figure 50:
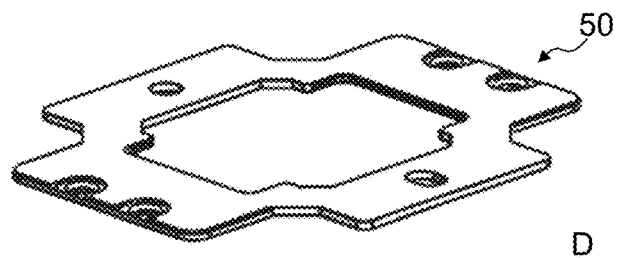
FIG. 50 is an exploded perspective view of other variation 22 of the vibration actuator.
Figure 50:
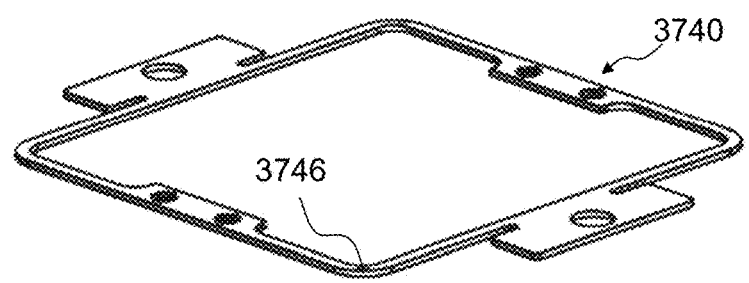
Figure 50:
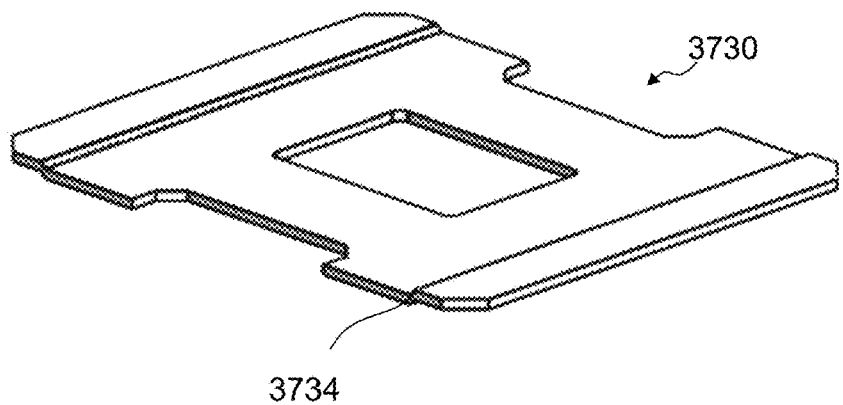
Figure 50:
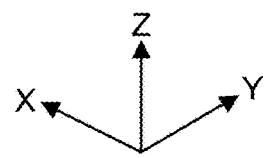
Figure 51:
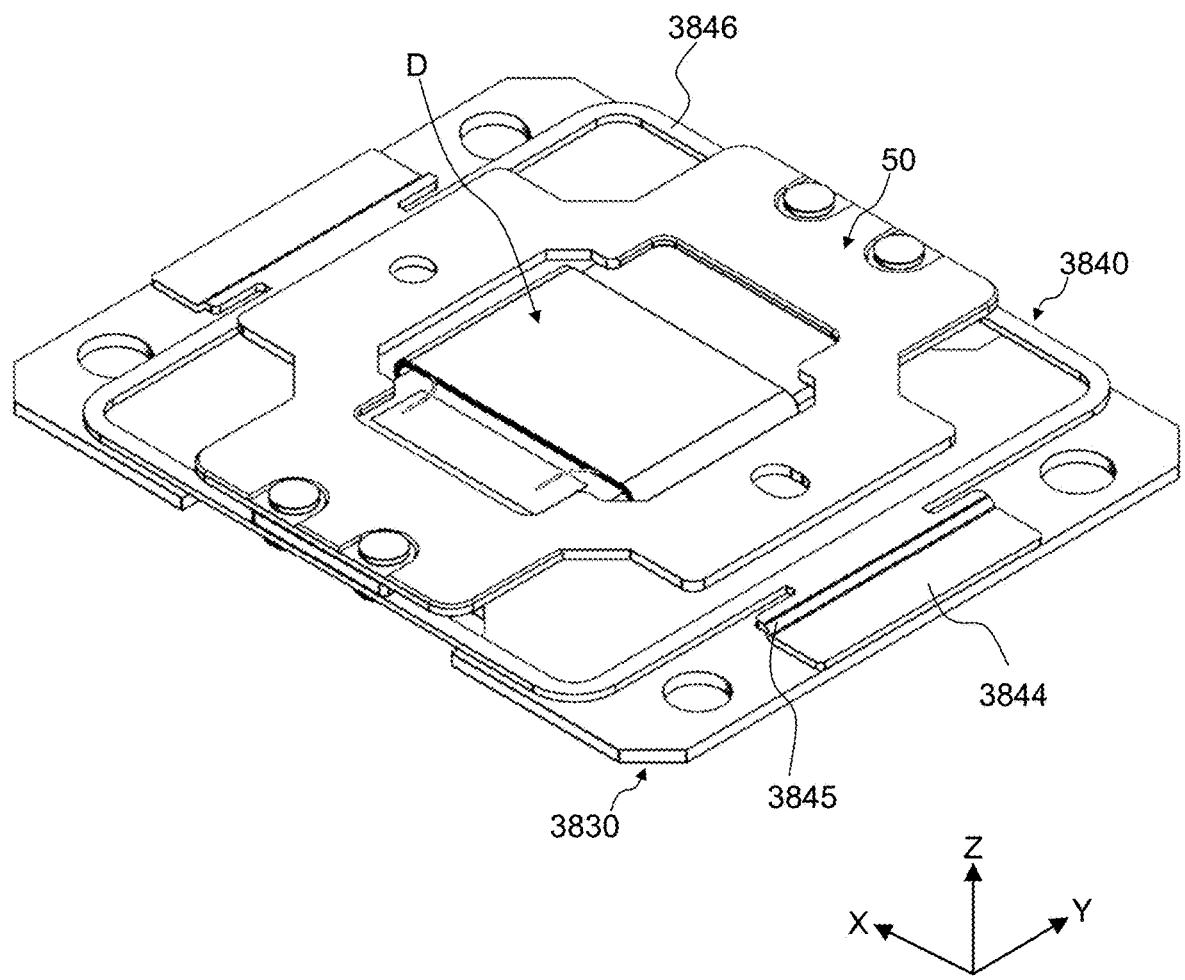
FIG. 51 is a perspective view of other variation 23 of the vibration actuator.
Figure 52:
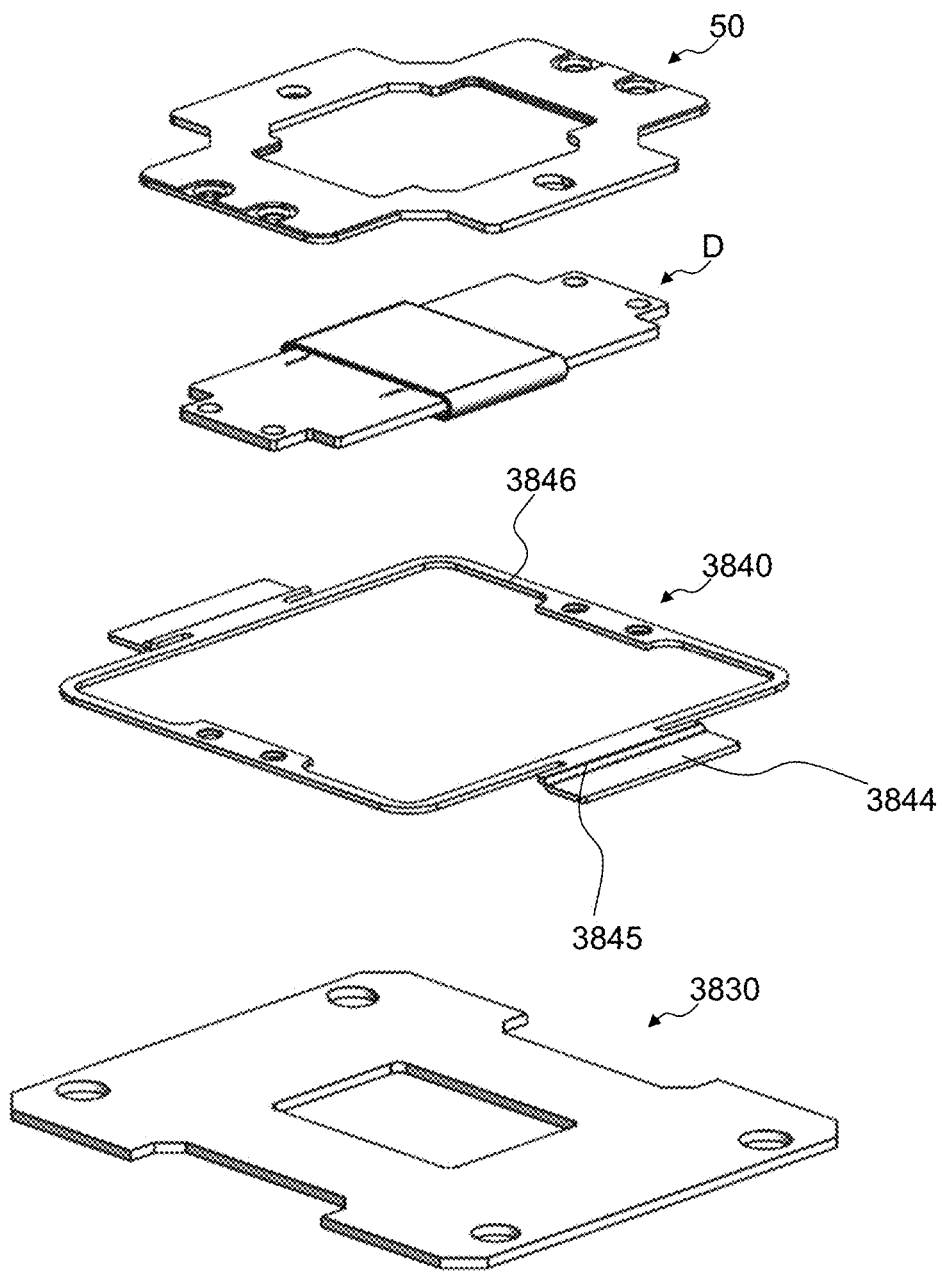
FIG. 52 is an exploded perspective view of other variation 23 of the vibration actuator.

FIG. 47 is a perspective view of other variation 21 of the vibration actuator according to the embodiment of the present invention, and FIG. 48 is an exploded perspective view of other variation 21.

As shown in vibration actuator 3610 illustrated in the drawing, in place of the frame-shaped elastic body (see FIG. 8), elastic body (rubber plate) 80 having a plate shape may be disposed between base plate 30 and electromagnet D (more specifically, spring connection portions 241 and 242 at both end portions of core 24 around which a coil is wound).

Core 24 is configured to be vibrated by this elastic body (rubber plate) 80 having a plate shape. Further, vibration actuator 3610 includes weight plate 50 (see FIGS. 45 and 46) instead of weight section 26 (see FIG. 8), and weight plate 50 is fixed to core 24 at both end portions of coil 22. Note that weight plate 50 is a frame member including an opening (opening portion 52) in the region of coil 22, and includes opening portion 54 in the region of coil wiring connection portion 1902. At elastic body (rubber plate) 80 having a plate shape, spring connection portions 241 and 242 at both ends of the core and the both end portions of weight plate 50 are fastened to base plate 30 by fastening member 172 (see FIG. 47). This configuration makes it possible to obtain the same effects as in vibration actuator 1410, achieve reduction in the height of the actuator, and facilitate manufacturing.

16. Other Variations 22, 23

FIGS. 49 to 52 are perspective views and exploded perspective views of other variations 22 and 23 of the vibration actuator according to the embodiment of the present invention. In vibration actuators 3710 and 3810 illustrated in FIGS. 49 to 52, a configuration is also considered in which, in order to have a vibration space for electromagnet D, a bending process is performed on base plate 3730 or elastic body (plate-shaped elastic section) 3840 including frame spring 3846, instead of adjusting the space with the thickness (length in the Z direction) of frame spring 3746 or 3846 elastically deformed.

That is, the vibration amplitude of electromagnet D in the space formed between electromagnet D and base plate 3730 or 3830 is defined by obtaining the height by the bending process of base plate 3730 or elastic body 3840 (plate-side fixing portion 3844 connected to frame spring 3846).

In vibration actuator 3710, the connection position with elastic body 3740 is raised in height by bent portion 3734 of base plate 3730. Further, in vibration actuator 3810, frame spring 3846 is raised in height by bent portion 3845 serving as a step. The above configurations make it possible to select the optimal material and spring constant of the elastic body and further determine the width and height of the vibration space separately from the material and spring constant, thereby increasing the degree of freedom in design. Further, since no separate component for height adjustment is necessary, the number of components can be reduced.

17. Other Variation 24

Figure 53:
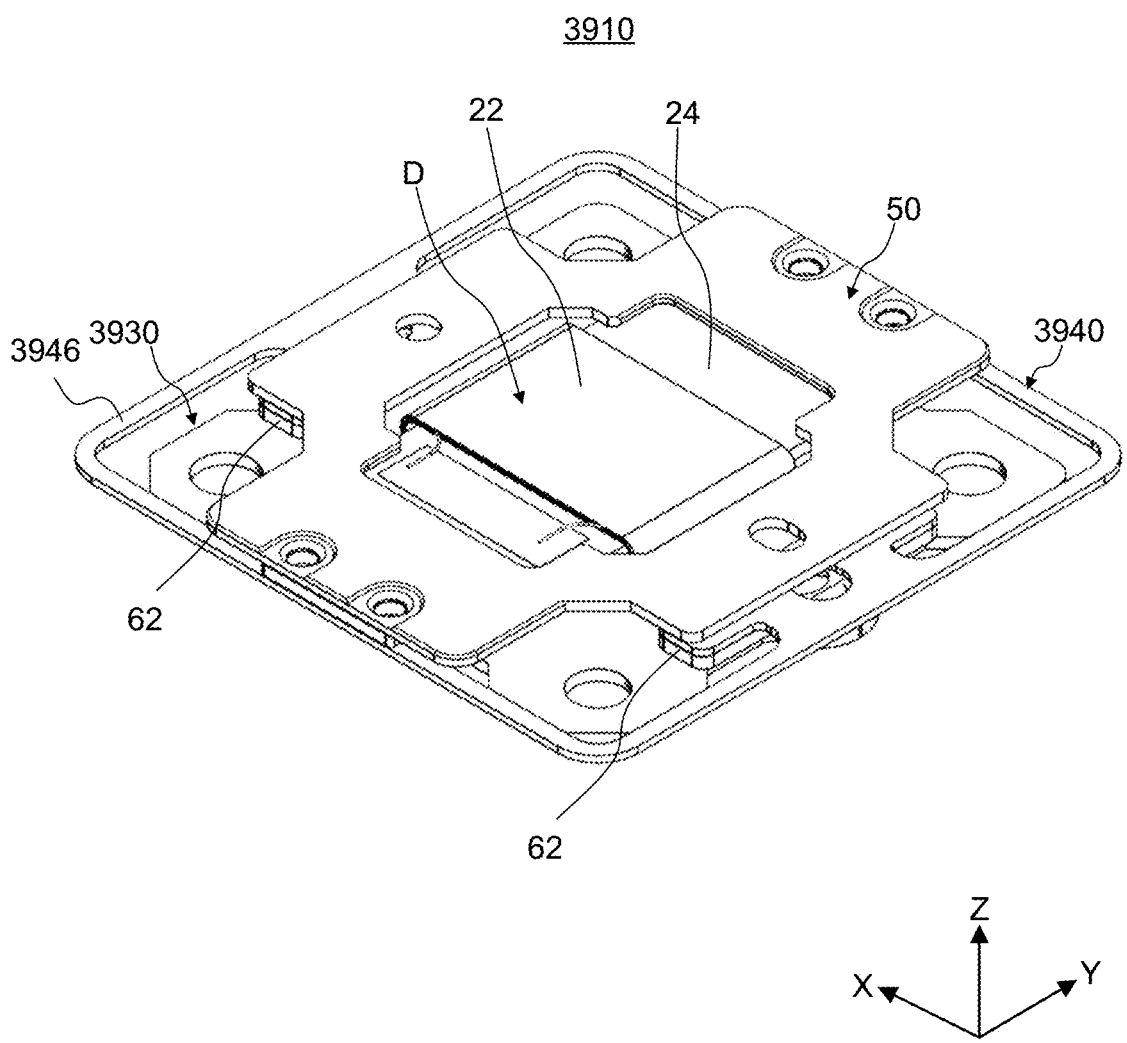
FIG. 53 is a perspective view of other variation 24 of the vibration actuator.
Figure 54:
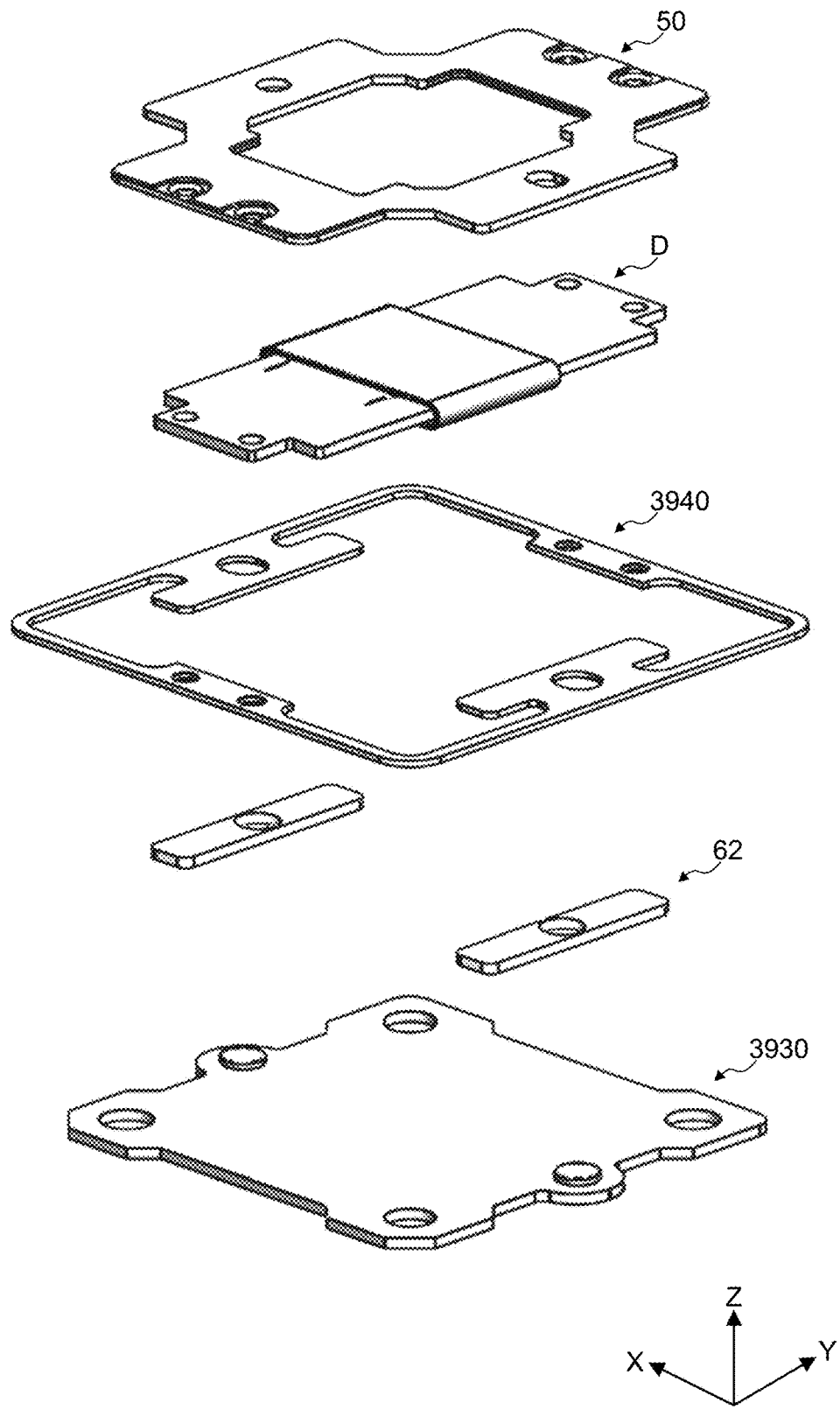
FIG. 54 is an exploded perspective view of other variation 24 of the vibration actuator.
Figure 55:
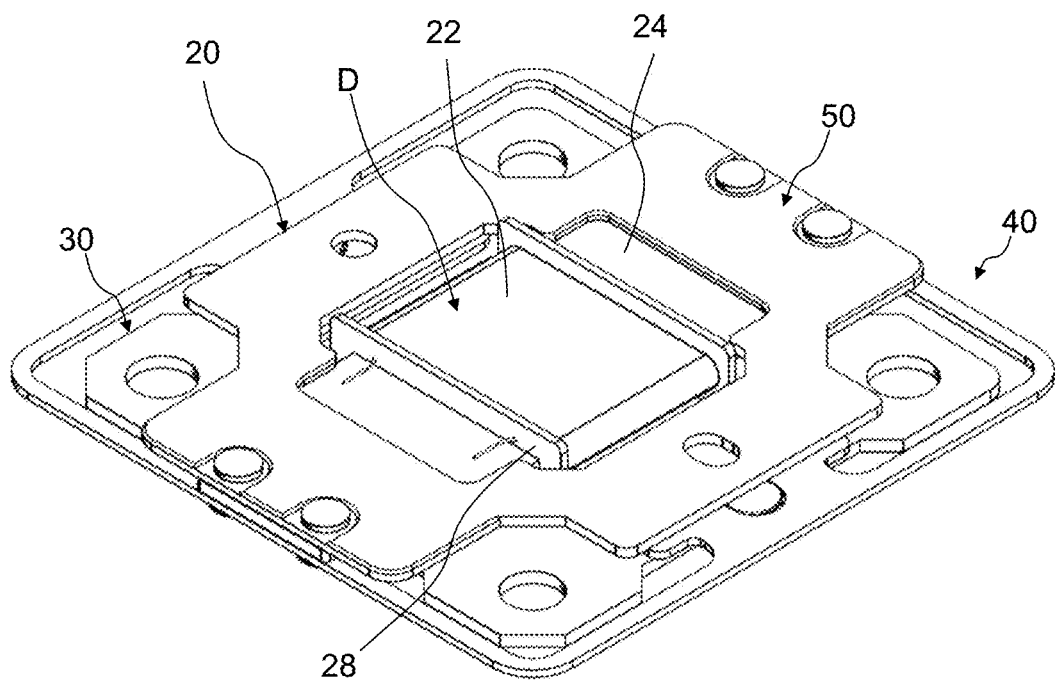
FIG. 55 is a perspective view of other variation 25 of the vibration actuator.
Figure 55:
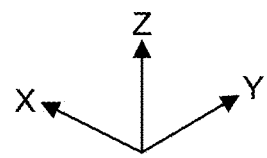
Figure 56:
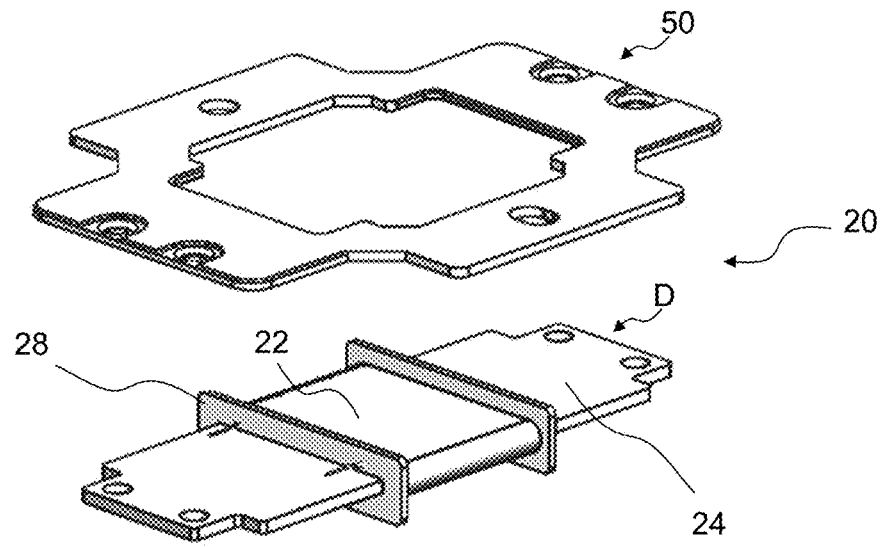
FIG. 56 is an exploded perspective view of other variation 25 of the vibration actuator.
Figure 56:
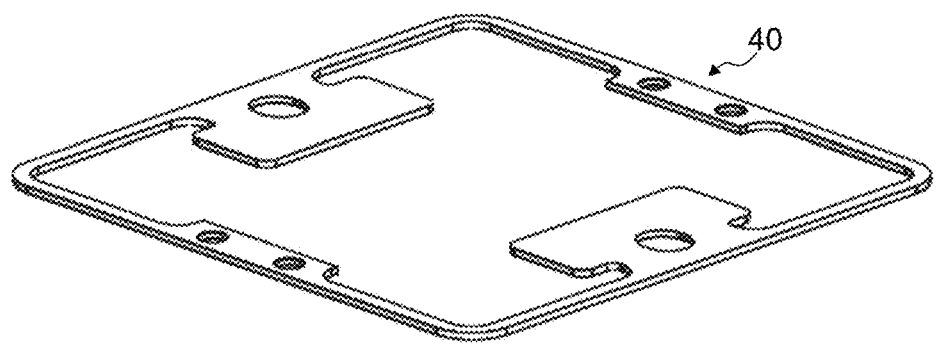
Figure 56:
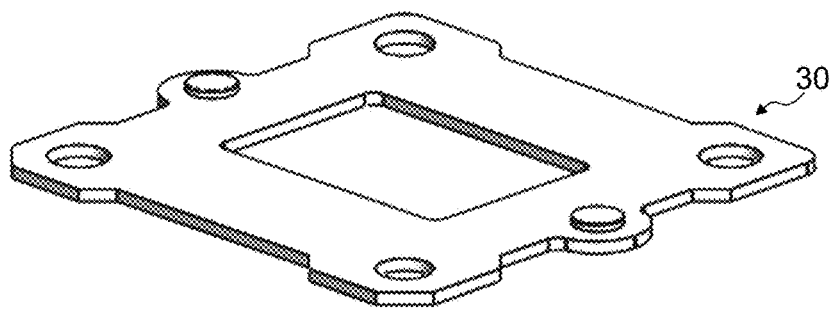
Figure 56:
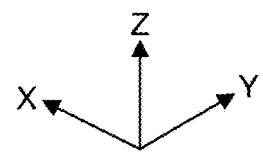

FIG. 53 is a perspective view of other variation 24 of the vibration actuator according to the embodiment of the present invention, and FIG. 54 is an exploded perspective view of other variation 24.

As shown in vibration actuator 3910 illustrated in the drawing, it is also possible to constitute an actuator without providing an opening in the base section, which is the base plate. Base plate 3930 is a base plate having high magnetic permeability and a shape without an opening portion in a configuration of base section 30 (see FIG. 8). Electromagnet D including coil 22 in the central portion of core 24 having a plate shape is disposed on this base plate 3930.

Further, elastic body 3940, which is a frame body surrounding base plate 3930, is connected to base plate 3930 while supporting plate-like core 24. In this configuration, electromagnet D of movable section 20 vibrates in the vertical direction with respect to the plate surface of core 24 due to the magnetic force generated by energization of coil 22. In that case, for adjusting the distance between coil 22 and base plate 30, it is necessary to place spacer 62 illustrated in FIG. 53 or perform a bending process on base plate 30 and/or elastic body 3940 itself (see FIGS. 49 to 52).

Spacer 62 is provided and interposed between base plate 3930 and the plate-side connection portion of elastic body 3940.

18. Other Variations 25, 26, and 27

FIGS. 55 to 60 are perspective views and exploded perspective views of other variations 25 to 27 of the vibration actuator according to the embodiment of the present invention. Electromagnet D may be formed so that coil 22 is wound around bobbin 28 formed in core 24 as in vibration actuator 4010 illustrated in FIGS. 55 and 56.

Figure 57:
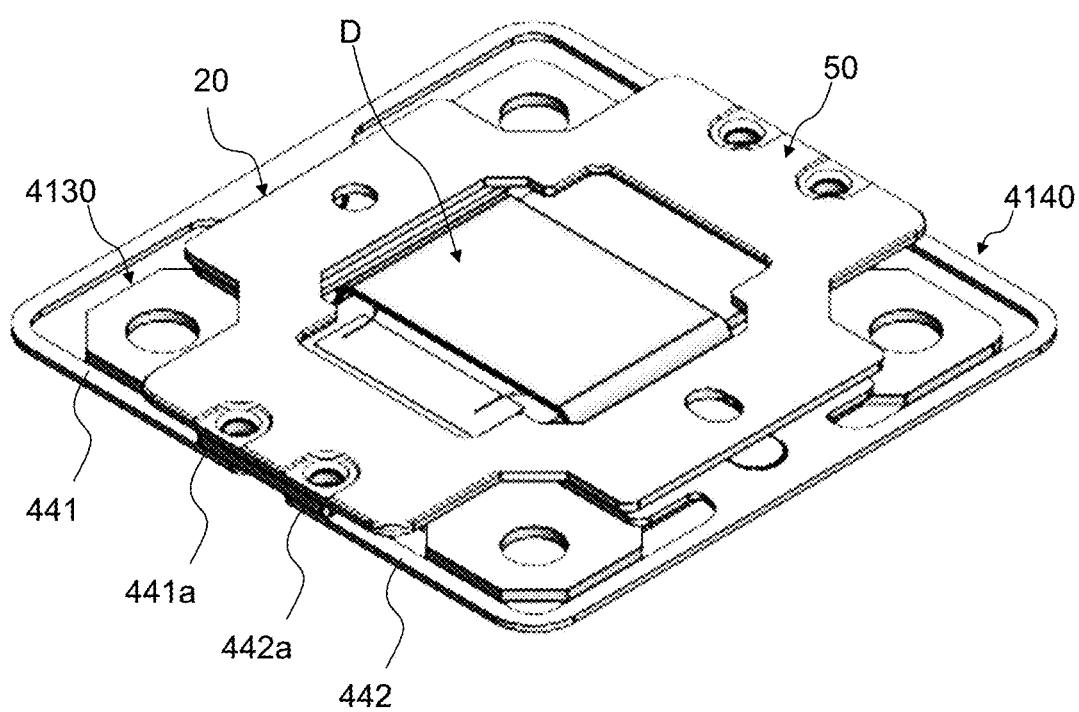
FIG. 57 is a perspective view of other variation 26 of the vibration actuator.
Figure 57:
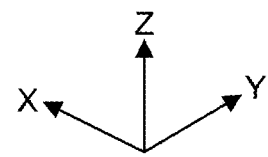
Figure 58:
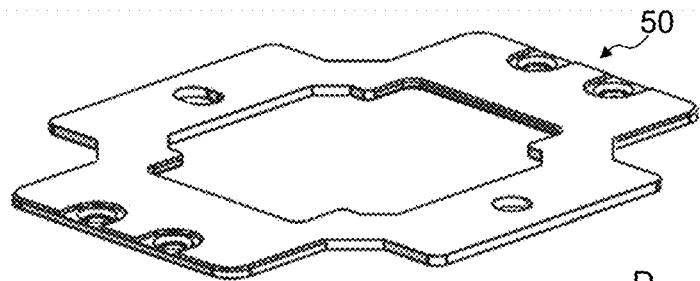
FIG. 58 is an exploded perspective view of other variation 26 of the vibration actuator.
Figure 58:
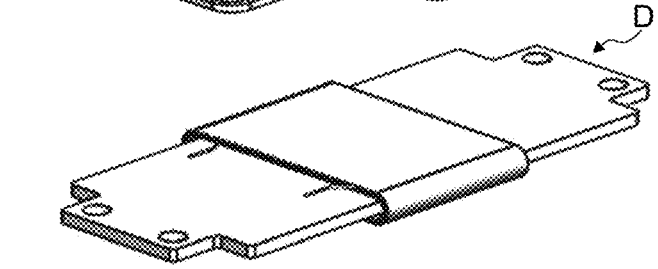
Figure 58:
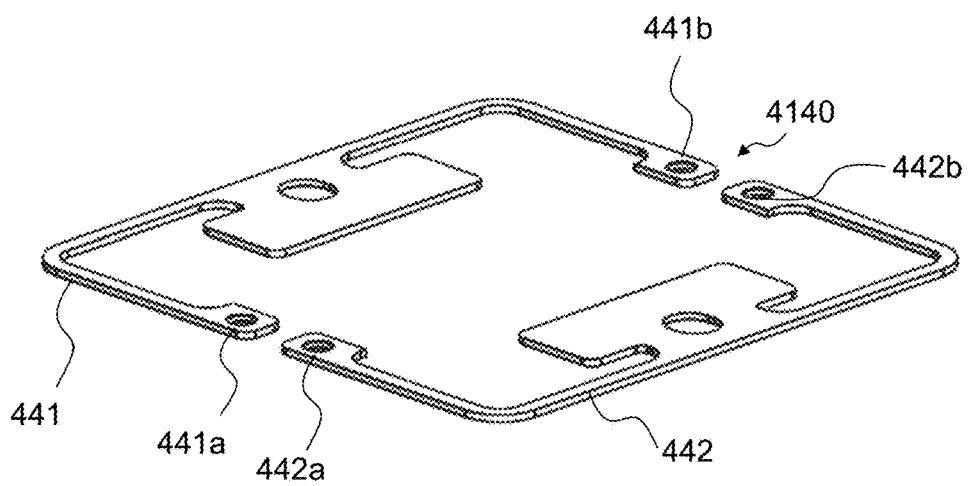
Figure 58:
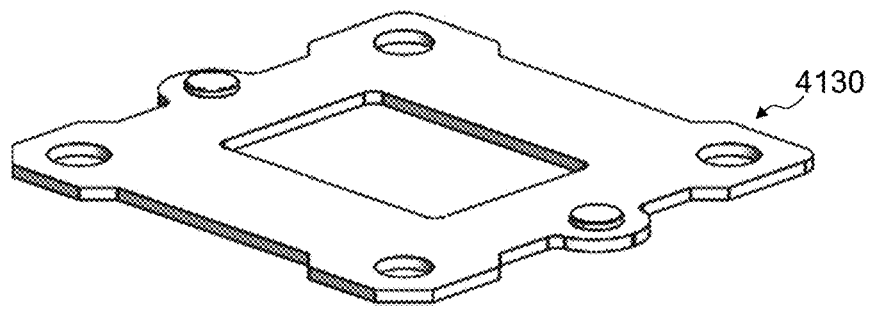
Figure 58:
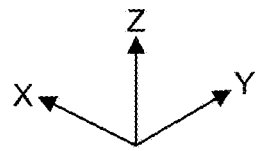

As shown in vibration actuator 4110 illustrated in FIGS. 57 and 58, elastic body (see FIGS. 8 and 9) 4140 having a frame shape may be divided and configured (divided bodies 441 and 442). Divided bodies 441 and 442 are connected to electromagnet D and weight 50 respectively at one end portion 441*a* and 442*a* and the other end portions 441*b* and 442*b*.

Figure 59:
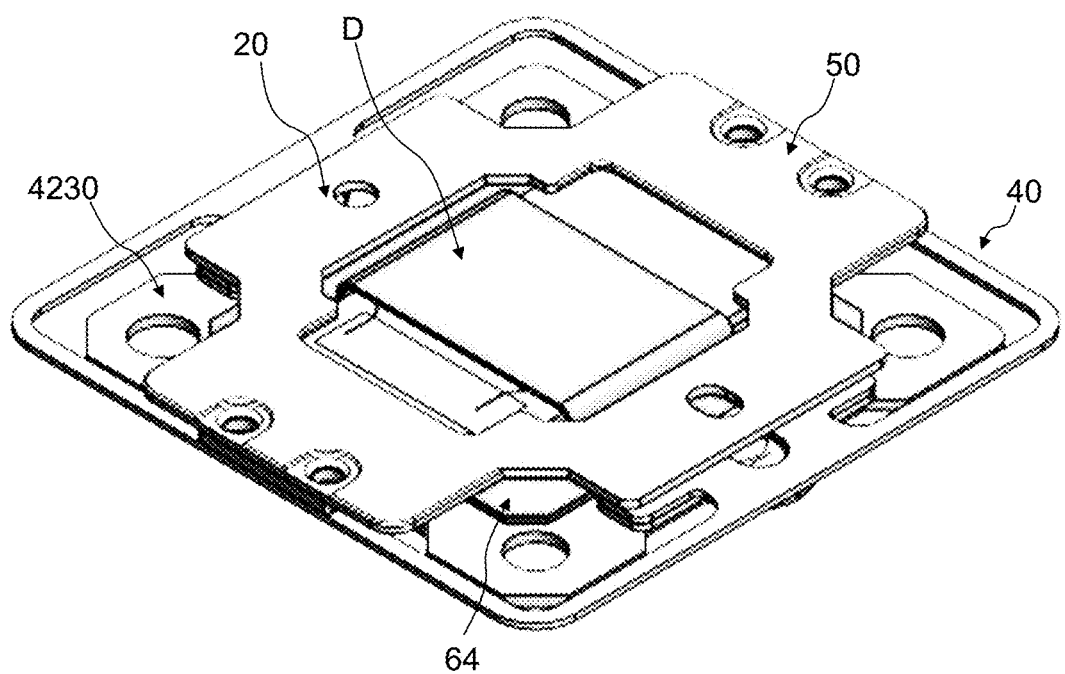
FIG. 59 is a perspective view of other variation 27 of the vibration actuator.
Figure 59:
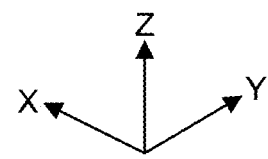
Figure 60:
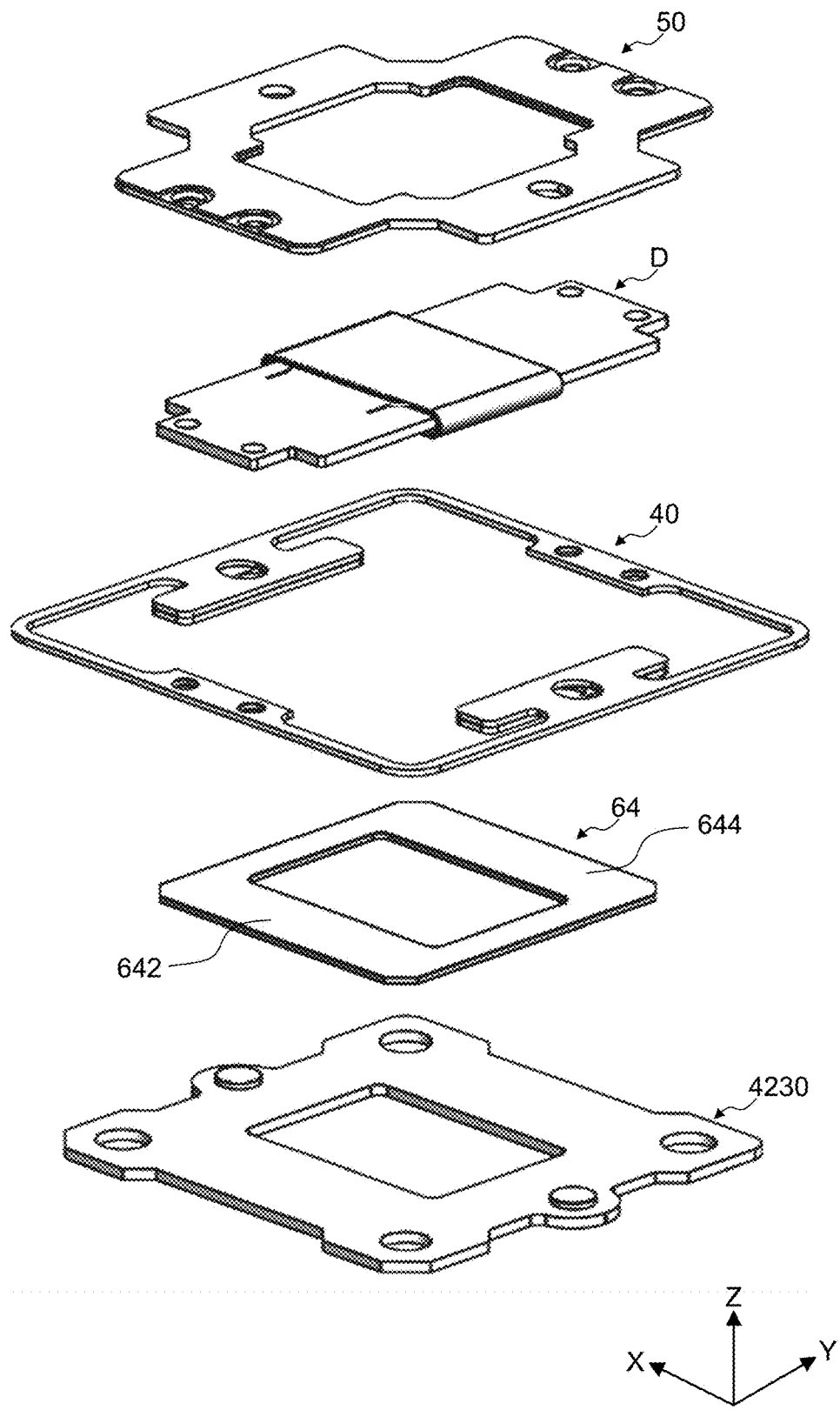
FIG. 60 is an exploded perspective view of other variation 27 of the vibration actuator.

Further, as shown in vibration actuator 4210 illustrated in FIGS. 59 and 60, base plate 4230 may be a nonmagnetic body, and yoke 64 having a rectangular frame shape may be separately provided on base plate 4230 so as to surround the opening portion to form a magnetic path of electromagnet D. In yoke 64, a pair of opposite sides 642 and 644 constituting the frame may face the magnetic pole portion of electromagnet D in the vertical direction.

19. Other Variation 28

Figure 61:
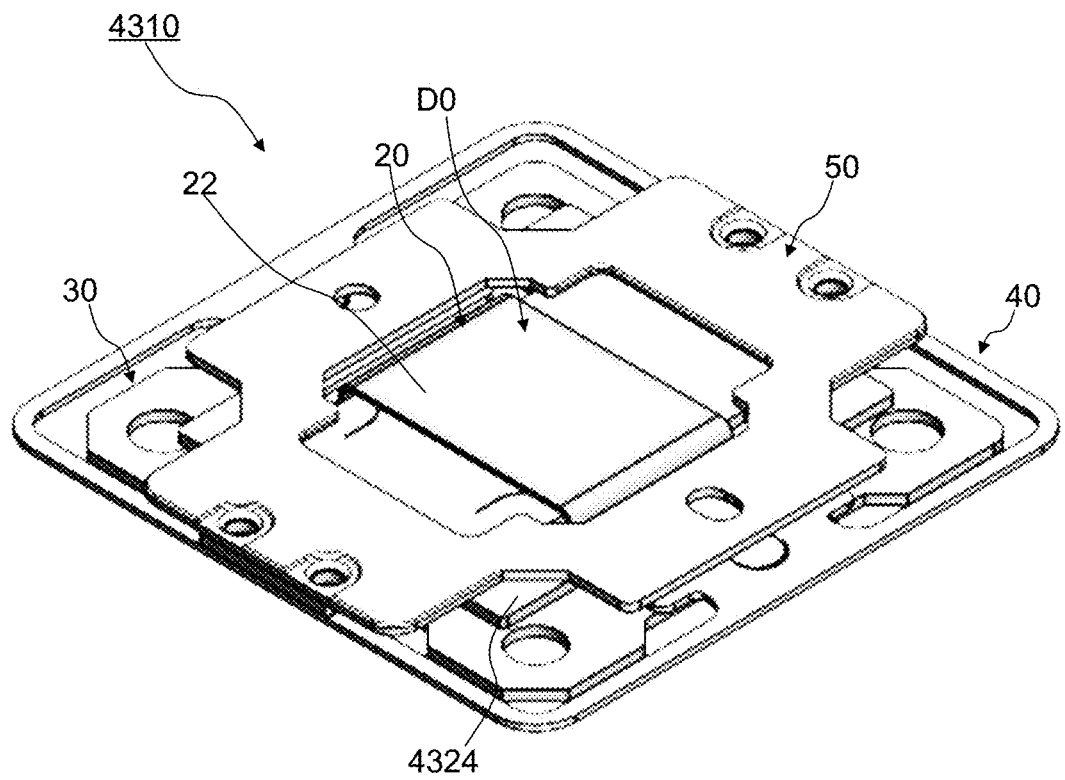
FIG. 61 is a perspective view of other variation 28 of the vibration actuator.
Figure 62:
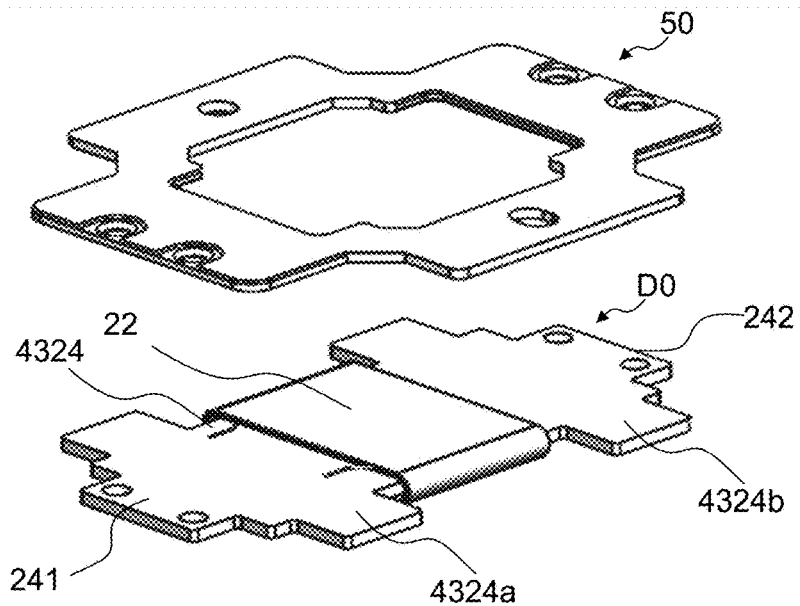
FIG. 62 is an exploded perspective view of other variation 28 of the vibration actuator.
Figure 62:
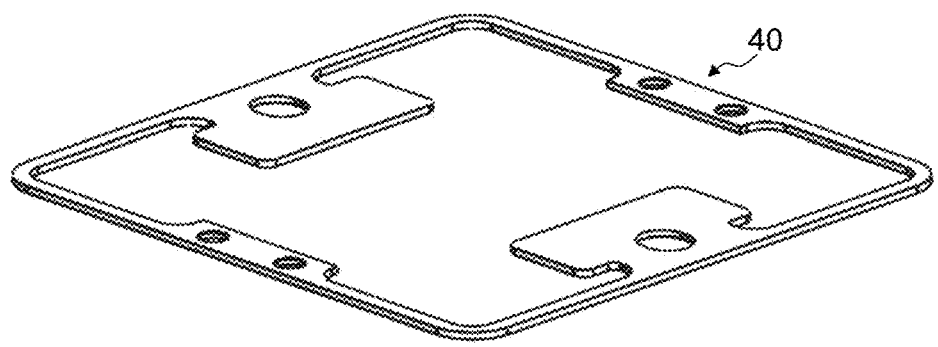
Figure 62:
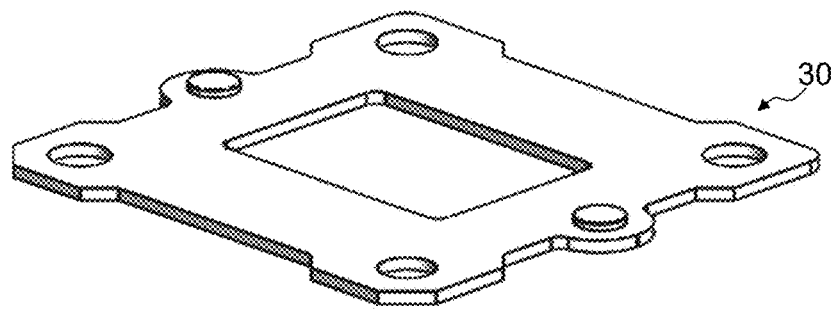
Figure 62:
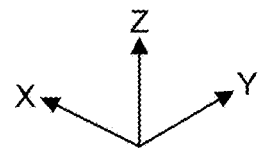
Figure 63:
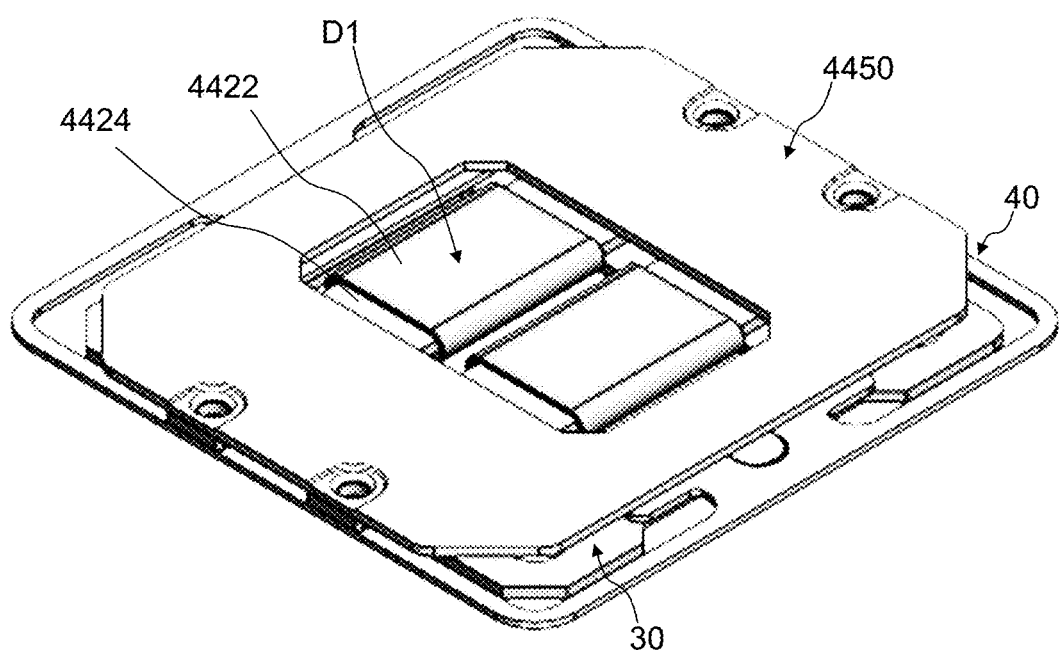
FIG. 63 is a perspective view of other variation 29 of the vibration actuator.
Figure 64:
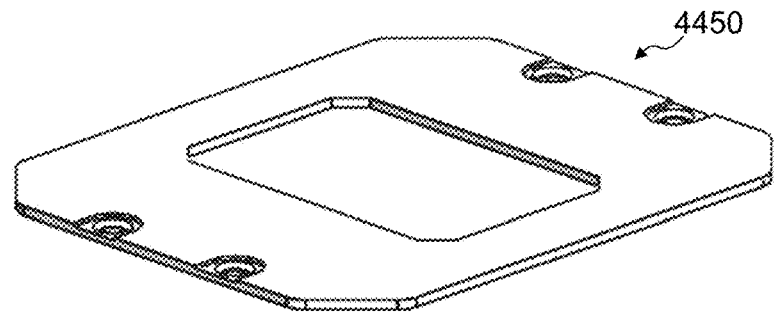
FIG. 64 is an exploded perspective view of other variation 29 of the vibration actuator.
Figure 64:
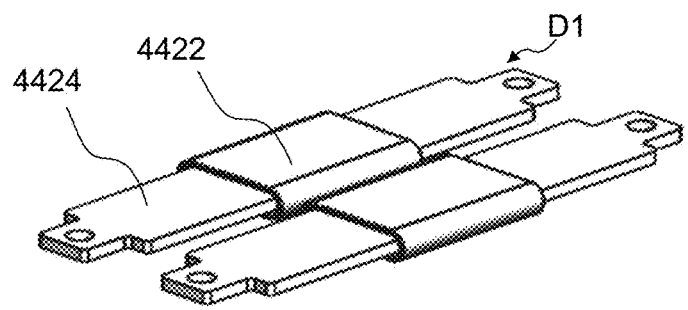
Figure 64:
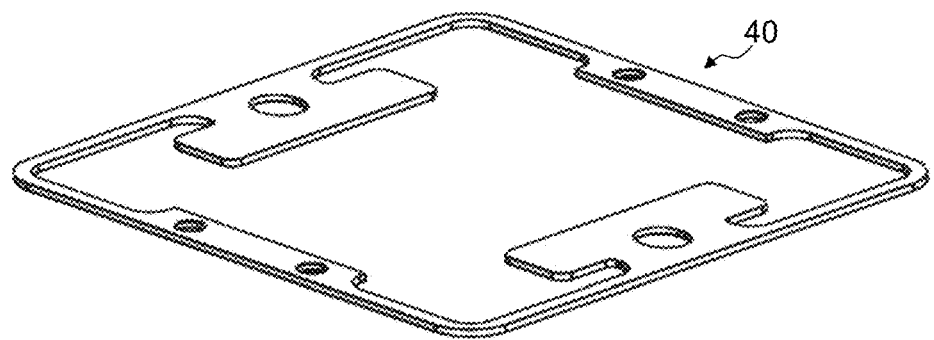
Figure 64:
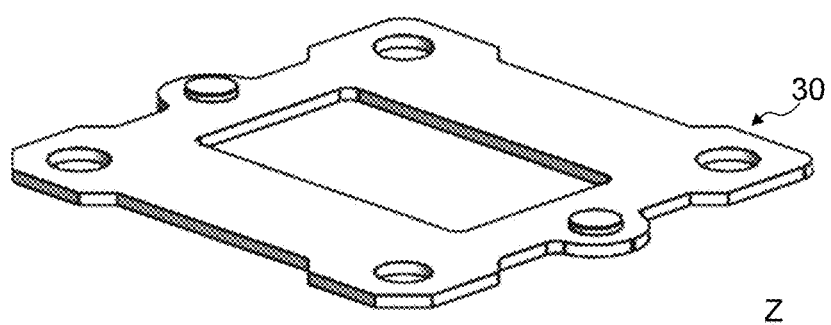
Figure 64:
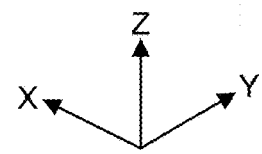
Figure 65:
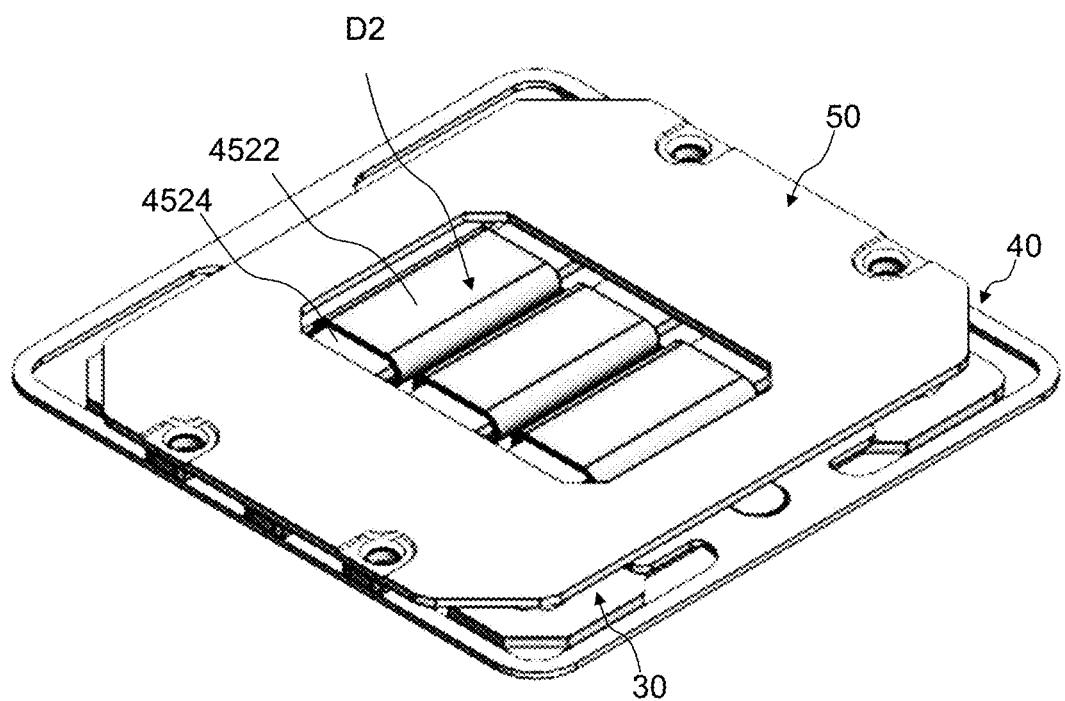
FIG. 65 is a perspective view of other variation 30 of the vibration actuator.
Figure 66:
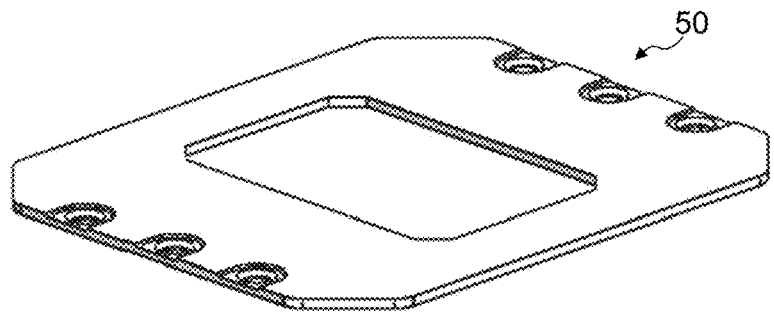
FIG. 66 is an exploded perspective view of other variation 30 of the vibration actuator.
Figure 66:
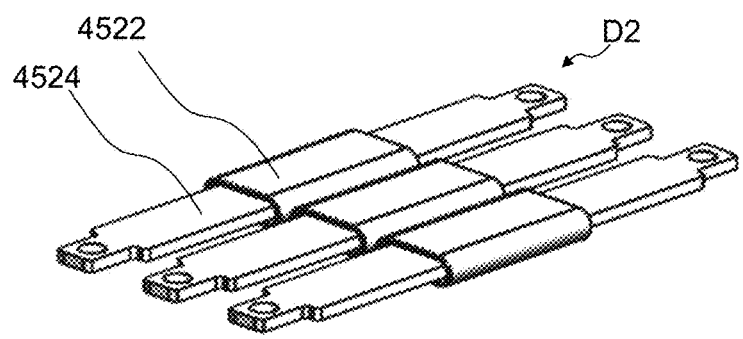
Figure 66:
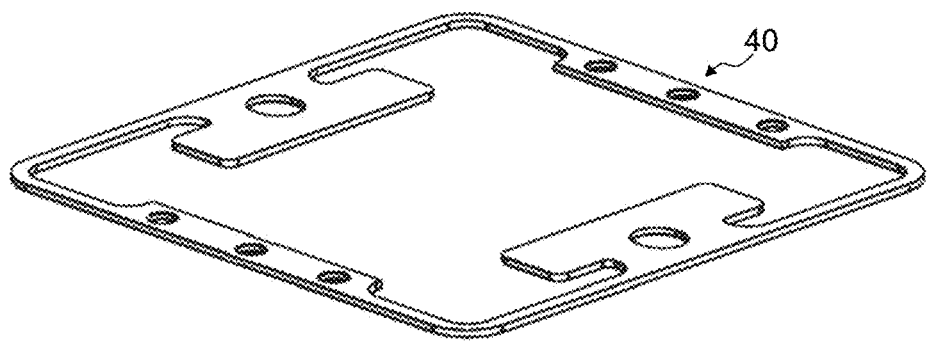
Figure 66:
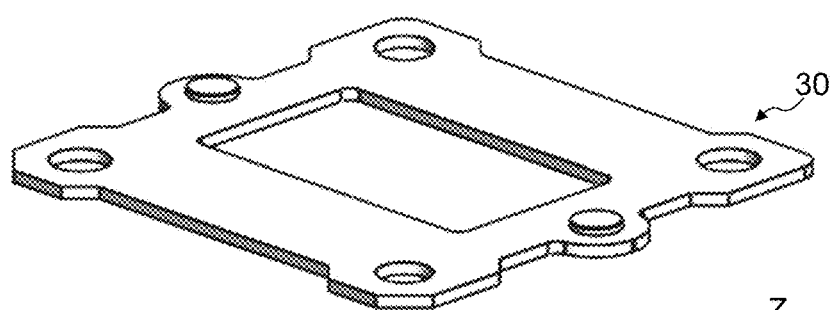
Figure 66:
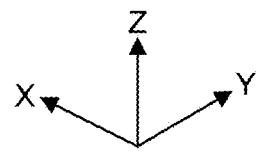
Figure 67:
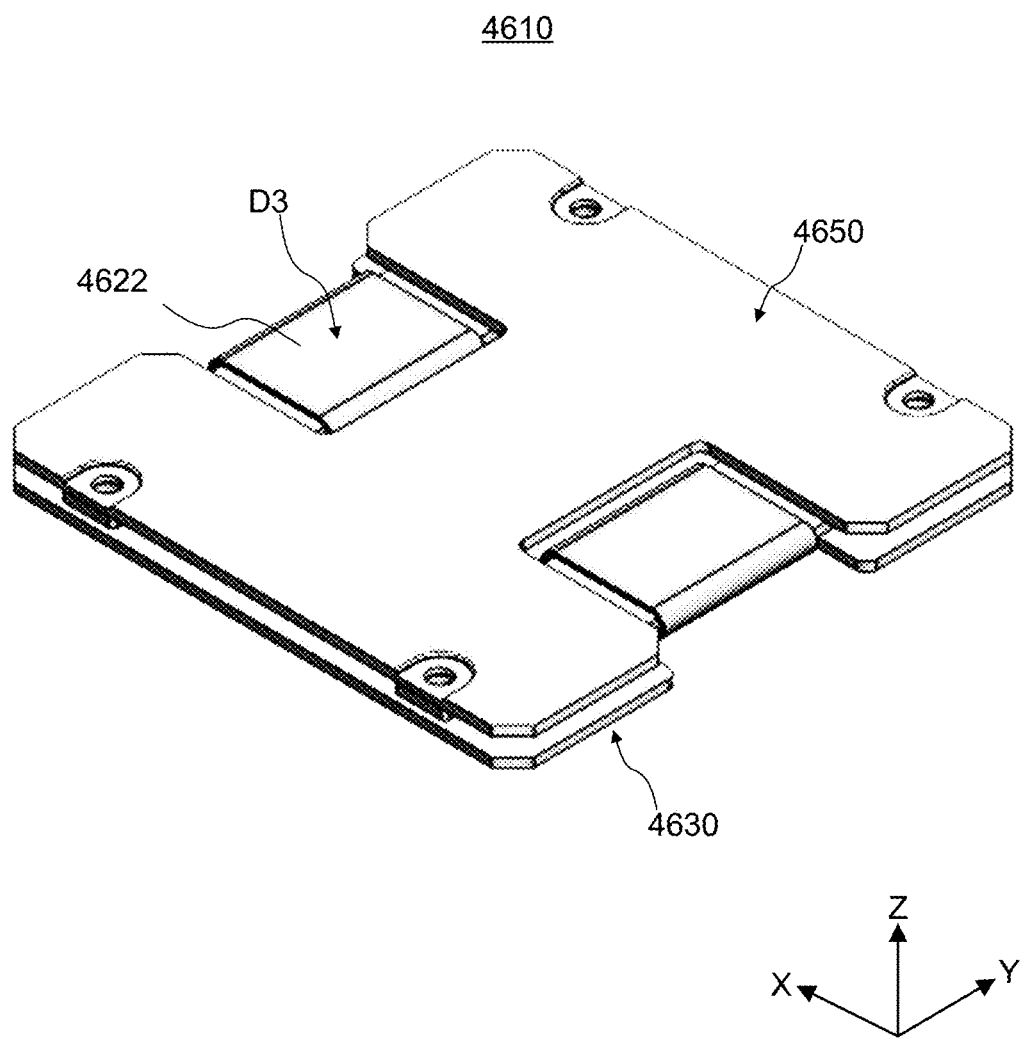
FIG. 67 is a perspective view of other variation 31 of the vibration actuator.
Figure 68:
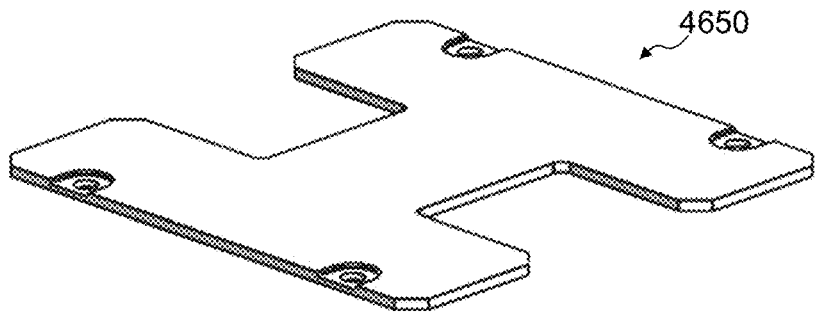
FIG. 68 is an exploded perspective view of other variation 31 of the vibration actuator.
Figure 68:
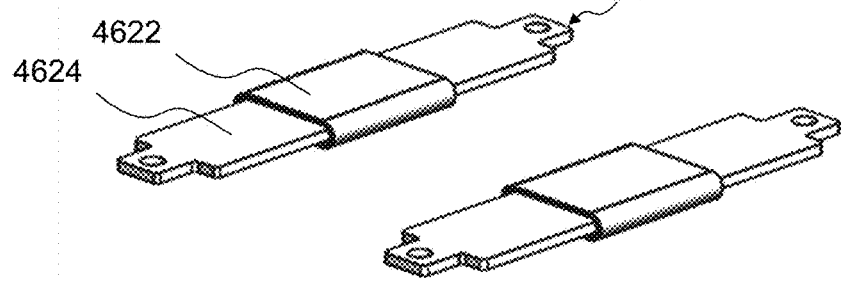
Figure 68:
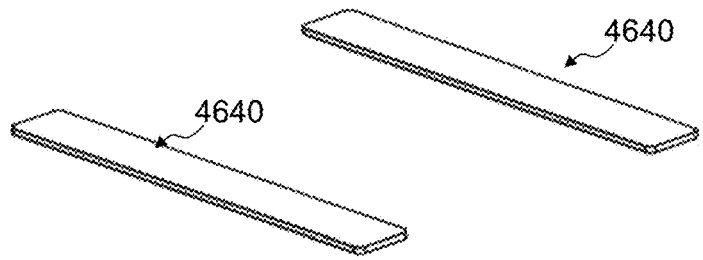
Figure 68:
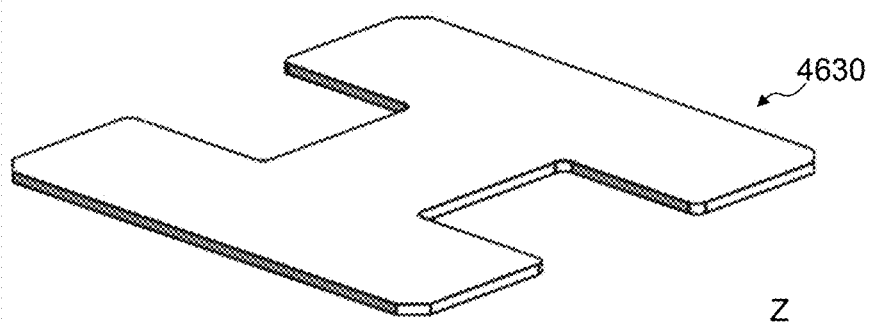
Figure 68:
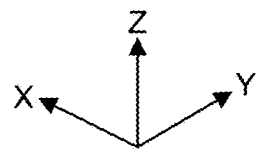
Figure 69:
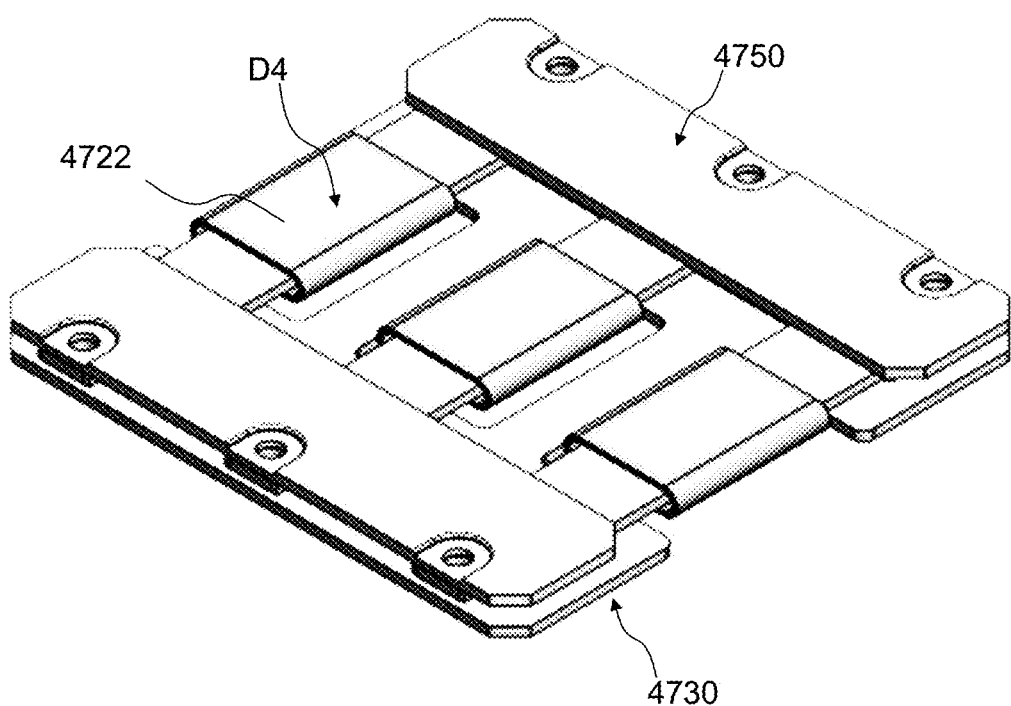
FIG. 69 is a perspective view of other variation 32 of the vibration actuator.
Figure 70:
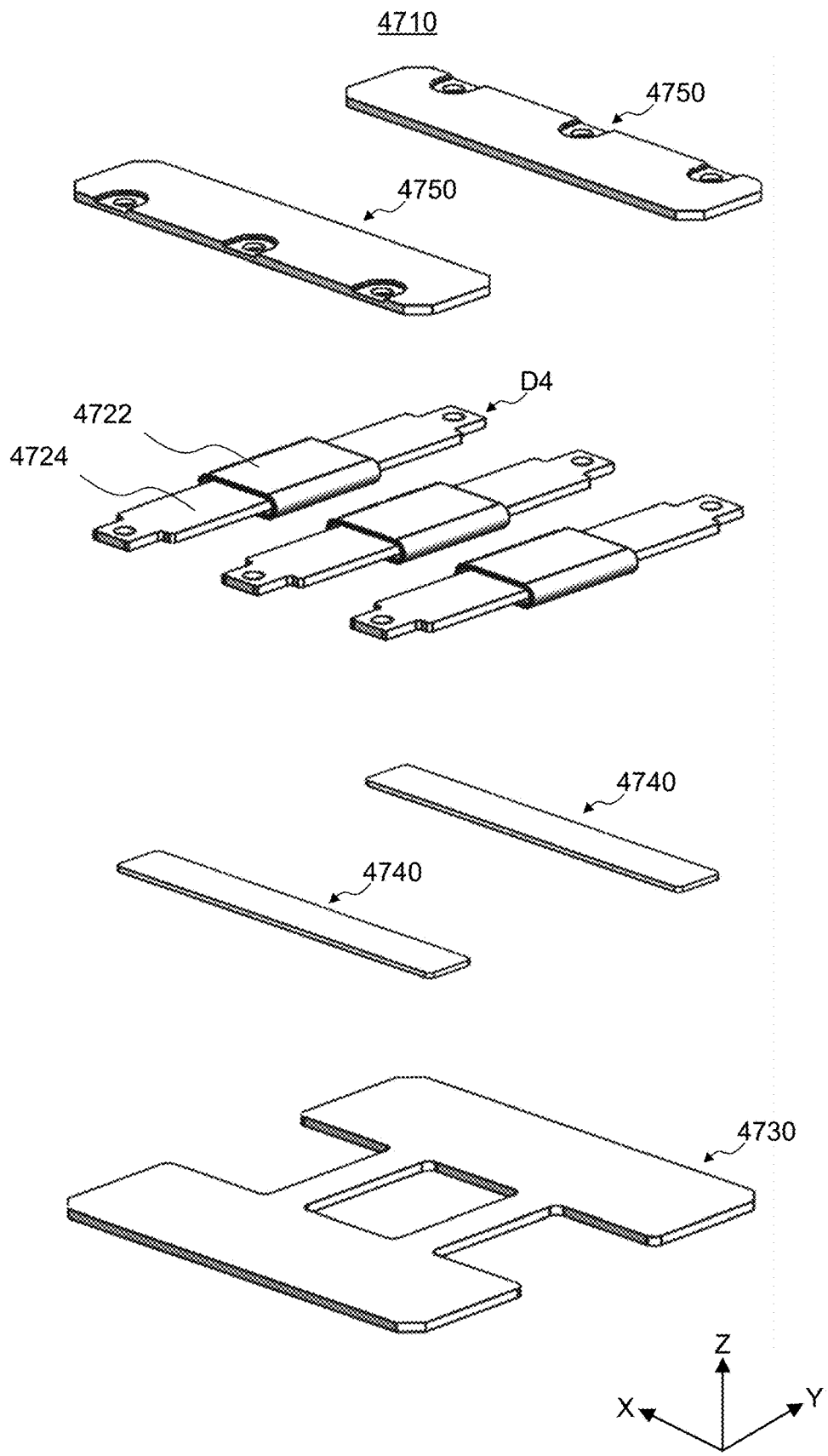
FIG. 70 is an exploded perspective view of other variation 32 of the vibration actuator.

FIG. 61 is a perspective view of other variation 28 of the vibration actuator according to the embodiment of the present invention, and FIG. 62 is an exploded perspective view of other variation 28. As shown in vibration actuator 4310 illustrated in FIGS. 61 and 62, as electromagnet D0 in which coil 22 is disposed in the central portion on the outer side, both end portions 4324*a* and 4324*b* of core 4324 which has a plate shape and around which coil 22 is wound may each have a shape protruding in a direction orthogonal to the winding direction of coil 22. Note that core 4324 is a magnetic body in which coil 22 is disposed in the center on the outer side in the same manner as core 24, and spring connection portions 241 and 242 protruding in the core axial direction are provided at both end portions 4324*a* and 4324*b*, respectively. With this configuration, the area facing base plate 30, that is, the area which becomes a magnetic path, also increases, thereby realizing a magnetic circuit with a high magnetic efficiency.

20. Other Variations 29, 30, 31, 32, and 33

FIGS. 63 to 66 are perspective views and exploded perspective views of other variation 29 and another-variation 30 of the vibration actuator according to the embodiment of the present invention.

As shown in vibration actuators 4410 and 4510 illustrated in FIGS. 63 to 66, a plurality of cores and coils (core 4424 and coil 4422, and core 4524 and coil 4522) supported by elastic body 40 having a frame shape, that is, a plurality of electromagnets D1 and D2, may be formed and arranged in parallel. This configuration can reduce the height of vibration actuators 4410 and 4510 while keeping the generated magnetic force constant.

FIGS. 67 to 70 are perspective views and exploded perspective views of other variations 31 and 32 of the vibration actuator according to the embodiment of the present invention.

As shown in vibration actuators 4610 and 4710 in other variations 31 and 32 illustrated in the drawing, a plurality of electromagnets D3 and D4 (core 4624 and coil 4622, and core 4724 and coil 4722) are formed and arranged in parallel.

In each of vibration actuators 4610 and 4710, elastic bodies (same material as elastic body 1400) 4640 or 4740 having flat plate shapes are interposed between the plurality of electromagnets D3 and D4 and base plate 4630 or 4730.

Base plates 4630 and 4730 each have a shape that does not overlap with coil 4622 or 4722, together with weight 4650 or 4750. This configuration allows for fine adjustment of a sense of touch obtained by vibration actuator by appropriately changing and adjusting the size or number of electromagnets D3 and D4 or the shape or arrangement of elastic bodies D3 and D4.

Figure 71:
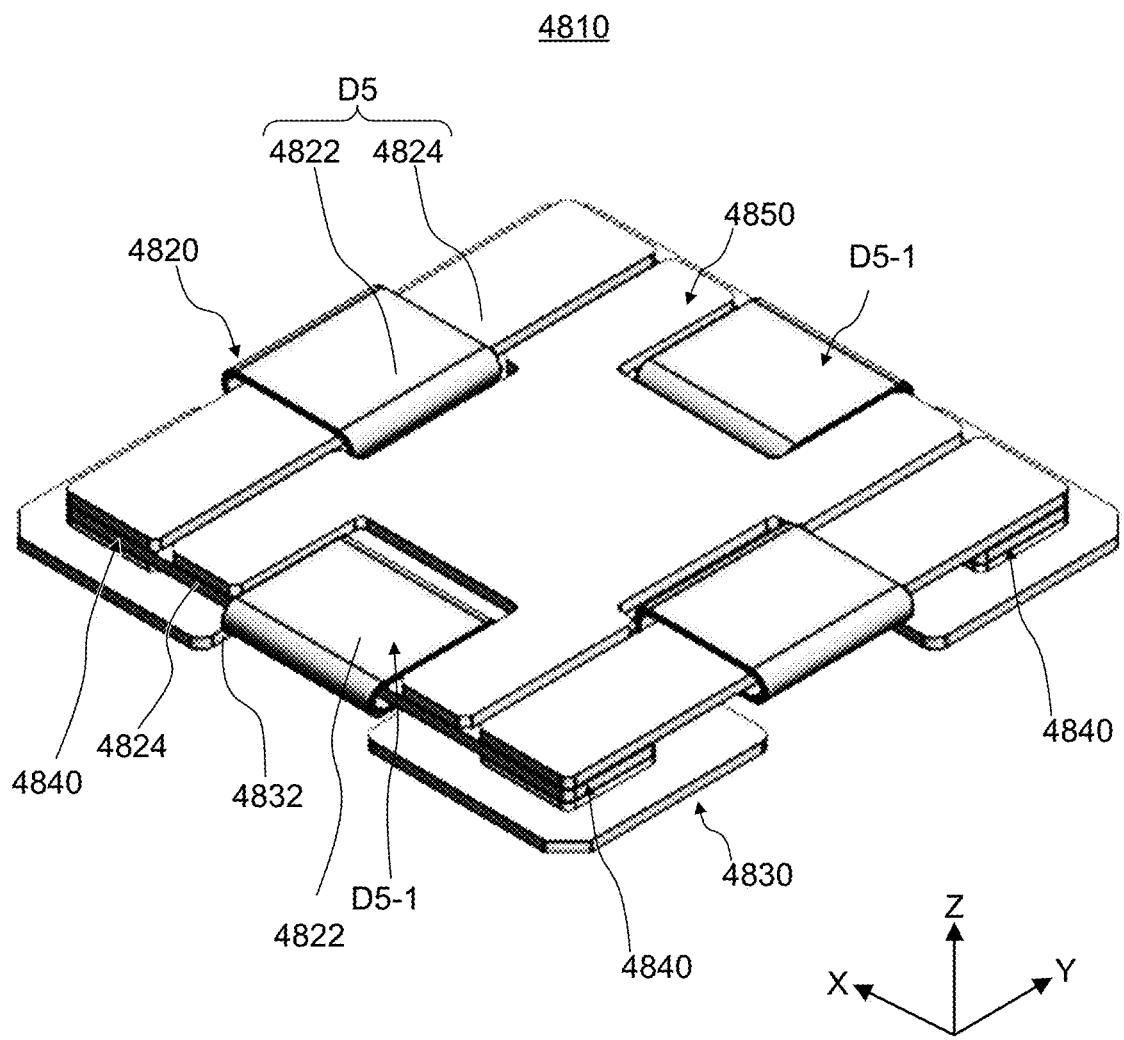
FIG. 71 is a perspective view of other variation 33 of the vibration actuator.
Figure 72:
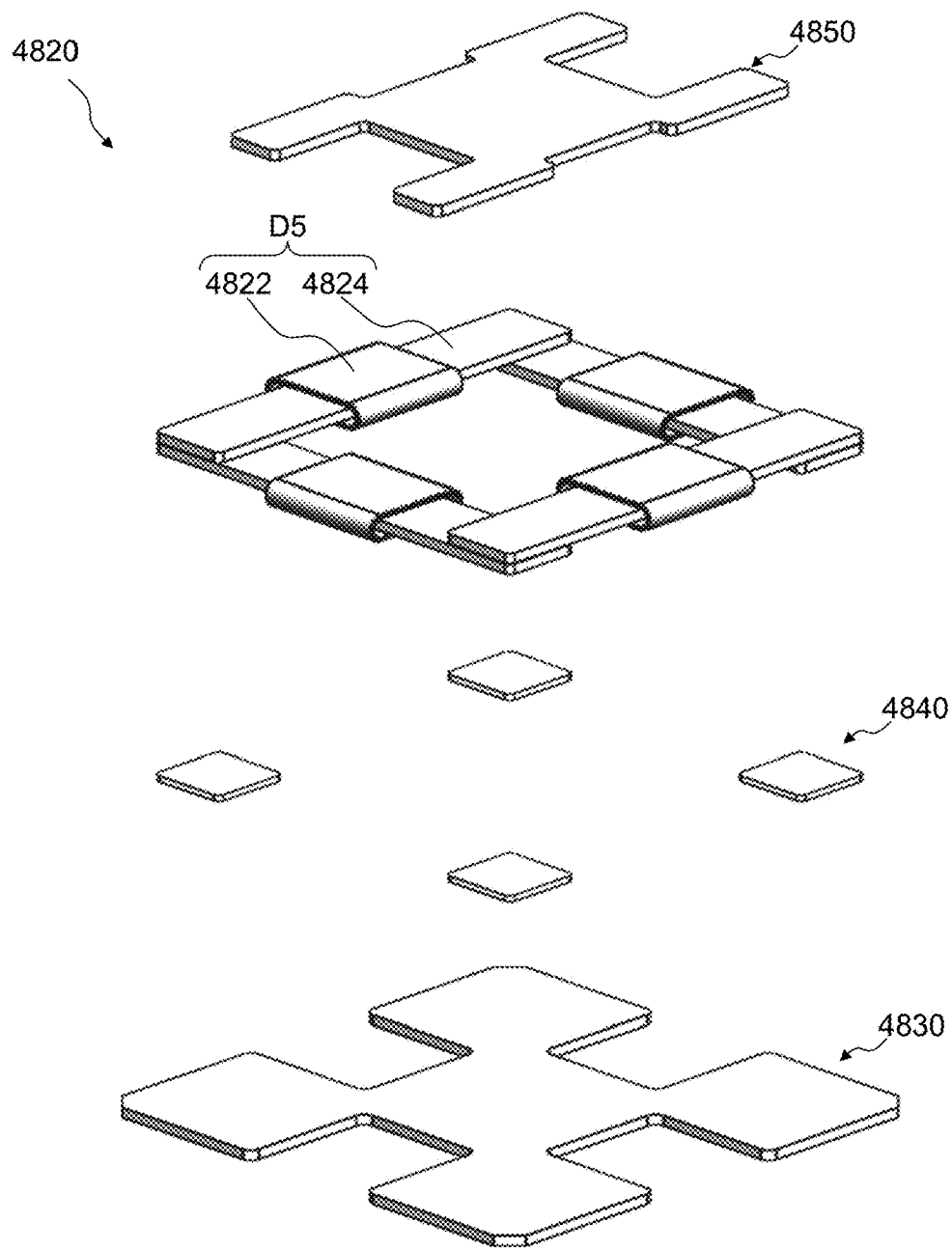
FIG. 72 is an exploded perspective view of other variation 33 of the vibration actuator.

FIG. 71 is a perspective view of other variation 33 of the vibration actuator according to the embodiment of the present invention, and FIG. 72 is an exploded perspective view of other variation 33.

As shown in vibration actuator 4810 in other variation 33 illustrated in the drawing, the vibration actuator may include movable section 4820 constituted by combining, in a rectangular shape, electromagnets D5 in which coil 4822 is wound around core 4824 having a narrow rectangular plate shape.

Between this movable section 4820 and base plate 4830, a plurality of elastic bodies 4840 may be included at the four corners of the frame shape portion assembled in a frame shape, and thus movable section 4820 is movably supported by each of elastic bodies 4840.

In this configuration, base plate 4830 includes cutouts 4832 that serve as escape portions for coil 22, and coil 22 is disposed in each of cutouts 4832. Further, movable section 4820 includes, the part of electromagnets D5 having a frame shape, weight 4850 having an H-shape that avoids each coil 4822. Weight 4850 is disposed between a pair of electromagnets that are separated from each other in the X direction and are parallel to each other, and is fixed at each core 4824 of the pair of electromagnets D5-1 that are separated from each other in the Y direction and are parallel to each other. This configuration can achieve a reduction in the height and a reduction in the size of vibration actuator 4810 itself, and can also set the region (range of strength) of the sense of touch obtained by the vibration of the actuator to be wide.

21. Other Variation 34

Figure 73:
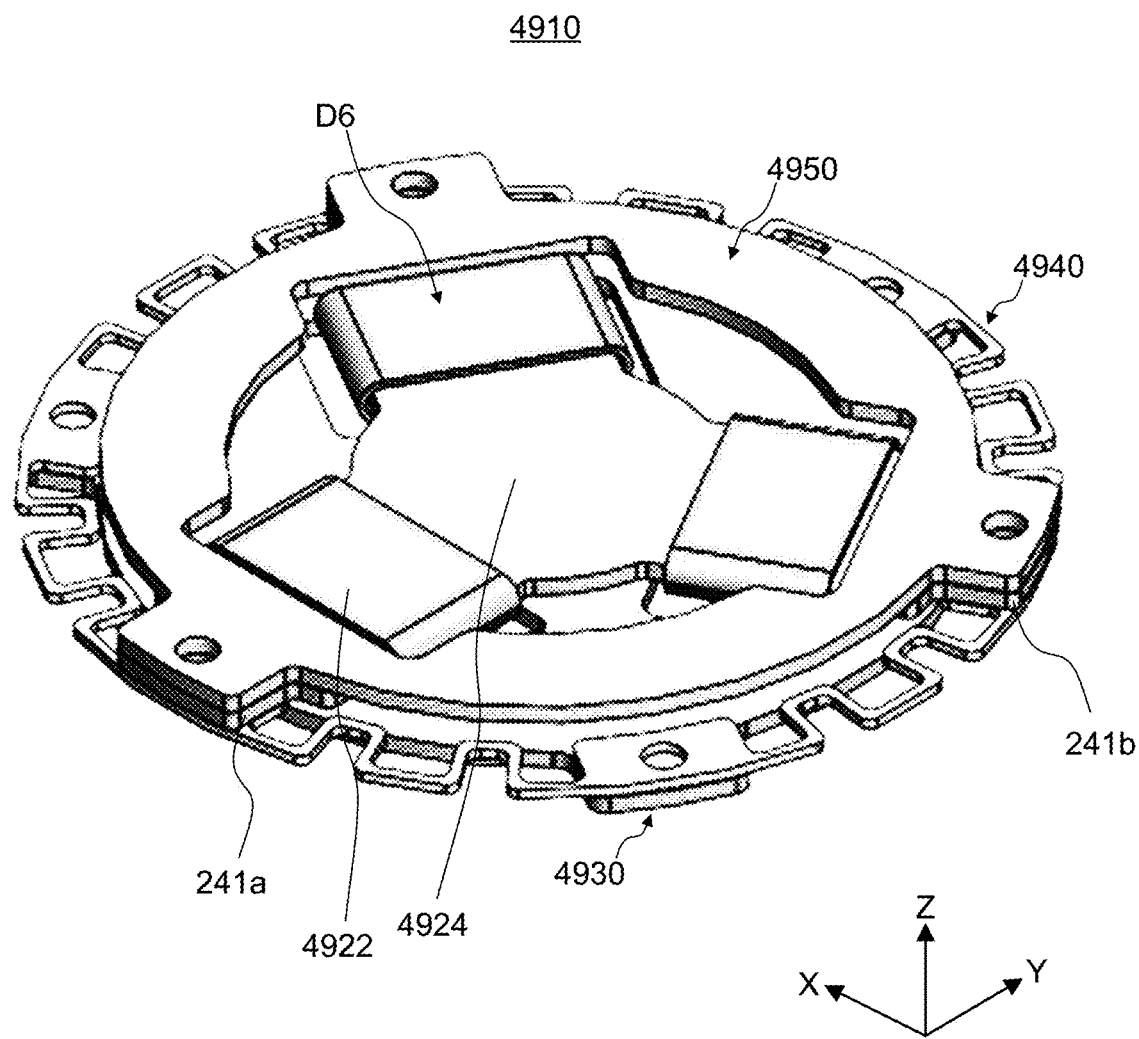
FIG. 73 is a perspective view of other variation 34 of the vibration actuator.
Figure 74:
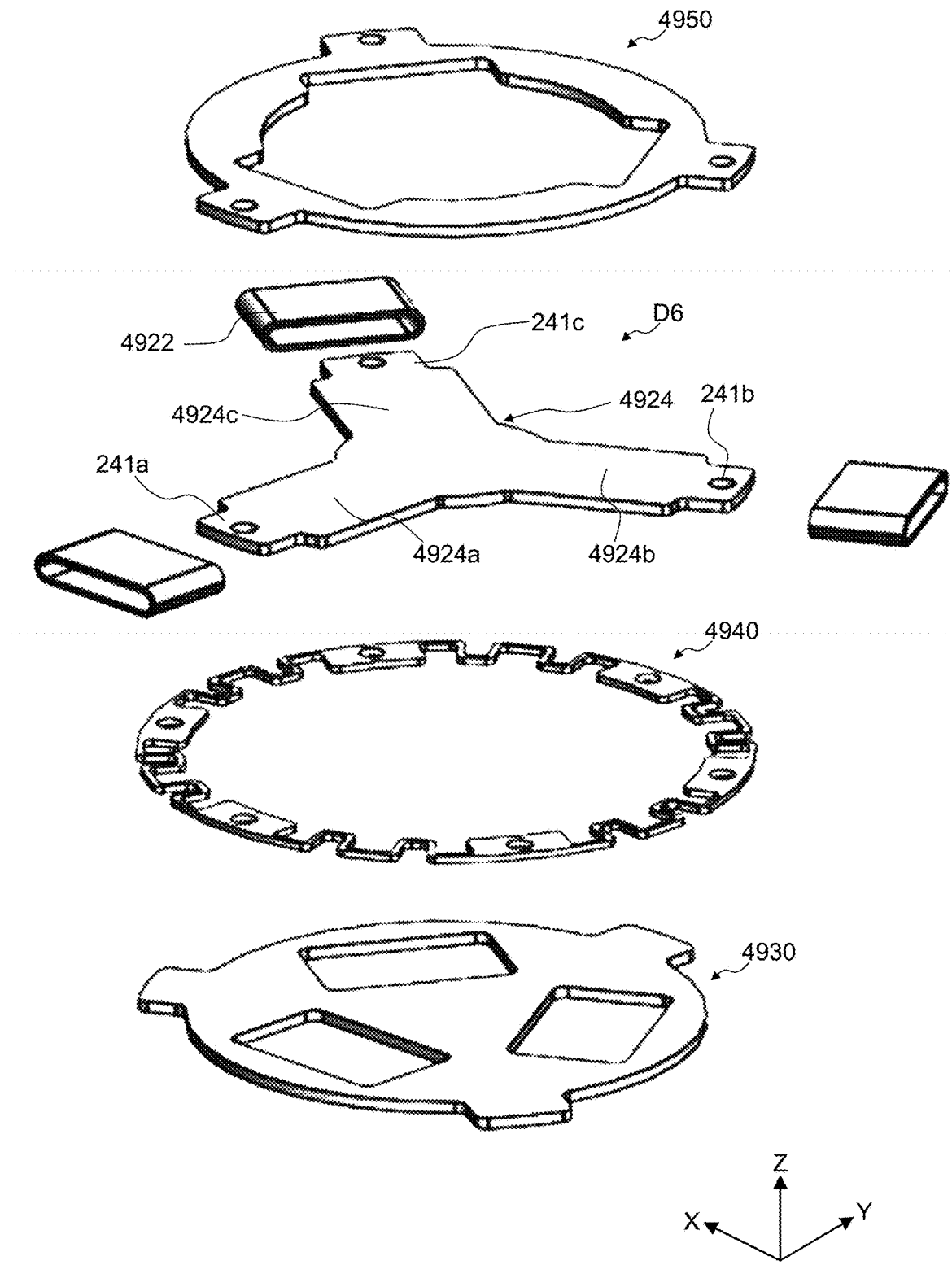
FIG. 74 is an exploded perspective view of other variation 34 of the vibration actuator.

FIG. 73 is a perspective view of other variation 34 of the vibration actuator according to the embodiment of the present invention, and FIG. 74 is an exploded perspective view of other variation 34. As shown in vibration actuator 4910 illustrated in the drawing, base plate 4930, elastic body 4940, and weight 4950 each have a circular shape, and core 4924 has a shape including branch core portions 4924*a*, 4924*b*, and 4924*c* that radially extend to three directions from the center.

Coils 4922 are respectively disposed (equipped on the outer side) in the central portion of branch core portions 4924*a*, 4924*b*, and 4924*c*. Coils 4922 constitute electromagnet D6 together with branch core portions 4924*a*, 4924*b*, and 4924*c*. Spring connection portions 241*a*, 241*b*, and 241*c* are respectively provided at distal ends of branch core portions 4924*a*, 4924*b*, and 4924*c*. Electromagnet D6 is connected to elastic body 4940 via spring connection portions 241*a*, 241*b*, and 241*c*.

Elastic body 4940 is not a rectangular frame as in the embodiment described above, but is a circular frame that surrounds base plate 4930 having a circular shape. Elastic body 4940 includes a meandering portion (bent portion) disposed along the circumferential direction, and spring connection portions 241*a*, 241*b*, 241*c*, and base plate 4930 are alternately connected to elastic body 4940 in the circumferential direction in the meandering portion.

The shape of vibration actuator 4910 can be circular as described above, and a large vibration can be obtained relative to the component area. Note that branch core portions 4924a to 4924c may form an electromagnet by radially disposing two, four, or more branch core portions and disposing a coil on each of the branch core portions.

22. Other Variation 35

Figure 75:
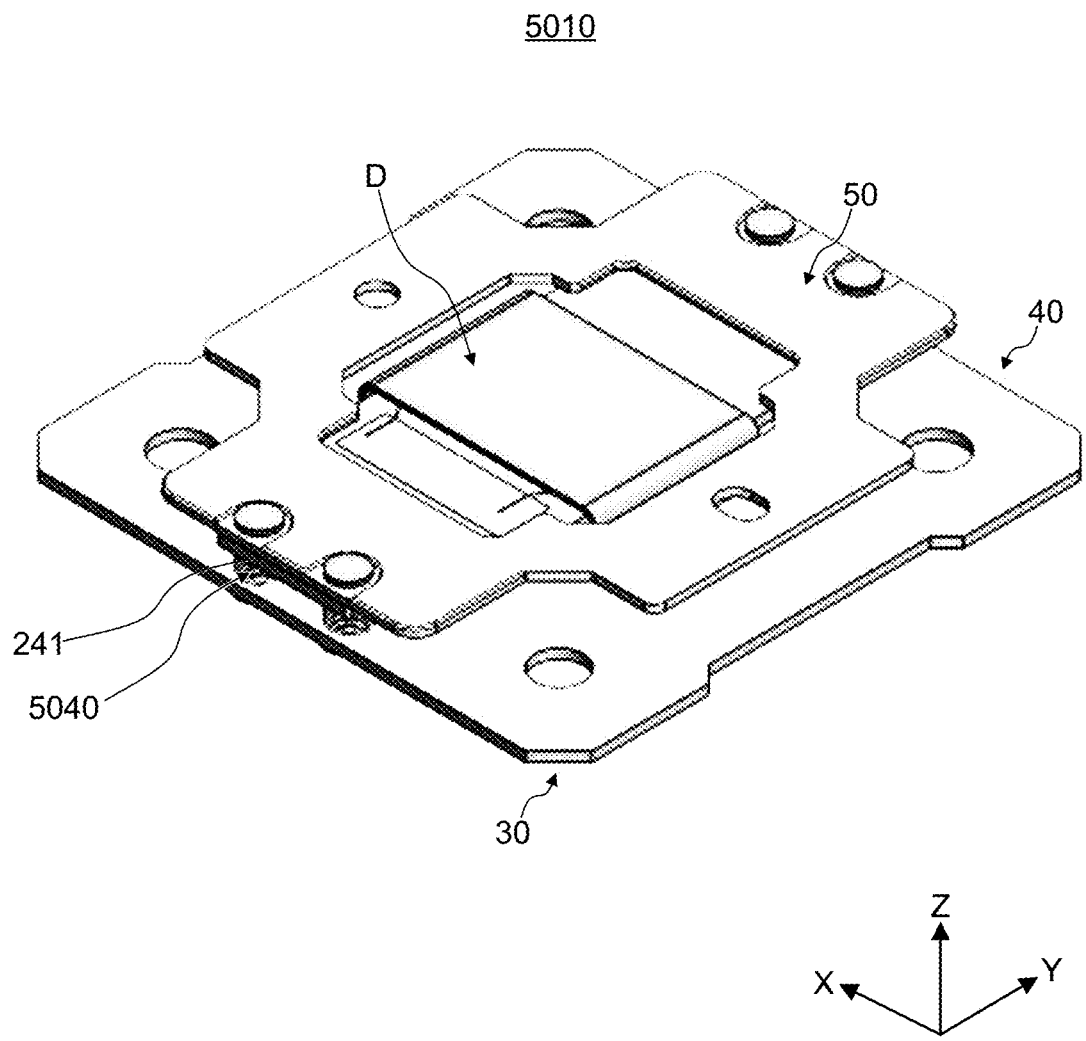
FIG. 75 is a perspective view of other variation 35 of the vibration actuator.
Figure 76:
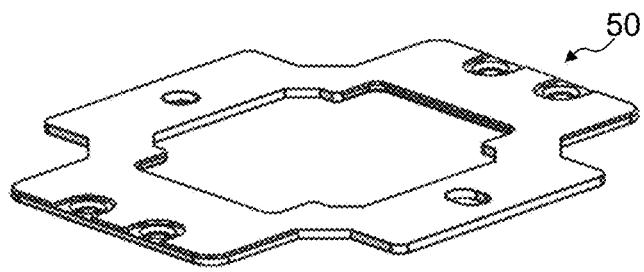
FIG. 76 is an exploded perspective view of other variation 35 of the vibration actuator.
Figure 76:
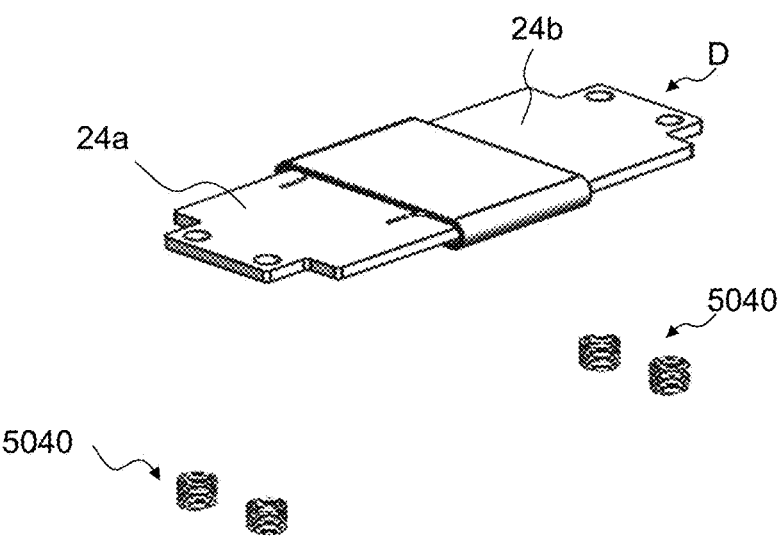
Figure 76:
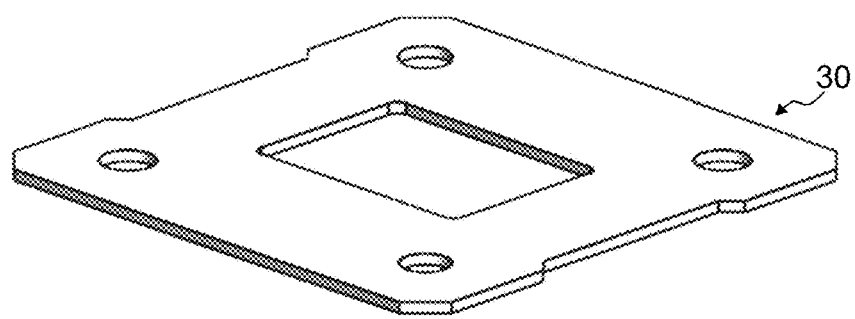
Figure 76:
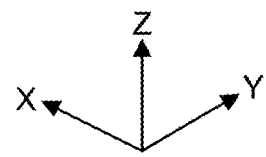

FIG. 75 is a perspective view of other variation 35 of the vibration actuator according to the embodiment of the present invention, and is an exploded perspective view of other variation 35. As shown in vibration actuator 5010 illustrated in the drawings, the elastic body is formed as a plurality of pairs of coil springs 5040, and coil springs 5040 are interposed between base plate 30 and core end portions 24a and 24b of electromagnet D to support core end portions 241 and 242 of electromagnet D. In this vibration actuator 5010, weight 50, which has a shape that does not overlap with the coil, is fixed to the core (core end portions 24a and 24b) on both sides of the coil. By this configuration, actuator 5010 having high durability can be obtained at low cost by using coil spring 5040.

As described above, the elastic body is a pair (a plurality of pairs) of flat-plate-shaped elastic members interposed between base plate 30 and core end portions 24a and 24b, so that vibration actuator 1410 can be manufactured without needing other components and processing the elastic body.

23. Other Variation 36

Figure 77:
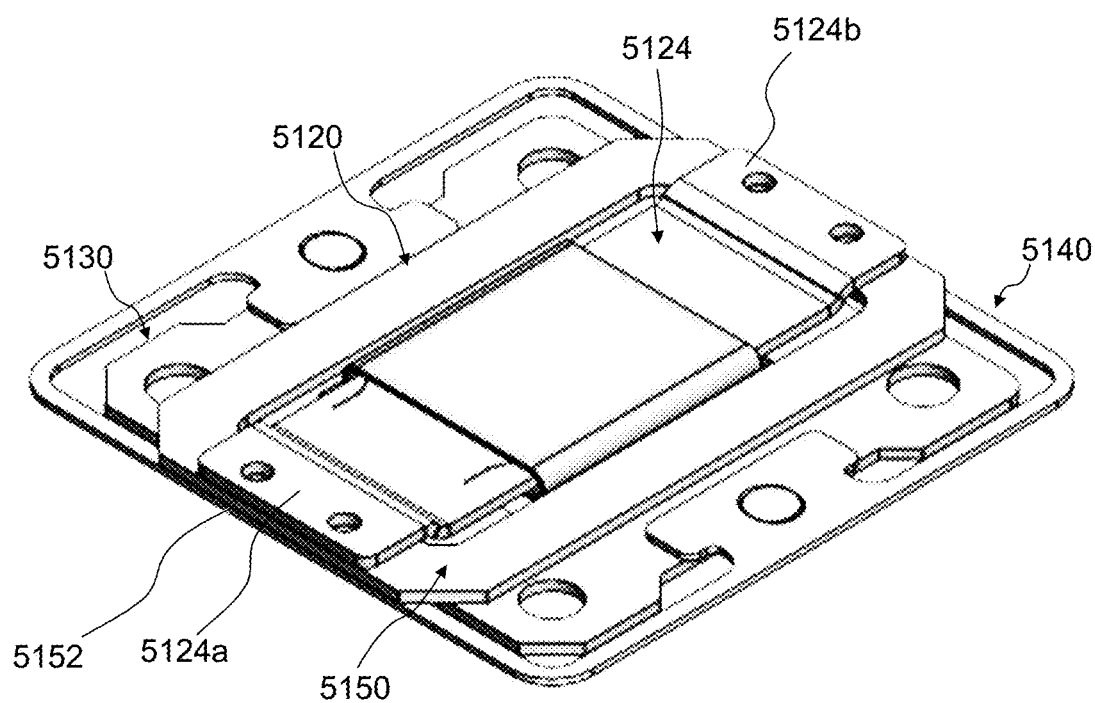
FIG. 77 is a perspective view of other variation 36 of the vibration actuator.
Figure 78:
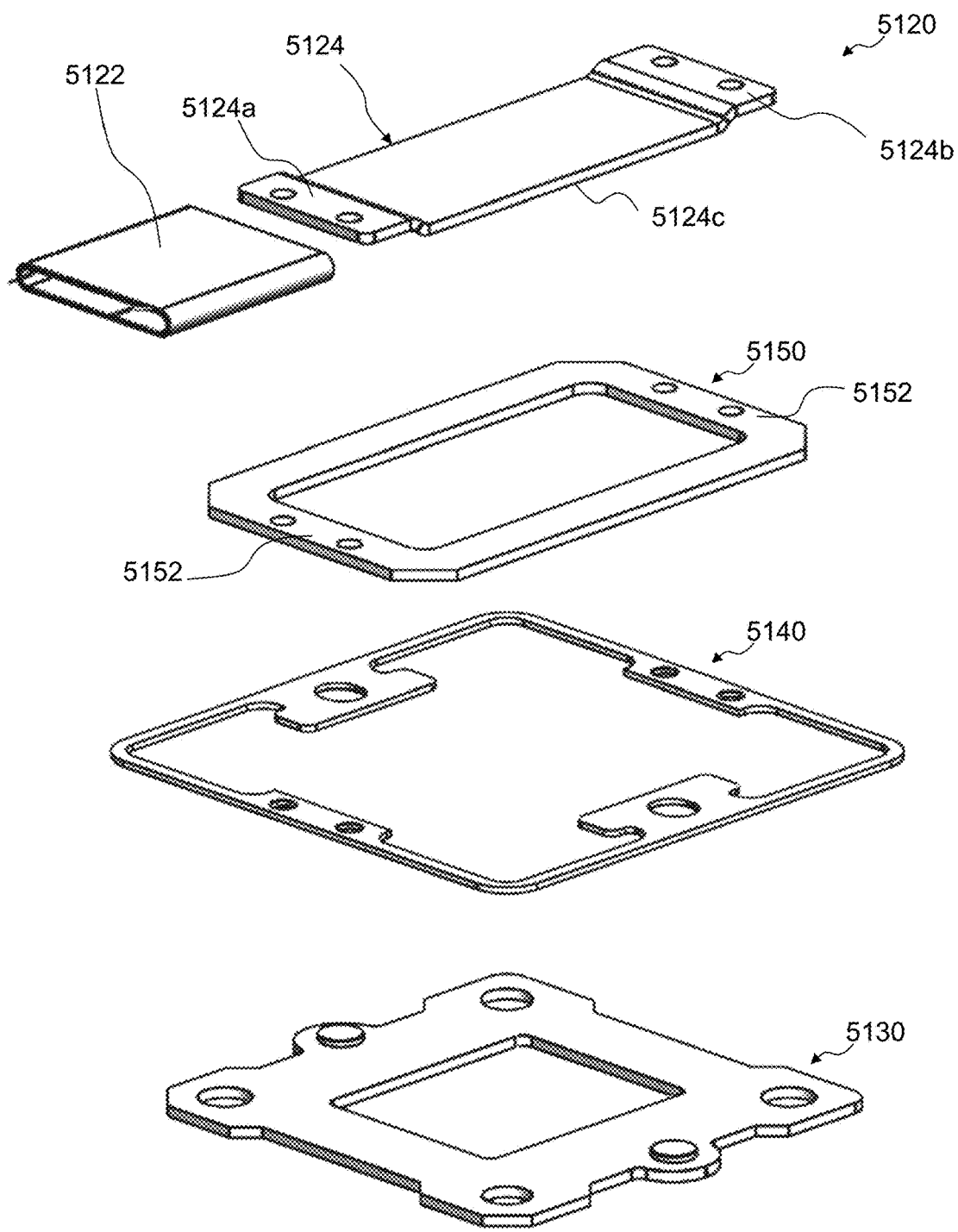
FIG. 78 is an exploded perspective view of other variation 36 of the vibration actuator.

FIG. 77 is a perspective view of other variation 36 of the vibration actuator according to the embodiment of the present invention, and FIG. 78 is an exploded perspective view of other variation 36.

As illustrated, weight 5150 for increasing the sense of touch by vibration actuator 5110 may be disposed on a back surface side of core 5124 (side of base plate 5130).

In core 5124, in order to reduce the height of vibration actuator 5110 (thickness in the Z direction), a bending process is performed on core end portions 5124a and 5124b to form steps, and the height positions of core end portions 5124a and 5124b are made higher than that of main body bottom surface 5124c of core 5124.

By disposing and fixing a pair of opposite sides 5152 of weight 5150 respectively to the steps formed by core end surfaces 5124a and 5124b, the front surface of core 5124 (the front surfaces of core end portions 5124a and 5124b) and the front surface of coil 5122 become the front surface of the vibration actuator. Thus, compared to the configuration in which vibration actuator has a thickness in which the front surface portion of the coil, core end portion 5124a and 5124b, and weight 5150 are stacked in this order, vibration actuator 5110 can be reduced in height.

24. Other Variation 37

Figure 79:
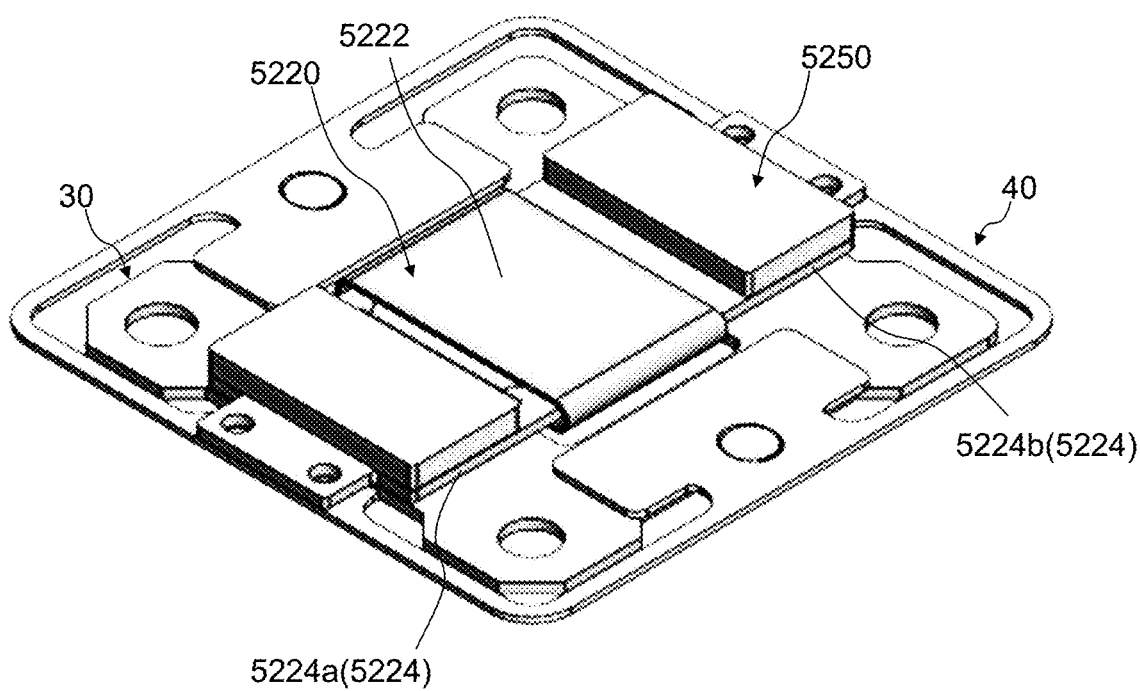
FIG. 79 is a perspective view of other variation 37 of the vibration actuator.
Figure 80:
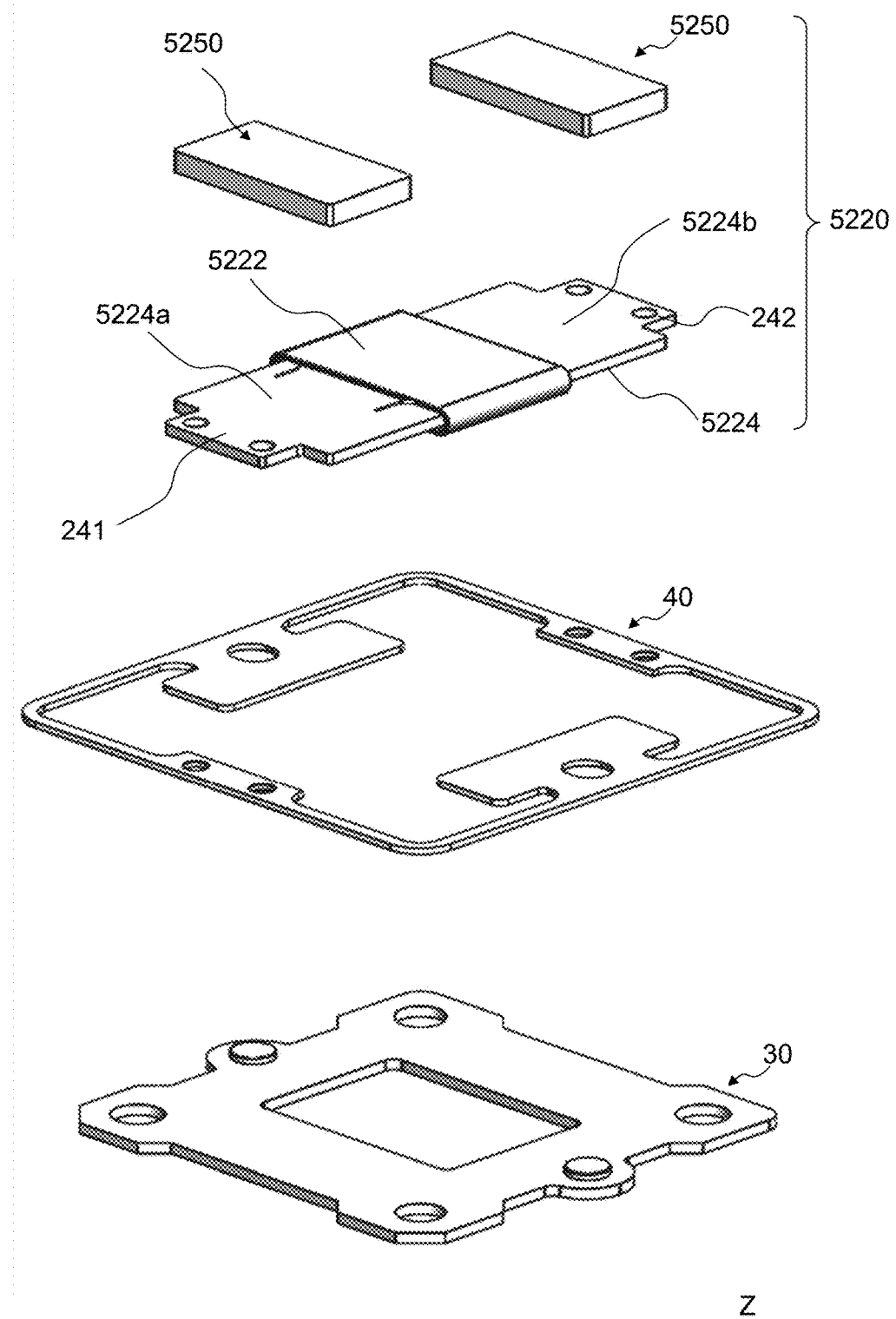
FIG. 80 is an exploded perspective view of other variation 37 of the vibration actuator.

FIG. 79 is a perspective view of other variation 37 of the vibration actuator according to the embodiment of the present invention, and FIG. 80 is an exploded perspective view of other variation 37. As illustrated, movable section 5220 is equipped with weight blocks 5250 each having a rectangular parallelepiped shape on core 5224 to increase the sense of tough by vibration actuator 5210. These weight blocks 5250 are disposed separately on core end portions 5224a and 5224b at the position avoiding coil 5222 in the center of core 5224. With this configuration, a sufficient vibration can be obtained while the height of vibration actuator 5210 is kept low.

25. Other

Further, in each vibration actuator including a weight section, a weight, or a weight plate, a capacitance detection portion may be provided between the weight section, weight, or weight plate and the base plate.

For example, in vibration actuator 2010 illustrated in FIG. 32, one of dampers 2000 is replaced with the capacitance detection section, and the capacitance detection section is attached to one of the weight section, weight, or weight plate and the base plate to detect the capacitance of the other of the weight section, weight, or weight plate and the base plate with respect to the one of them. The capacitance detection section may be provided in any manner as long as the capacitance detection section detects the relative distance between the portion of the weight section, weight, or weight plate and the portion of the base plate. Thus, the movable section can detect the operator's pressing operation, and the vibration corresponding to the operation can be generated by the vibration actuator through the control unit to be given to the operator.

Further, the vibration actuator in each variation can be attached to a trackpad by being used in place of vibration actuator 10 illustrated in FIG. 13. The vibration actuator in each variation can basically be incorporated as a product by being fixed to the side of the housing of the product through a base plate, a weight plate, or a weight section.

In a case where each of the above-described vibration actuators is disposed on the back surface of the operation surface to constitute a contact-type input device, the plate of the electromagnetic body itself may be the operation surface, or the electromagnet may be directly attached to the back surface of the operation surface. In this configuration, the coil is energized depending on the contact operation of the operator to the operation surface, and the coil (electromagnet) or the base plate (plate) is displaced to be close to the other to perform vibration. This makes it possible to directly present the sense of touch to the operator and give the sense of touch more effectively.

For example, each of the above-described vibration actuators may have a configuration in which the operation surface serves as a weight. In this case, since the weight is attached to the operation surface, the operation surface itself has a configuration including a step avoiding a coil, and then the core is attached.

Further, in the vibration actuator in which the operation surface serves as a weight, the elastic body may be replaced with an elastic member such as a flat rubber or a damper. For example, in this configuration, the operation surface and the housing may be configured as an actuator by disposing an electromagnet and a facing magnetic material facing the electromagnet at the position where the operation surface and the side of the housing face each other and by providing and fixing the elastic member between the operation surface and the housing.

Further, the back surface of the operation surface may have the shape and the function of the plate. In this case, the plate connection portion (base-section-side fixing portion) of the elastic body is connected to the back surface, but the plate connection portion may be connected at a position higher than the back surface, and a deformation region of the elastic body itself in the thickness direction may be ensured. Further, in order to ensure the deformation region, the elastic body (plate connection portion) may be connected to a step portion (for example, bending-processed portion 3734 in FIG. 50) provided by processing the back surface. Further, the elastic body itself (plate connection portion) may be processed and may have a bending-processed portion (for example, bending-processed portion 3845 in FIG. 51) for changing the height. This configuration can reduce the number of components since the plate (base plate) is not provided.

Further, when the elastic body itself is attached to the back surface, the elastic body may be provided via a spacer (see spacer 62 in FIG. 54) to have an elastic deformation region (a region in the thickness direction) of the elastic body. The height of the spacer allows the region of the elastic body to be changed as appropriate. Note that, the operation surface may be, for example, a display, an operation panel, or a touchpad.

The embodiment of the present invention has been described thus far. Note that, the above description is only illustration of a preferred embodiment of the present invention, and the scope of the present invention is not limited thereto. That is, the descriptions of the configuration of the above-mentioned device and the shape of each part are exemplary, and it is obvious that various modifications and additions to these examples are possible within the scope of the present invention The disclosure of Japanese Patent Application No. 2022-074823, filed on Apr. 28, 2022, including the specification, claims, drawings and abstract, is incorporated herein by reference in its entirety.

INDUSTRIAL APPLICABILITY

The vibration actuator and the contact-type input device according to the present invention each have effects of being easily assembled, and suitably vibrating while being disposed in a space-saving manner, and are useful for a PCB, a trackpad, an operation panel, and the like, for example.

REFERENCE SIGNS LIST

1 Vibration presentation device (contact-type input device)
10, 1010, 1110, 1210, 1310, 1410, 1510, 1610, 1710, 1810, 1910, 2010, 2110, 2210, 2310, 2610, 2910, 3210, 3410, 3510, 3610, 3710, 3810, 3910, 4010, 4110, 4210, 4310, 4410, 4510, 4610, 4710, 4810, 4910, 5010, 5110, 5210 Vibration actuator
12 Switching element
14 Signal generation unit
20, 1320, 1820, 1920, 2020, 2920 Movable section
22 Coil
24 Core (magnetic core)
24a One end portion
24b Other end portion
26 Weight section
30 Base section (base, base plate)
32a, 32b Facing portion
34a, 34b Spring fixing portion
36 Fixing portion
38, 1852 Opening portion
40, 1040, 1246 Plate-shaped elastic section (elastic body)
42a, 42b, 1042a, 1042b Movable-section-side fixing portion (core connection portion)
44a, 44b, 1044a, 1044b Base-section-side fixing portion (plate connection portion)
46 Elastic main body portion
48 Arm
60, 62 Spacer
100, 100A Vibration presentation device
102 Attachment target
110, 110A Pad main body
120 Bottom section
130 Frame section
160 Double-sided tape
170 Screw
172 Fastening member
190 Damper section (buffer section)
241, 242 Spring connection portion
311, 461, 462 Pair of side portions
311a, 312a Cutout portion
312 Another pair of side portions
441, 442 Divided body
1042 Connection portion
1046 Bent portion
1146 Meandering shape portion
1400 Elastic body
1530, 1630, 2930, 3330, 3430, 3530, 3730, 3830, 4230, 4630, 4730, 4830, 4930, 5130 Base plate
1532 Fixing hole
1534 Fastening member
1536 Elongated hole
1850, 1950, 2050, 2150, 2950 Weight plate
1900 Flexible printed circuit
1902 Coil wiring connection portion
2000, 2100, 2200 Damper

The invention claimed is:

1. A vibration actuator, comprising:
a plate that is a magnetic body;
an electromagnet in which a coil is disposed at a central portion of a core; and
an elastic body that is a frame body formed by arranging a plurality of L-shaped elastically deformable arm portions in a rectangular shape surrounding an outer periphery of the plate and is connected, while suspending the electromagnet from opposite sides of the frame body, to the plate with a pair of connection portions protruding inward from other opposite sides, wherein
one of the coil and the plate is displaced to approach the other and vibrates by a magnetic force generated by energization of the coil.

2. The vibration actuator according to claim 1, wherein the plate includes an opening that is a part of a vibration space of the electromagnet in a region corresponding to the coil.

3. The vibration actuator according to claim 1, wherein the plate and the electromagnet each have a flat plate shape.

4. The vibration actuator according to claim 1, wherein a plurality of the electromagnets are disposed in parallel or are each formed in a rectangular shape.

5. The vibration actuator according to claim 1, wherein the elastic body supports the core at one pair of the opposite sides.

6. The vibration actuator according to claim 1, wherein the elastic body includes a strain detection portion.

7. The vibration actuator according to claim 1, wherein the elastic body includes a pair of core connection portions.

8. The vibration actuator according to claim 7, wherein the elastic body is connected to the plate by disposing the plate connection portion on the plate and connecting the plate connection portion to the plate, and is connected to the core by disposing the core on the core connection portion and connecting the core to the core connection portion.

9. The vibration actuator according to claim 7, wherein the elastic body includes a bent portion between one of the pair of core connection portions and one of the pair of connection portions.

10. A contact-type input device in which the vibration actuator according to claim 1 is disposed on a back surface of an operation surface, wherein
the coil is energized in response to an operation to touch the operation surface by an operator, and one of the coil and the plate is displaced to approach the other and vibrates to present a sense of touch to the operator.

11. The contact-type input device according to claim 10, wherein
either the plate or the electromagnet is disposed on the back surface of the operation surface.

12. The contact-type input device according to claim 10, wherein
the back surface of the operation surface has a shape and a function of the plate.

13. The contact-type input device according to claim 10, wherein
the operation surface is a display, an operation panel, or a touchpad.

14. The vibration actuator according to claim 1, wherein
the electromagnet fixes a weight having a shape that does not overlap with the coil to the core on both sides of the coil.

15. The vibration actuator according to claim 14, further comprising a damping member between the core or the weight and the plate or an attachment target region of the vibration actuator.

16. The vibration actuator according to claim 14, wherein
the weight is a frame member having an opening in a region of the coil.

17. The vibration actuator according to claim 14, wherein
the weight includes an opening in a region of a coil wiring connection portion.

18. The vibration actuator according to claim 14, further comprising a capacitance detection section between the weight and the plate.

* * * * *